US012627837B2

(12) United States Patent
De Luxán Hernández et al.

(10) Patent No.:  US 12,627,837 B2
(45) Date of Patent:      May 12, 2026

(54) IMPLEMENTATION EFFICIENT PARTITION-BASED INTRA CODING CONCEPT

(71) Applicant: Fraunhofer-Gesellschaft zur Förderung der angewandten Forschung e.V., Munich (DE)

(72) Inventors: Santiago De Luxán Hernández, Berlin (DE); Benjamin Bross, Berlin (DE); Phan Hoang Tung Nguyen, Berlin (DE); Valeri George, Berlin (DE); Heiko Schwarz, Berlin (DE); Detlev Marpe, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 83 days.

(21) Appl. No.: 18/600,294

(22) Filed: Mar. 8, 2024

(65) Prior Publication Data

US 2024/0251101 A1      Jul. 25, 2024

Related U.S. Application Data

(63) Continuation of application No. 17/471,911, filed on Sep. 10, 2021, now Pat. No. 11,973,978, which is a (Continued)

(30) Foreign Application Priority Data

Mar. 12, 2019    (EP) ..................................... 19162405

(51) Int. Cl.
H04N 19/593        (2014.01)
H04N 19/157        (2014.01)
        (Continued)

(52) U.S. Cl.
CPC ......... H04N 19/593 (2014.11); H04N 19/157 (2014.11); H04N 19/172 (2014.11); (Continued)

(58) Field of Classification Search
None
See application file for complete search history.

(56)                References Cited

U.S. PATENT DOCUMENTS

2013/0107970 A1      5/2013  Wang
2013/0114700 A1*    5/2013  Moriya ................ H04N 19/182
                                                                375/240.03
                              (Continued)

FOREIGN PATENT DOCUMENTS

JP            2017175629 A      9/2017

OTHER PUBLICATIONS

Santiago De Luxan Hernandez et al., "CE3: Line-based intra coding mode (Tests 2.1.1 and 2.1.2)", JVET-L0076, Joint Video Experts Team (JVET) of ITU-T SG 16 WP 3 and ISO/IEC JTC 1/SC 29/WG 11 12th Meeting: Macao, CN, Oct. 3-12, 2018.
(Continued)

*Primary Examiner* — Edemio Navas, Jr.
(74) *Attorney, Agent, or Firm* — Conley Rose, P.C.

(57)                ABSTRACT

A method for decoding a block of a picture includes decoding, from a data stream, an intra-coding mode for the block, deriving a predictor for a prediction partition of the block using at least one already reconstructed samples neighboring the prediction partition and the intra-coding mode, deriving a prediction residual for each of the at least two transform partitions included in the prediction partition, and combining the predictor of the prediction partition and the prediction residual for each of the at least two transform partitions included in the prediction partition to reconstruct the prediction partition. The block is partitioned into multiple
(Continued)

transform partitions based on a partition dimension flag, and the prediction partition includes at least two transform partitions of the multiple transform partitions.

30 Claims, 22 Drawing Sheets

Related U.S. Application Data continuation of application No. PCT/EP2020/056489, filed on Mar. 11, 2020.

(51) Int. Cl.

| | |
|---|---|
| *H04N 19/172* | (2014.01) |
| *H04N 19/176* | (2014.01) |
| *H04N 19/18* | (2014.01) |
| *H04N 19/61* | (2014.01) |
| *H04N 19/70* | (2014.01) |

(52) U.S. Cl.
CPC .......... *H04N 19/176* (2014.11); *H04N 19/18* (2014.11); *H04N 19/61* (2014.11); *H04N 19/70* (2014.11)

(56) References Cited

U.S. PATENT DOCUMENTS

| | | | |
|---|---|---|---|
| 2014/0192904 A1 | 7/2014 | Rosewarne | |
| 2015/0229957 A1 | 8/2015 | Zhao | |
| 2017/0118473 A1 | 4/2017 | Thirumalai | |
| 2017/0155905 A1 | 6/2017 | Puri | |
| 2017/0175629 A1 | 6/2017 | Schwarz | |
| 2017/0289574 A1 | 10/2017 | Nguyen | |
| 2019/0132605 A1* | 5/2019 | Deng | .................... G06T 7/238 |

| | | | |
|---|---|---|---|
| 2020/0221099 A1 | 7/2020 | Pham Van | |
| 2020/0244995 A1 | 7/2020 | Hsiang | |
| 2021/0266581 A1* | 8/2021 | Jung | ..................... H04N 19/12 |

OTHER PUBLICATIONS

Santiago De Luxan Hernandez et al., "CE3: Intra Sub-Partitions Coding Mode (Tests 1.1.1 and 1.1.2)", JVET-M0102, Joint Video Experts Team (JVET) of ITU-T SG 16 WP 3 and ISO/IEC JTC1/SC 29/WG 11 13th Meeting: Marrakech, MA, Jan. 9-18, 2019.

Chen, Jianle, et al., "Algorithm Description for Versatile Video Coding and Test Model 4 (VTM 4)", Joint Video Experts Team (JVET) of ITU-T SG 16 WP 3 and 1SO/IEC JTC 1/SC 29/WG 11, 13th Meeting: Marrakech, MA, Jan. 9-18, 2019.

F. Bossen et al, "JVET common test conditions and software reference configurations for SOR video," Document JVET-M1010, Marrakech, MA, 2019.

M. Albrecht et.al, "Description of SOR, HOR, and 360° video coding technology proposal by Fraunhofer HHI", JVET-J0014 v.4, Joint Video Experts Team (JVET) of ITU-T SG 16 WP 3 and ISO/IEC JTC 1/SC 29/WG 11 10th Meeting: San Diego, US, Apr. 10-20, 2018.

Cao (Tsinghua) X. et al., "CE6.b1 Report on Short Distance Intra Prediction Method", 96. MPEG Meeting; Mar. 21-25, 2011; Geneva; (Motion Picture Expert Group or ISO/IEC JTC1/SC29/WG11), (Mar. 23, 2011), No. m19805, XP030048372.

Santiago De Luxan Hernandez et al., "Non-CE3: ISP with independent sub-partitions for certain block sizes", No. JVET-N0372, (Mar. 12, 2019), 14. JVET Meeting; Mar. 19, 2019-Mar. 27, 2019; Geneva; (The Joint Video Exploration Team of ISO/IEC JTC1/SC29/WG11 and ITU-T SG.16 ), URL:http://phenix.int-evry.fr/jvet/doc_end_user/documents/14_ Geneva/wg 11 /JVET-N0372-v1 .zip JVET-N0372-v1.docx, (Mar. 12, 2019), XP030202771.

* cited by examiner

IMPLEMENTATION EFFICIENT PARTITION-BASED INTRA CODING CONCEPT

CROSS-REFERENCES TO RELATED APPLICATIONS

This application is a continuation of U.S. patent application Ser. No. 17/471,911, filed Sep. 10, 2021, which in turn is a continuation of International Patent Application No. PCT/EP2020/056489, filed Mar. 11, 2020, each of which is incorporated herein by reference in its entirety, and additionally claims priority from European Patent Application No. 19162405.5, filed Mar. 12, 2019, which is incorporated herein by reference in its entirety.

The present application is concerned with an intra-coding concept for use in a block-based codec such as, for example, a hybrid video codec.

BACKGROUND OF THE INVENTION

Given a certain block, intra prediction is carried out in HEVC by extrapolating the decoded boundary samples of the neighboring blocks following certain patterns, namely 33 angular modes and a DC and a planar modes [1]. The one intra prediction mode that minimizes the rate-distortion cost is then signaled to the decoder. Despite the known codecs supporting many Intra Prediction Modes (IPMs), the intra prediction achieved thereby is still subject of development to find better intra predictors leading to higher coding efficiency. This does not only pertain to HEVC but also to other block-based codecs using intra-prediction. Finding a set of intra-prediction modes which are suitable for efficiently coding the inner of blocks requires taking into account the overhead for signaling the intra-prediction mode in terms of signaling overhead and the resulting quality of the predictor obtained by these intra-prediction modes due to the fact that a more accurate predictor reduces the prediction residual, thereby reducing the signaling overhead associated with coding the prediction residual. In order to keep the signaling overhead associated with the intra-prediction modes low, intra-predicted blocks should be large, i.e. the granularity at which the intra prediction mode is signaled should be kept coarse, but on the other hand, spatial prediction of larger blocks tends to be less accurate owing to a higher mean sample distance of the samples in the inner of the intra-predicted block, i.e. the ones to be predicted, to the already decoded/encoded samples neighboring this block, i.e. the reference samples. HEVC alleviates this catch-22 a little bit by allowing the transform residual blocks to inherit the intra-prediction mode of their corresponding coding unit relative to which the transform residual blocks form leaf blocks into which the coding unit is sub-divided by multi-tree subdivisioning. However, this still requires signaling overhead for signaling from encoder to decoder the sub-partitioning of respective intra-coded coding units into the transform blocks.

A newly developing intra coding concept is presented by the Intra Sub-Partitions (ISP) coding mode in the newly developing Versatile Video Coding (VVC) standard, but here, implementation efficiency improvements would be required.

SUMMARY

An embodiment may have a decoder for block-based decoding of a picture from a data stream, configured to decode an intra-coding mode for a predetermined block of the picture from the data stream; decode a partition dimension flag for the predetermined block of the picture from the data stream and set a partition dimension depending on the partition dimension flag to be horizontal or vertical, partition, along the predetermined dimension, the predetermined block into transform partitions which are as wide as the predetermined block perpendicular to predetermined dimension; decode, for each transform partition, a transform of a prediction residual from the data stream; intra-predicting the predetermined block depending on one or more already reconstructed samples neighboring the predetermined block in a manner depending on the intra-coding mode to acquire a predictor for the predetermined block; and reconstructing the predetermined block by correcting the predictor within each transform partition using the transform of the prediction residual decoded for the respective transform partition.

Another embodiment may have an encoder for block-based encoding of a picture into a data stream, configured to encode an intra-coding mode for a predetermined block of the picture into the data stream; encode a partition dimension flag for the predetermined block of the picture into the data stream which signals that a partition dimension is to be set to be horizontal or vertical, partition, along the predetermined dimension, the predetermined block into transform partitions which are as wide as the predetermined block perpendicular to predetermined dimension; intra-predicting the predetermined block depending on one or more already reconstructed samples neighboring the predetermined block in a manner depending on the intra-coding mode to acquire a predictor for the predetermined block; encode, for each transform partition, a transform of a prediction residual into the data stream, so that the predetermined block is reconstructible by correcting the predictor within each transform partition using the transform of the prediction residual encoded for the respective transform partition.

Another embodiment may have a method for block-based decoding of a picture from a data stream, comprising decoding an intra-coding mode for a predetermined block of the picture from the data stream; decoding a partition dimension flag for the predetermined block of the picture from the data stream and setting a partition dimension depending on the partition dimension flag to be horizontal or vertical, partitioning, along the predetermined dimension, the predetermined block into transform partitions which are as wide as the predetermined block perpendicular to predetermined dimension; decoding, for each transform partition, a transform of a prediction residual from the data stream; intra-predicting the predetermined block depending on one or more already reconstructed samples neighboring the predetermined block in a manner depending on the intra-coding mode to acquire a predictor for the predetermined block; and reconstructing the predetermined block by correcting the predictor within each transform partition using the transform of the prediction residual decoded for the respective transform partition.

Another embodiment may have a method for block-based encoding of a picture into a data stream, comprising encoding an intra-coding mode for a predetermined block of the picture into the data stream; encoding a partition dimension flag for the predetermined block of the picture into the data stream which signals that a partition dimension is to be set to be horizontal or vertical, partitioning, along the predetermined dimension, the predetermined block into transform partitions which are as wide as the predetermined block perpendicular to the predetermined dimension; intra-predicting the predetermined block depending on one or more already reconstructed samples neighboring the predetermined block in a manner depending on the intra-coding mode to acquire a predictor for the predetermined block; encoding, for each transform partition, a transform of a prediction residual into the data stream, so that the predetermined block is reconstructible by correcting the predictor within each transform partition using the transform of the prediction residual encoded for the respective transform partition.

Another embodiment may have a data stream generated by the method for block-based encoding of a picture into a data stream, comprising encoding an intra-coding mode for a predetermined block of the picture into the data stream; encoding a partition dimension flag for the predetermined block of the picture into the data stream which signals that a partition dimension is to be set to be horizontal or vertical, partitioning, along the predetermined dimension, the predetermined block into transform partitions which are as wide as the predetermined block perpendicular to the predetermined dimension; intra-predicting the predetermined block depending on one or more already reconstructed samples neighboring the predetermined block in a manner depending on the intra-coding mode to acquire a predictor for the predetermined block; encoding, for each transform partition, a transform of a prediction residual into the data stream, so that the predetermined block is reconstructible by correcting the predictor within each transform partition using the transform of the prediction residual encoded for the respective transform partition.

Another embodiment may have a non-transitory digital storage medium having a computer program stored thereon to perform the method for block-based decoding of a picture from a data stream, comprising decoding an intra-coding mode for a predetermined block of the picture from the data stream; decoding a partition dimension flag for the predetermined block of the picture from the data stream and setting a partition dimension depending on the partition dimension flag to be horizontal or vertical, partitioning, along the predetermined dimension, the predetermined block into transform partitions which are as wide as the predetermined block perpendicular to predetermined dimension; decoding, for each transform partition, a transform of a prediction residual from the data stream; intra-predicting the predetermined block depending on one or more already reconstructed samples neighboring the predetermined block in a manner depending on the intra-coding mode to acquire a predictor for the predetermined block; and reconstructing the predetermined block by correcting the predictor within each transform partition using the transform of the prediction residual decoded for the respective transform partition, when said computer program is run by a computer.

Another embodiment may have a non-transitory digital storage medium having a computer program stored thereon to perform the method for block-based encoding of a picture into a data stream, comprising encoding an intra-coding mode for a predetermined block of the picture into the data stream; encoding a partition dimension flag for the predetermined block of the picture into the data stream which signals that a partition dimension is to be set to be horizontal or vertical, partitioning, along the predetermined dimension, the predetermined block into transform partitions which are as wide as the predetermined block perpendicular to the predetermined dimension; intra-predicting the predetermined block depending on one or more already reconstructed samples neighboring the predetermined block in a manner depending on the intra-coding mode to acquire a predictor for the predetermined block; encoding, for each transform partition, a transform of a prediction residual into the data stream, so that the predetermined block is reconstructible by correcting the predictor within each transform partition using the transform of the prediction residual encoded for the respective transform partition, when said computer program is run by a computer.

In accordance with a first aspect of the present invention, the inventors of the present application realized that one problem encountered when using sub-partitioning in connection with intra-coding is, that the number of sub-partition per block, for which prediction is done individually, should be limited considering the resulting sub-partition size, a wanted minimum throughput of, for example, 16 samples per cycle, and/or a minimum width of coding advance per coding cycle such as a minimum of 4 sample wide advance per prediction. These thoughts led to the idea of construing a flag controlled intra-prediction mode/decision for an intra-coded (predetermined) block which leads to a partitioning of this predetermined block in terms of prediction residual transformation, while the sub-partitioning in terms of intra-prediction, i.e. whether the predetermined block is intra-predicted in an integral manner (all at once), or whether the transform partitions are used for sequential and partition-wise intra-prediction with intermediate usage of the prediction residual and the correction of the just intra-predicted sub-partition using the same for intra-predicting the next sub-partition as well, or whether groups of transform partitions for such prediction sub-partitions, may be freely implemented as needed, such as rendering the latter choice dependent on the block size with the aim, for instance, to avoid intra-predictions resulting into too less samples per intra-prediction performed or too less intra-prediction width advance, for instance. Note that the coding and decoding of the transform partitions may be done independent among the transform partitions, i.e. that same may be coded/decoded in parallel, thereby not raising any minimum sample per cycle or width advance per cycle issues. This enables a partitioning of an intra-predicted block into partitions with, for instance, less samples than 16, since more than one partition can be intra-predicted and reconstructed in the same cycle. It is advantageous, if all sub-partitions encoded or decoded in the same cycle comprise together at least 16 samples. Again, according to a variant described herein, the coding coded supports many block sizes, and depending on the size of the predetermined intra-predicted block and/or depending on its width and/or height, decoder and encoder set the partitioning in terms of prediction to result into one of the following options:

1) intra-prediction block-globally, i.e. in toto (at once) or as a whole (in other words, e.g., predicting the whole predetermined block at once or, in even other words, predicting all samples within the predetermined block based on neighboring samples which are located outside that predetermined block exclusively, and processing transform partitions of the predetermined block independently (i.e. the transform is executed region-wise within each transform partition)), and/or 2) sequential intra-prediction in units of transform partitions which, then, also act as prediction sub-partitions (in other words, e.g., predicting a transform-partition, coding/decoding the prediction residual for that transform partition with obtaining reconstructed samples within that transform partition and then predicting the next transform partition in the predetermined block using the reconstructed samples obtained for the former transform partition, coding/decoding the prediction residual for this next transform partition and so forth), and/or 3) sequential intra-prediction in units of groups of transform partitions (with each transform partition belonging exactly to one partition group) (in other words, e.g., predicting a group of transform-partitions, i.e. a prediction sub-partition, based on neighboring samples which are located outside that prediction sub-partition exclusively, coding/decoding the prediction residual for that prediction sub-partition with obtaining reconstructed samples within that prediction sub-partition in units of the transform partitions within that prediction sub-partition (i.e. the transform is executed region-wise within each transform partition) and then predicting the next group of transform partitions, i.e. the next prediction sub-partition, in the predetermined block using reconstructed samples including ones obtained for the former prediction sub-partition, but excluding ones located inside this next prediction sub-partition, coding/decoding the prediction residual for this next prediction sub-partition in units of transform partitions and so forth).

Accordingly, in accordance with a first aspect of the present application, a decoder for block-based decoding of a picture from a data stream, is configured to decode an intra-coding mode for a predetermined block of the picture from the data stream. The decoder is configured to decode a partition dimension flag for the predetermined block of the picture from the data stream and set a partition dimension depending on the partition dimension flag to be horizontal or vertical. In other words the partition dimension flag indicates whether the partition dimension is horizontal or vertical. The decoder is configured to partition, along the predetermined dimension (i.e. along the partition dimension), the predetermined block into transform partitions which are as wide as the predetermined block perpendicular to the predetermined dimension. The transform partitions can be associated with vertically stacked horizontal blocks, if the partition dimension is vertical, and the transform partitions can be associated with vertical blocks arranged horizontally side by side, if the partition dimension is horizontal. For each transform partition, the decoder is configured to decode a transform of a prediction residual from the data stream. Furthermore the decoder is configured to intra-predicting the predetermined block depending on one or more already reconstructed samples neighboring the predetermined block in a manner depending on the intra-coding mode to obtain a predictor for the predetermined block and reconstructing the predetermined block by correcting the predictor within each transform partition using the transform of the prediction residual decoded for the respective transform partition.

According to a first option the decoder is configured to sequentially intra-predict for one transform partition after the other a predictor and reconstruct the transform partition by correcting the predictor within each transform partition using the transform of the prediction residual decoded for the respective transform partition.

According to a second, alternative option, the decoder is configured to intra-predict for each transform partition a predictor and decode for each transform partition a transform of a prediction residual from the data stream. Then the decoder is configured to reconstruct the predetermined block by correcting the predictors using the transform of the prediction residual decoded for the respective transform partition. Thus first all predictors are intra-predicted and all transforms of prediction residuals are decoded and then all transform partitions are reconstructed by correcting the predictor within each transform partition using the transform of the prediction residual decoded for the respective transform partition. Thus, for example, in one step all predictors are corrected.

In contrast, according to the first option, one transform partition after the other is reconstructed. In other words, according to the first option, for a current transform partition a predictor is intra-predicted and corrected and afterwards for a subsequent transform partition a new predictor is intra predicted and corrected.

According to a third, alternative option, the decoder is configured to intra-predict the whole predetermined block in one step to obtain a prediction signal (i.e., a predictor) and divide this prediction signal, e.g., into predictors for transform partitions of the predetermined block. According to an embodiment, each predictor is associated with a different transform partition. The transform partitions are, for example, processed independently by the decoder. Thus, for example, the decoder is configured to decode for each transform partition a transform of a prediction residual from the data stream and reconstruct the predetermined block by correcting the predictors using the transform of the prediction residual decoded for the respective transform partition. Alternatively this is not performed for the whole block at once, but for sub-partitions of the predetermined block which can be divided further into transform partitions. In this case, for example, the decoder is configured to intra-predict a sub-partition of the predetermined block in one step to obtain a prediction signal (i.e., a predictor) and divide this prediction signal, e.g., into predictors for transform partitions of the sub-partition of the predetermined block.

According to an embodiment, the decoder is configured to divide the predetermined block depending on the block size into sub-partitions, wherein a minimum prediction width of 4 is established to reduce the hardware implementation complexity. The invention is not limited by the following examples for different partitioning's performed by the decoder. It is clear, that also other sub-partitions and/or transform partitions can be achieved by the decoder.

4×4 blocks (example 1)
Hor. Split: One 4×4 PU (prediction unit) and 4 independent 4×1 TUs (transform unit).
Ver. Split: One 4×4 PU and 4 independent 1×4 TUs.
In other words the whole 4×4 block is predicted at once and then divided into 4 transform partitions to be processed independently.

8×4 blocks (example 2)
Hor. Split: Two 8×2 PUs and four 8×1 TUs. The second PU is predicted using the reconstructed samples of the second TU.
Ver. Split: Two 4×4 PUs and four 2×4 TUs. The second PU is predicted using the reconstructed samples of the second TU.
In other words the 8×4 block is divided into two sub-partitions (i.e. the PUs) and each sub-partition is divided into 2 transform partitions to be processed independently.

4×8 blocks (example 3)
Hor. Split: Two 4×4 PUs and four 4×2 TUs. The second PU is predicted using the reconstructed samples of the second TU.
Ver. Split: One 4×8 PUs and four independent 1×8 TUs.
In other words, at the horizontal split, the 4×8 block is divided into two sub-partitions (i.e. the PUs) and each sub-partition is divided into 2 transform partitions to be processed independently and, at the vertical split, the whole 4×8 block is predicted at once and then divided into 4 transform partitions to be processed independently.

4×8 blocks (example 3'; an alternative to example 3)

Hor. Split (no modification compared to treatment of sub-partitions in terms of both prediction as well as transform residual coding/decoding): Two 4×4 PUs are used which concurrently form two 4×4 TUs. The second PU is predicted using the reconstructed samples of the first PU.

Ver. Split (modified): One 4×8 PUs and two independent 2×8 Tus.

In other words, at the horizontal split, the 4×8 block is divided into two sub-partitions (i.e. the PUs) and each sub-partition is ends-up into 1 transform partition and, at the vertical split, the whole 4×8 block is predicted at once and then divided into 2 transform partitions to be processed independently.

4×M blocks (example 4)

The whole 4×M block is predicted at once and then divided into 4 1×M transform partitions to be processed independently.

4×M blocks (example 4'; with M>8)

Hor. Split (no modification compared to treatment of sub-partitions in terms of both prediction as well as transform residual coding/decoding): The 4×M block is predicted in four PUs of 4×(M/4) each of which concurrently is one of the four transform partitions Vert. Split: The whole 4×M block is predicted at once and then divided into 4 1×M transform partitions to be processed independently.

8×N blocks (example 5)

The 8×N block is divided into two 4×N sub-partitions which can be further divided into 4 1×N transform partitions.

8×N blocks (example 5'; with N>4)

Hor. Split (no modification compared to treatment of sub-partitions in terms of both prediction as well as transform residual coding/decoding): The 8×N block is divided into four 8×(N/4) sub-partitions (for sake of prediction as well as transform residual coding/decoding).

Vert. Split: The 8×N block is divided into two 4×N sub-partitions (for sake of prediction) which can be further divided into 2 2×N transform partitions.

The examples outlined above relate to different block sizes and may apply to a codec in accordance with corresponding embodiments (i.e. to decoder and encoder, respectively) individually, altogether or combinations of two or more of them may apply. As may be seen, in accordance with an embodiment, for at least one predetermined block size (compare examples 3 to 5, for instance), there may be a difference in the decision regarding how to choose among the aforementioned options 1 to 3 (among two out of 1 to 3) depending on the split direction: While one option is selected for a horizontal split such as option 2, where each TU is also a PU and the number of PUs and the number of TUs are, thus, the same, a different option may be chosen for a vertical split such as option 1, where the whole block acts as PU, but is divided into several Tus and the number of PUs and the number of TUs, thus, differ, or option 3, where the predetermined block is divided into PUs, each of which is further divided into TUs and the number of PUs and the number of TUs, thus, differ. Additionally or alternatively, for another block size (compare example 2), this decision may end-up into the same option irrespective of the split direction. The just-mentioned dependency of the selection among the options on the split direction may, thus, come in addition to the already mentioned block size direction, but naturally it could apply without the latter.

An embodiment according to this invention is related to an encoder for block-based encoding of a picture into a data stream, configured to encode an intra-coding mode for a predetermined block of the picture into the data stream. The encoder is configured to encode a partition dimension flag for the predetermined block of the picture into the data stream which signals that a partition dimension is to be set to be horizontal or vertical. In other words the partition dimension flag indicates whether the partition dimension is horizontal or vertical. The encoder is configured to partition, along the predetermined dimension (i.e. along the partition dimension), the predetermined block into transform partitions which are as wide as the predetermined block perpendicular to predetermined dimension. The transform partitions can be associated with vertically stacked horizontal blocks, if the partition dimension is vertical, and the transform partitions can be associated with vertical blocks arranged horizontally side by side, if the partition dimension is horizontal. Furthermore the encoder is configured to intra-predicting the predetermined block depending on one or more already reconstructed samples neighboring the predetermined block in a manner depending on the intra-coding mode to obtain a predictor for the predetermined block. For each transform partition, the encoder is configured to encode a transform of a prediction residual into the data stream, so that the predetermined block is reconstructible by correcting the predictor within each transform partition using the transform of the prediction residual encoded for the respective transform partition.

The encoder as described above as well as methods performed by any herein described encoders and decoders and a data stream generated by the method performed by any of the herein described encoders are based on the same considerations as the above-described decoder. The methods can, by the way, be completed with all features and functionalities, which are also described with regard to the decoder and/or encoder.

BRIEF DESCRIPTION OF THE DRAWINGS

Embodiments of the present invention will be detailed subsequently referring to the appended drawings, in which.

DETAILED DESCRIPTION OF THE
INVENTION

The drawings are not necessarily to scale, emphasis instead generally being placed upon illustrating the principles of the invention.

The following description of the figures starts with a presentation of a description of encoder and decoder of a block-based predictive codec for coding pictures of a video in order to form an example for a coding framework into which embodiments for an intra-prediction codec may be built in. The former encoder and decoder are described with respect to FIGS. 1 to 3. Thereinafter the description of variants of the ISP concept are presented along with a description as to how such concepts could be built into the encoder and decoder of FIGS. 1 and 2, respectively, although the concepts described with the subsequent FIG. 4 and following, may also be used to form encoders and decoders not operating according to the coding framework underlying the encoder and decoder of FIGS. 1 and 2. Later on, embodiments are described which make use of ISP, but are improved in terms of implementation efficiency. Also, embodiments are described which make use of a variant of partition-based intra coding.

Figure 1:
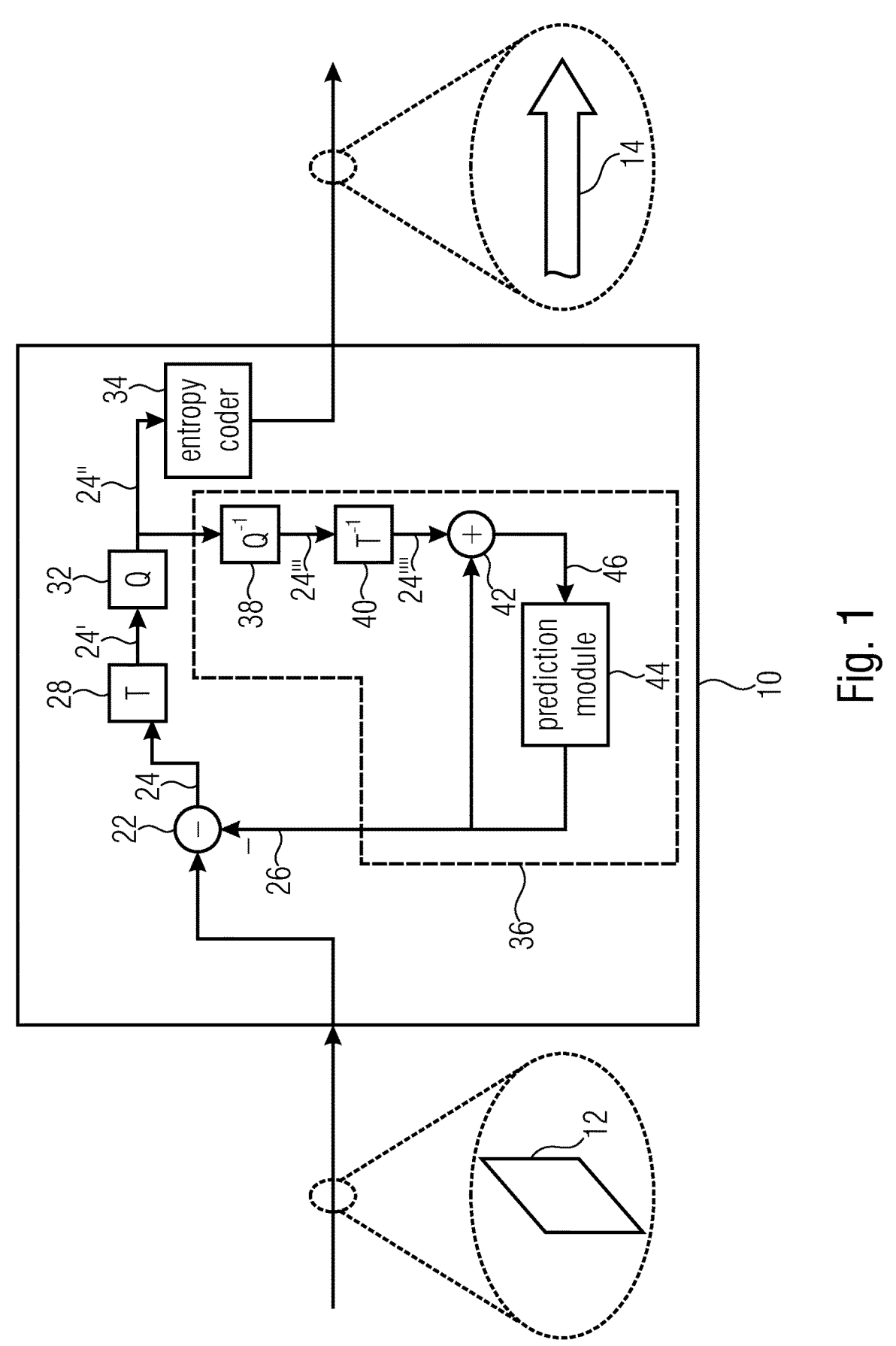
FIG. 1 shows a block diagram of an apparatus for predictively coding a picture as an example for an encoder where an ISP concept could be implemented.
Figure 2:
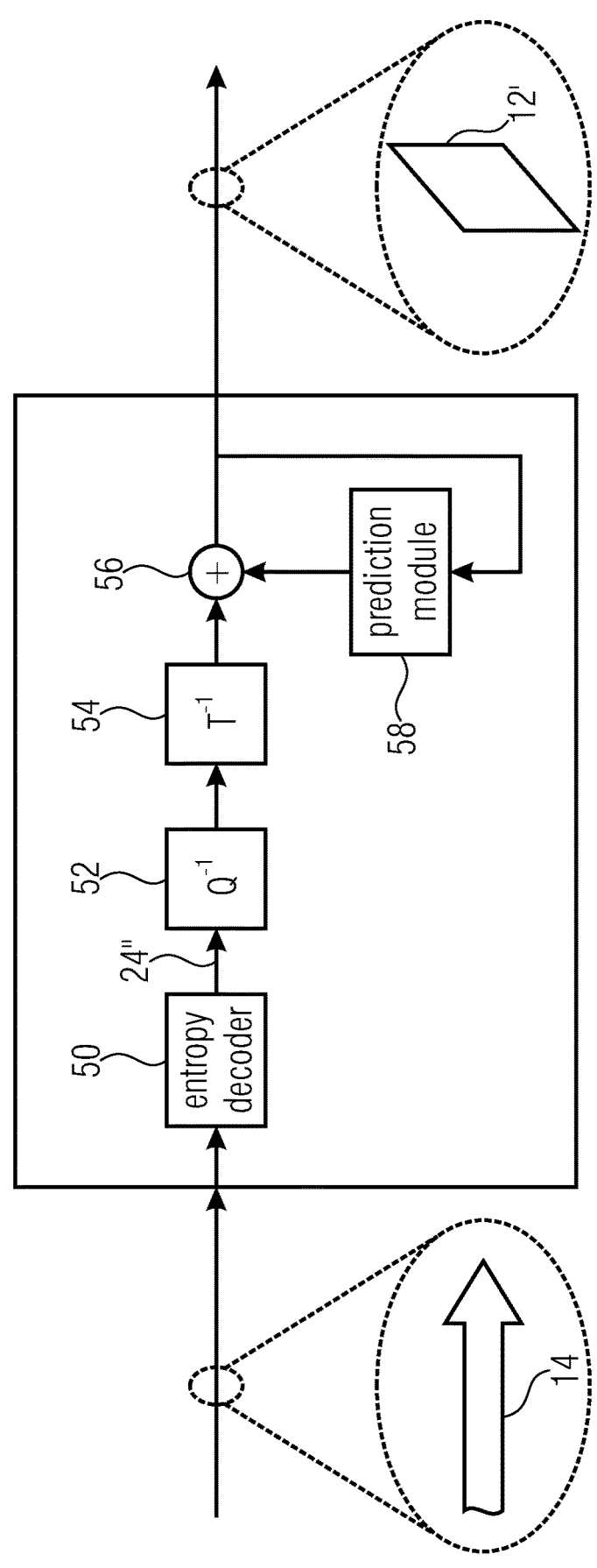
FIG. 2 shows a block diagram of an apparatus for predictively decoding a picture, which fits to the apparatus of FIG. 1, as an example for decoder where an ISP concept could be implemented.

FIG. 1 shows an apparatus for predictively coding a picture 12 into a data stream 14 using exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. the picture 12. The prediction residual signal former 22 may, for instance, be a subtractor which subtracts the prediction signal from the original signal, i.e. picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 24 is generated by a prediction stage 36 of encoder 10 on the basis of the prediction residual signal 24" decoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra prediction, and/or temporal prediction, i.e. inter prediction.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24″ from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24″ so that, as shown in FIG. 2, the output of combiner 56 results in the reconstructed signal, namely picture 12′.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12′, respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, or instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24″, data stream 14 may have encoded thereinto coding mode parameters for assigning the coding modes to the various blocks, prediction parameters for some of the blocks, such as motion parameters for inter-coded segments, and optional further parameters such as parameters controlling and signaling the subdivision of picture 12 and 12′, respectively, into the segments. The decoder 20 uses these parameters to subdivide the picture in the same manner as the encoder did, to assign the same prediction modes to the segments, and to perform the same prediction to result in the same prediction signal.

Figure 3:
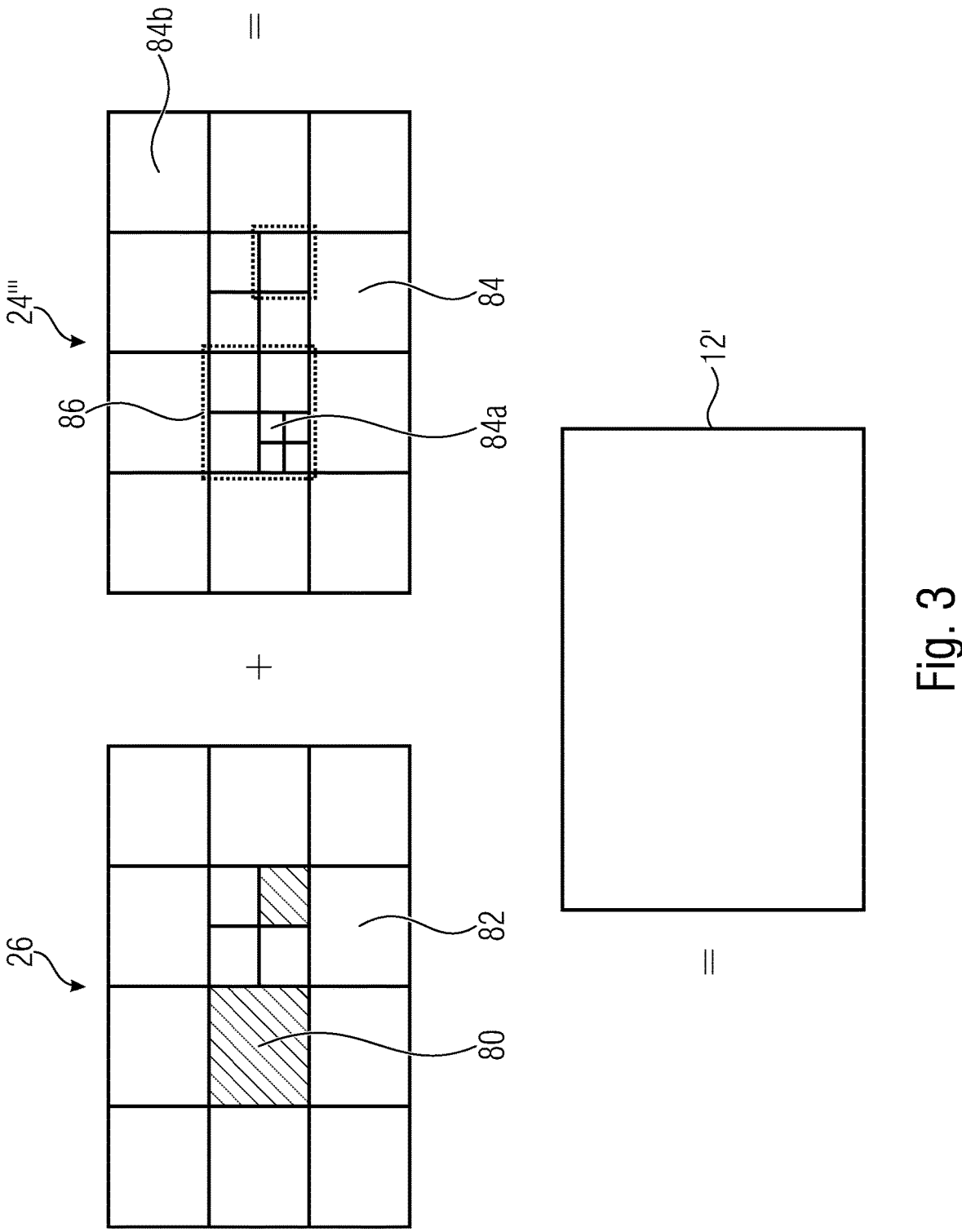
FIG. 3 shows a schematic diagram illustrating an example for a relationship between the prediction residual signal, the prediction signal and the reconstructed signal so as to illustrate possibilities of setting subdivisions for coding mode selection, transform selection and transform performance, respectively.

FIG. 3 illustrates the relationship between the reconstructed signal, i.e. the reconstructed picture 12′, on the one hand, and the combination of the prediction residual signal 24″″ as signaled in the data stream, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of blocks or blocks, or a multi-tree subdivision of picture 12 into leaf blocks of varying size, such as a quadtrec subdivision or the like, into blocks, wherein a mixture thereof is illustrated in FIG. 3 where the picture area is first subdivided into rows and columns of tree-root blocks which are then further subdivided in accordance with a recursive multi-trec subdivisioning. Again, data stream 14 may have an intra-coding mode coded thereinto for intra-coded blocks 80, which assigns one of several supported intra-coding modes to the respective intra-coded block 80. Further details are described below. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively. The prediction residual signal 24″″ in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12′, respectively, into blocks, namely one subdivisioning into coding blocks 80 and 82, respectively, and another subdivision into blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80/82 so that any border between two blocks of blocks 80 and 82 overlays a border between two blocks 84, or alternatively speaking each block 80/82 either coincides with one of the transform blocks 84 or coincides with a cluster of transform blocks 84.

However, the subdivisions may also be determined or selected independent from each other so that transform blocks 84 could alternatively cross block borders between blocks 80/82. As far as the subdivision into transform blocks 84 is concerned, similar statements are thus true as those brought forward with respect to the subdivision into blocks 80/82, i.e. the blocks 84 may be the result of a regular subdivision of picture area into blocks/blocks, arranged in rows and columns, the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 illustrates that the combination of the prediction signal 26 and the prediction residual signal 24″″ directly results in the reconstructed signal 12'. However, it should be noted that more than one prediction signal 26 may be combined with the prediction residual signal 24''' to result into picture 12' in accordance with alternative embodiments.

In FIG. 3, the transform segments 84 shall have the following significance. Transformer 28 and inverse transformer 54 perform their transformations in units of these transform segments 84. For instance, many codecs use some sort of DST or DCT for all transform blocks 84. Some codecs allow for skipping the transformation so that, for some of the transform segments 84, the prediction residual signal is coded in in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform

DST-IV, where DST stands for Discrete Sine Transform

DCT-IV

DST-VII

Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)

Inverse DST-IV

Inverse DCT-IV

Inverse DST-VII

Identity Transformation (IT)

The subsequent description provides more details on which transforms could be supported by encoder 10 and decoder 20. In any case, it should be noted that the set of supported transforms may comprise merely on transform such as one spectral-to-spatial or spatial-to-spectral transform.

As already outlined above, FIGS. 1-3 have been presented as an example where the intra-prediction concepts described further below may be implemented. Insofar, the encoder and decoder of FIGS. 1 and 2, respectively, represent possible implementations of the encoders and decoders described herein below. As will be outlined in more detail below, when having the subsequently explained embodiments for intra-prediction according to the present application built into the encoder and decoder of FIGS. 1 and 2, the encoder of FIG. 1 and the decoder of FIG. 2 support, at least as one option, to process an intra-predicted block 80 in the manner outlined in more detail below. Thus, the embodiments described hereinafter refer to an encoder which equals the encoder 10 of FIG. 1 which treats intra-coded blocks 80 in the manner outlined in more detail below and the same applies with respect to the decoder of FIG. 2 which, thus, represents an example for a decoder according to an embodiment where intra-coded blocks are treated in the manner outlined in more detail below. FIGS. 1 and 2 are, however, only specific examples. An encoder according to embodiments of the present application may, however, perform block-based encoding of a picture 12 using the concept outlined in more detail below and being different from the encoder of FIG. 1 such as, for instance, in that same is no video encoder, in that same does not support inter-prediction, or in that the subdivision into blocks 80 is performed in a manner different than exemplified in FIG. 3, or—depending on the embodiment—even in that this encoder does not use transform prediction residual coding with coding the prediction residual, for instance, in spatial domain directly instead.

Likewise, decoders according to embodiments of the present application may perform block-based decoding of picture 12' from data stream 14 using the intra-prediction coding concept further outlined below, but may differ, for instance, from the decoder 20 of FIG. 2 in that same is no video decoder, but a still picture decoder, in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

Figure 4:
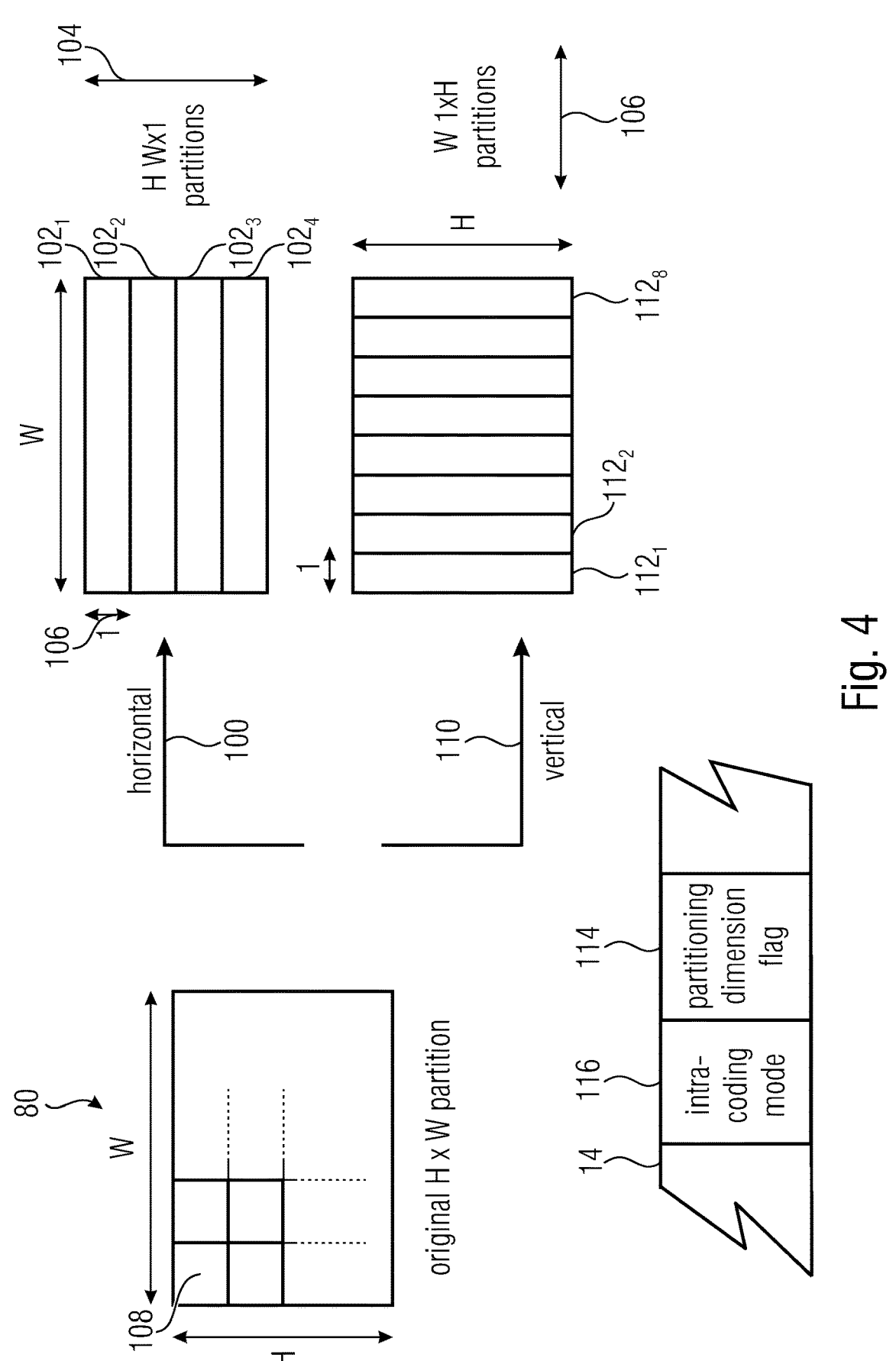
FIG. 4 shows a schematic diagram illustrating a partitioning treatment of an intra-coded block in accordance with a ISP variant allowing for a selection between different partitioning dimensions, i.e., horizontal and vertical splits.

Having said this, the following description first concentrates on the description of ISP based intra-prediction. According to ISP intra-prediction, intra-predicted blocks such as block 80 in FIG. 4 are allowed to be split into one-dimensional horizontal partitions or one-dimensional vertical partitions. The availability of treating blocks in that manner may be offered for intra-predicted blocks 80 of any size or be restricted to blocks 80 within a predefined range of blocks sizes only such as blocks greater than a certain size. "One-dimensional" refers to the fact that—when related to partitions being the result of partitioning—the partitions are merely one sample wide along partition dimension. One-dimensionality of the partitioning modes discussed herein, however, refers to the fact that the partitioning takes place along a certain dimension, with the resulting partitions being like stripes extending completely over the block in a direction transverse to the partitioning direction. See, for instance, FIG. 4. FIG. 4 shows the intra-predicted block 80, i.e., the block to be decoded or the block to be encoded, at the left hand side. It has dimension W×H. That is, it is a W×H dimensional block where H is the height and W is the width of block 80 measured in samples, respectively. According to FIG. 4, there are two split or partitioning options available, namely a horizontal split 100 according to which block 80 is split or partitioned into a number of partitions $102_1$, $102_2$, $102_3$ and $102_4$ along a vertical axis, i.e., the partition dimension 104.

According to the example of FIG. 4, which is the example applied in the following description, each partition $102_1$ to $102_4$ is one sample wide as illustrated by the double headed arrow 106 so that the number of partitions $102_1$ to $102_4$ resulting from block 80 equals H, i.e., the height of block 80 in units of samples 108 of block 80, but it should be clear that the partitioning may be performed by encoder and decoder also according to a different manner agreed between encoder and decoder such as, for instance, a partitioning of block 80 along dimension 104 may be done in a manner leading to a predefined number of partitions $102_i$, the predefined number being greater than two, for instance, or a mixture thereof, with distributing the size of block 80 along the partition dimension evenly onto the predefined number of partitions.

The other coding option depicted in FIG. 4 and indicated by reference sign 110 corresponds to splitting block 80 into vertical partitions $112_1$, $112_2$, . . . $112_8$. That is, according to option 110, block 80 is partitioned into partitions $112_i$ along the horizontal axis, i.e., a horizontal partition dimension 104. In case of option 100, each partition $102_i$ is as wide as block 80, i.e., has the block's width W, whereas the partitions $112_i$ adopt the height H of block 80, i.e. have height H. Summarizing, in a manner similar to the description of option 100, the vertical split 110 may split block 80 into a number W of partitions $112_i$ with W denoting the horizontal width of block 80 measured in samples 108 so that each partition $112_i$ is one sample wide in horizontal direction, wherein, however, the partitioning according to option 110 may also be performed in another manner agreed between encoder and decoder.

Thus, according to FIG. 4, the encoder is free to partition block 80 into H W×1 partitions $102_i$ according to the horizontal split option 100 or W 1×H partitions $112_i$ according to the vertical split option 110, and the split option chosen by the encoder for block 80 may be signaled in the data stream 14 for block 80 such as, for instance, by way of a corresponding partition dimension flag 114 in data stream 14. It should be clear, however, that embodiments of the present application also cover encoders and decoders which, by default, merely use one of options 100 and 110 without the need for flag 114 in the data stream. Even further, flag 114 may be conveyed in data stream 80 in other examples depending on the intra-coding mode 116 signaled in the data stream 14 for block 80 from encoder to decoder. The intra-coding mode may, as outlined above, indicate one out of a set of available/supported intra-coding modes including, for instance, angular modes and, optionally, one or more non-angular modes such as a DC mode or a planar mode. That is, flag 114 may, in accordance with alternative embodiments not further discussed hereinafter, be conveyed in data stream 14 in a manner conditionally depending on the intra-coding mode 116. According to the embodiments described hereinafter, flag 114 is present in data stream 14 for block 80 independent on the intra-coding mode 116 signaled for block 80 in data stream 14. A dependency may be, however, be present relative to a flag switching between the partitioning handling of intra-coded block 80 just-discussed and a different way of handling the intra-coding of block 80 as will be outlined hereinafter.

Figure 5:
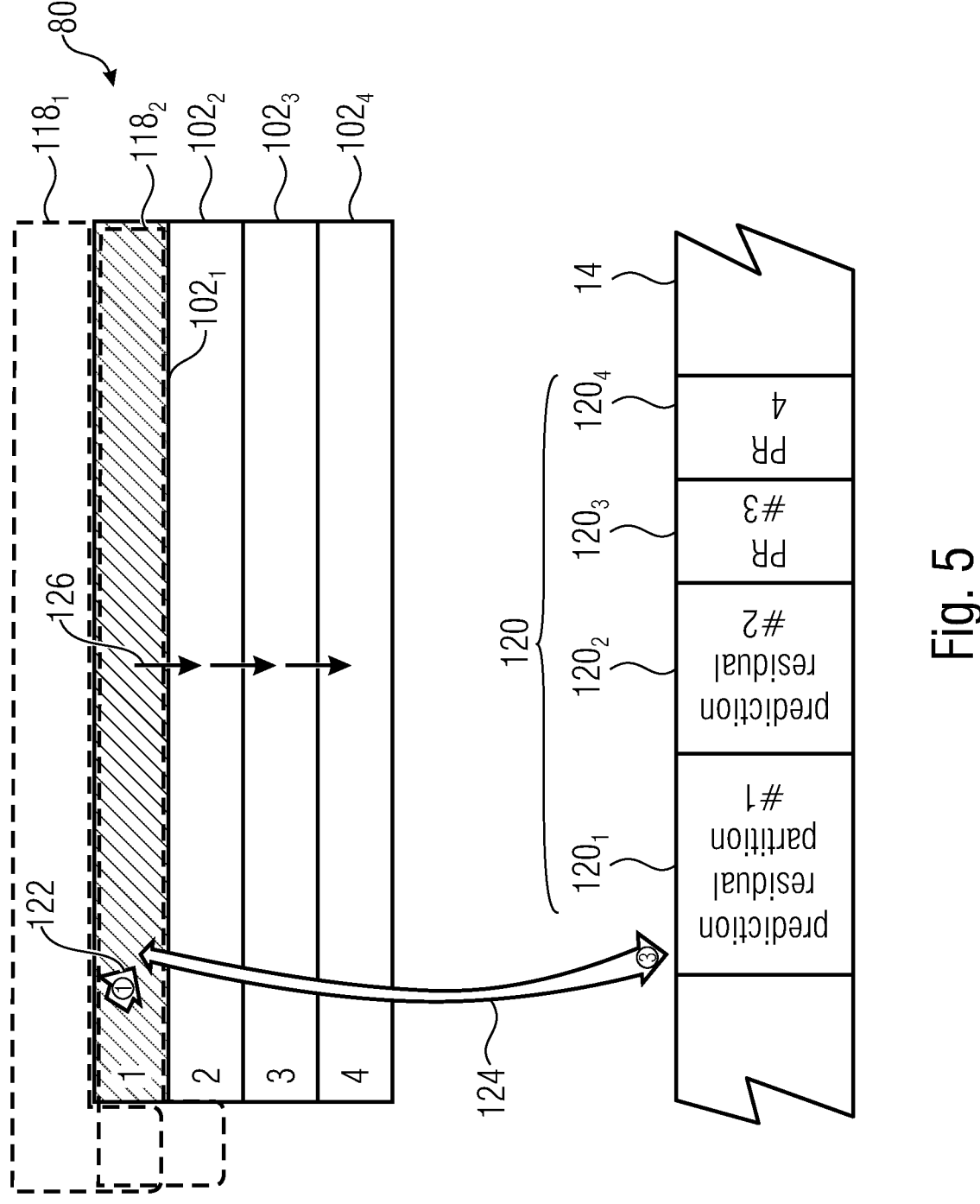
FIG. 5 shows a schematic diagram illustrating the sequential processing of the partitions of an ISP-coded block.

According to ISP, each of the partitions 102/112 is predicted, transformed, quantized and coded individually, with sequentially processing the partitions in this manner. Therefore, the reconstructed samples of a certain partition will be able to be used to predict any following partition 102/112 in partition order among the partitions into which block 80 has been partitioned, and in this manner, the process of intra-prediction cycles through the partitions 102/112 into which block 80 has been partitioned. FIG. 5 exemplarily shows an intra-predicted block 80 split according to option 100. Each partition $102_1$ to $102_4$ of block 80 is subject to prediction, i.e., derivation of the predictor of the respective partition $102_i$, and prediction residual related task, namely the correction of the predictor using the prediction residual. The latter task may be performed by combining the prediction residual and the predictor. This is done in the decoder for reconstruction. The encoder performs as prediction residual related task the determination of the prediction residual involving, for instance, transformation and quantization, as well as the correction of the predictor using the prediction residual, namely in order to keep the prediction loop synchronized to the decoder by filling the decoded picture buffer in the encoder with the reconstruction of the picture. The just-mentioned tasks, i.e. prediction and residual handling, are performed individually for, and sequentially among, partitions $102_1$ to $102_4$. After those two steps for a currently processed partition, the next partition $102_i$ according to the partition order is processed the same way. The partition order is exemplarily illustrated in FIG. 5 using the three arrows 126.

FIG. 5 illustrates that the partition including the upper most left pixel of block 80 would be treated first before proceeding with the immediately lower neighbor partition $102_2$ and so forth, corresponding to the assignment of indices to partitions $102_1$ to $102_4$ in FIG. 5, but this order is merely an example and as the following description will render clear, this partition order may be chosen in a manner depending on other settings such as the intra-coding mode and/or the size of block 80 with the former dependency being discussed hereinafter.

In the examples discussed further below, the partition order 126 merely varies between ones traversing the partitions 102/112 in a manner so that immediately succeeding partitions immediately neighbor each other so that, in case of split type 100, the partition order leads from top to bottom or bottom to top, and in case of partition type 110 from left to right or right to left, respectively. It should be mentioned, however, that other examples are imaginable too. For instance, the partition order could be chosen in a manner so that the partitions are scanned in the just-outlined neighboring order in two scans with, in the first scan, processing every second partition from top to bottom, bottom to top, left to right or right to left, whatever applies, and then processing in the same direction of order, or in the opposite direction, the remaining partitions therebetween.

In any case, FIG. 5 illustrates the first partition $102_1$ to be processed first and to be the currently processed partition. For the first partition, here exemplarily $102_1$, the set of neighboring samples $118_1$ used to form the predictor for partition $102_1$ may merely be chosen on the basis of samples lying outside the boarders of block 80 as at the time of processing the first partition of block 80, no sample of block 80 has been processed yet, i.e., reconstructed or encoded. That is, the samples in set $118_1$ are already reconstructed in the encoder using any prediction and correction of the corresponding predictor using a prediction residual transmitted in the data stream. They belong to previously coded/decoded picture blocks and may be inter-coded or intra-coded or any other coded block. As to number and exact position of the samples of the set $118_1$ of neighboring samples which are used for forming the predictor of the first partition $102_1$, same depend on the intra-coding mode assigned to block 80. This intra-coding mode is jointly, or equally, used for the processing of every partition of block 80 as will be discussed in the following. In order to finish the processing of the first partition $102_1$, the predictor for this partition $102_1$ derived in decoder and encoder by filling this partition $102_1$ depending on the one or more already reconstructed/encoded samples in set $118_1$, its prediction residual is determined as far the encoder is concerned, namely by transformation and quantization as outlined above, and then this prediction residual is—in the version transmitted in the data stream, i.e. including the quantization loss—used for reconstruction of this partition $102_1$ by correcting the predictor using the prediction residual in the data stream 14. FIG. 5, for instance, shows the prediction residual for partition $102_1$ exemplarily at $120_1$. That is, $120_1$ comprises the transform coefficients corresponding to the transform of the prediction residual of partition $102_1$ with a description of data $120_1$ being discussed in more detail below.

Turning now to the next partition in partition order, namely partition $102_2$ in the example of FIG. 5. The situation has changed insofar as the set of neighboring already reconstructed/encoded samples used for deriving the predictor for partition $102_2$ may now be composed of samples located outside block 80 and/or samples within block 80, namely ones located in any already processed partition, here currently partition $102_1$ in the example of FIG. 5, as for these samples the prediction residual has already been determined and is already available in data stream 14. That is, encoder and decoder derive the predictor for this partition $102_2$ followed by prediction residual determination in the encoder and prediction residual usage for correction of the predictor in encoder and decoder, respectively. This process is then continued with the next partition in line, i.e., the next partition in partition order, thereby sequentially handling all partitions of block 80.

As has already been mentioned above, it could be possible that the partition order 126 is chosen in another manner than traversing the partition so that immediately consecutive partitions are immediate partition neighbors. That is, the partition order may jump from one partition to the next partition. This implies that the sets 118$_i$ of neighboring samples used for deriving the respective predictor by filling the respective partitioning 102$_i$ is not restricted to immediate sample neighbors of the respective partition as illustrated in FIG. 5. This also pertains the selection of the start of the partition order 126. Imagine, for instance, partition 102$_4$ was the first partition in partition order. Then, its predictor could be derived by filling same depending on a set of neighboring samples 118$_4$, not illustrated in FIG. 5, which collects samples located alongside the circumference of block 80 to the left and to the top of block 80. Some of samples in set 118$_4$ would not immediately neighbor partition 102$_4$. This would, by the way, correspond to the situation of filling the last sample row in the usual intra-prediction filling of block 80 en bloc. The just-mentioned possibility is also true with respect to any subsequently processed partition, i.e., the second and further partitions in partition order. That is, their neighbor sample set 118$_i$ may also contain samples not immediately neighboring the respective partition 102$_i$. And even further, in case of not restricting the partition order to traverse the partitions in the manner so that consecutive partitions are immediate neighbors of each other, then the set of reference samples 118$_i$ of any second or subsequently processed partition 102$_i$ may not only collect samples lying to the left and to the top of the respective partition 102$_i$, but may also be samples lying below the respective partition 102$_1$ depending on whether any partition of block 80 has been processed earlier than partition 102$_1$ according to the partition order. That is, set 180$_i$ may comprise samples located on more than two sides of partition 102$_i$.

Briefly summarizing, FIG. 5 showed the sequential processing of the partitions 102/112 of a block 80 here exemplarily with respect to horizontal partitions, but the same description also applies to the vertical mode 110 with respect to vertical partitions 112$_i$. For each partition 102$_i$, corresponding prediction residual 102$_i$ is contained in data stream 14. Data 120$_1$ to 1204 together forms the prediction residual for block 80, namely 120. It should be recalled that transform residual coding may, in accordance with an alternative embodiment of the present application, not be used, i.e., the prediction residual 120 of block 80 may be signaled in the data stream 14, for instance, in spatial domain directly. In this case, the data 120$_1$ to 1204 for the various partitions 102$_1$ to 102$_4$ may not contain partition separate fields in data stream 14 as illustrated in FIG. 5 where each data portion 120$_i$ represents the signaling for a certain transform of the respective partition 102$_i$. Rather, the prediction residual 120 for block 80 could, in that case, form one field of data 14. The decoder would, at the time of processing a certain partition 102$_i$, collect the information on the prediction residual for this partition 102$_i$ from field 120 in this alternative embodiment. This procedure could also be applied when using an exactly reversible version of the transformation so that the quantization may be done in spatial domain.

Thus, FIG. 5 showed that in an encoder and decoder, two tasks are performed for each partition 102$_i$, namely: 1) the prediction derivation task 122 yielding the prediction or predictor for the respective partition 102$_1$, i.e., a predicted sample value for each sample of the respective partition 102$_i$ and 2) the prediction residual related task performed afterwards, namely the prediction residual derivation at the encoder including the quantization of the prediction residual for sake of its entry into data stream 14, and the reconstruction of the samples of the respective partition 102;

by combining or correcting the prediction residual and the predictor so as to gain reconstructed samples for this partition 102$_i$. The latter reconstructed samples may serve as a reservoir for neighboring sample sets 118$_j$ of subsequently processed partitions 102$_j$ following in partition order 126 for sake of the prediction derivation task.

Figure 6:
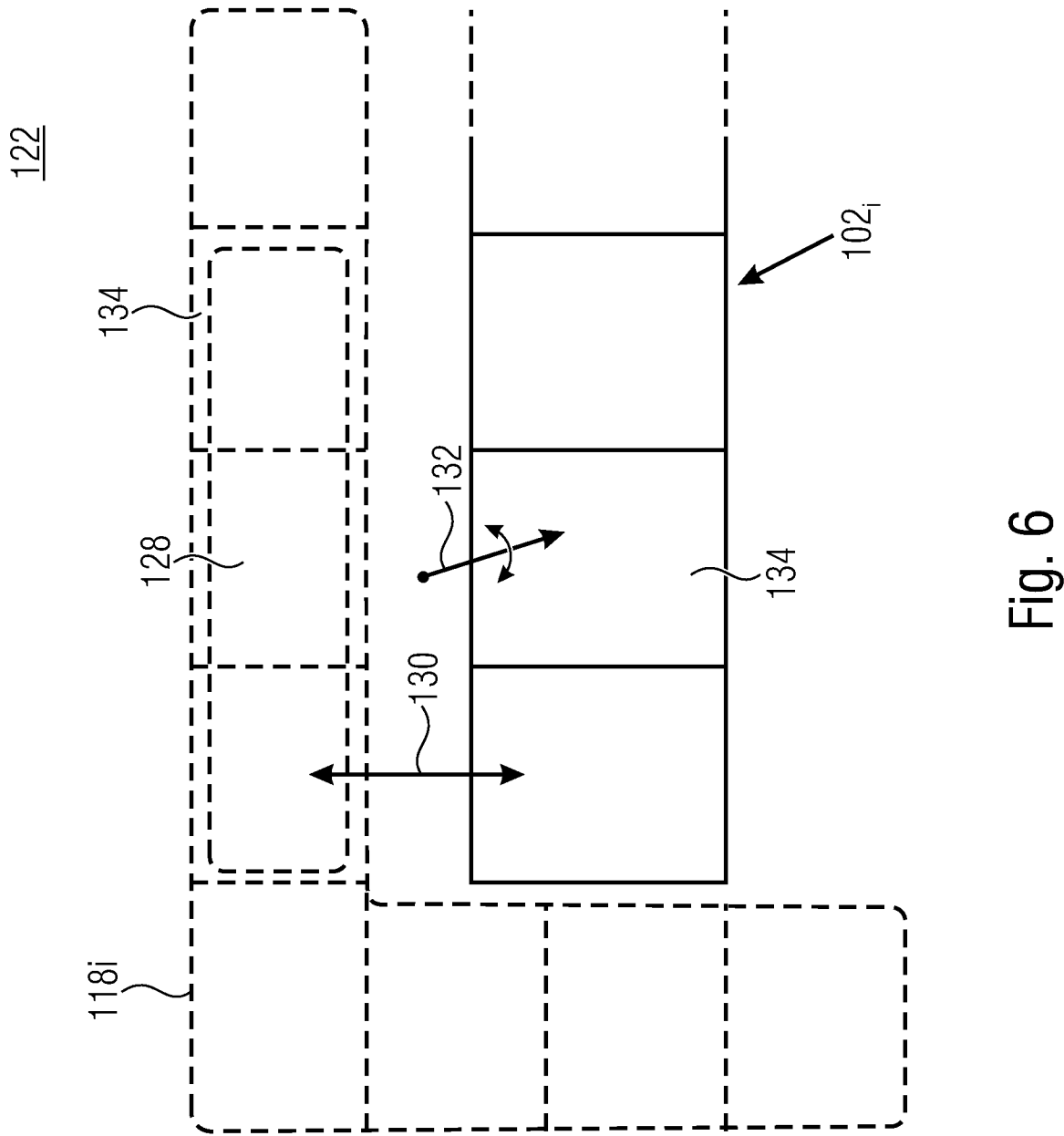
FIG. 6 shows a schematic diagram illustrating the predicted derivation of filling process for a partition.

Before proceeding with the further description of details of ISP concept possibilities, FIG. 6 illustrates the process of prediction derivation 122 by filling a currently processed partition 102$_i$ wherein it should be recalled that the illustration with respect to a horizontal partition 102 has been chosen merely illustratively and that the same description also relates to vertical partitions 112. FIG. 6 shows the currently processed partition 102$_i$ and its corresponding set of neighboring samples 118$_i$ already reconstructed/encoded. As already denoted above with respect to FIG. 5, set 118$_i$ may not be restricted to samples 128 directly neighboring, or being adjacent to, partition 102$_i$.

However, due to the partitioning, the mean distance 130 between samples of partition 102$_i$ and samples 128 of set 118$_i$, when averaged over all samples of block 80, is lower than compared to performing intra-prediction of block 80 as known from, for instance, H.264 or HEVC. As described with respect to FIG. 5, the predictor derivation or filling 122 is performed for each partition 102$_i$ using the intra-prediction mode associated with block 80, with this mode indicating one of a set of available intra-prediction modes. This set may comprise angular or directional modes differing from each other in the angle or direction 132 along which the sample content of the neighboring sample set 118$_i$ is copied into samples 134 of partition 102$_i$. In order to perform this copying, the prediction of each sample 134 of partition 102$_i$ may derived on the basis of a number of neighboring samples 134 out of set 118$_i$ located relative to the sample 134 in the direction facing opposite to direction 132. The number is, for instance, defined by a kernel of an interpolation filter used to derive inter-pel positions between the samples 128 of sample set 118$_i$. FIG. 6 illustrates, for instance, that three samples 128 out of set 118$_i$ are used to compute the prediction of one sample 134 out of currently processed partition 102$_i$. Owing to the relatively small mean distance 130, the number of reference samples 134 per sample 134 of partition 102$_i$ may be kept low. More details will be presented hereinafter. For sake of completeness, however, it should be noted that the set of available intra-prediction modes may also comprise a DC mode according to which one DC value is assigned to all samples 134 of partition 102$_i$, with deriving this DC value by performing an averaging on the set of neighboring samples 118$_i$. Further, a planar mode may exist according to which the prediction values for samples 134 are defined by a linear function over the sample positions within partition 102$_i$ with deriving slope and offsets of this linear function on the basis of the neighboring samples 118$_i$. Further, it should be noted that the neighboring set 118$_i$ may be different depending on the intra-prediction mode chosen for block 80 and may be, for instance, particularly different between angular modes and the non-angular modes DC/planar.

For example, in the state-of-the-art JEM decoder, there are 67 intra-prediction modes available: 65 of them are angular modes and two of them, DC and planar, model non-directional textures. The ID partitioning (briefly called ID partition mode) mode, i.e., the predictor derivation 122 performed for the partitions 102/112 outlined above and hereinafter, according to which block 80 is partitioned/split into partitions along dimension 104 with the resulting partitions extending over the complete width of the block transversely to dimension 104 with being one sample wide or more than one sample wide along direction 104, can be combined with any of them or, differently speaking, could be implemented using any of them. As already described with respect to FIG. 5, all partitions 102/112 of one block 80, such as a coding unit CU, use the same associated intra-prediction mode of block 80, thereby avoiding an excessive overhead in signalization as the intra-prediction mode 116 needs to be transmitted in the data stream 14 merely once for block 80.

That is, the prediction 122 may be carried out in the same way as in the two-dimensional case outlined in the JEM decoder. However, merely one line, be it horizontal or vertical, is calculated for a currently processed partition 102/112 so that compared to JEM, the prediction process 122 would be adjusted accordingly. In case of choosing the partition order for traversing the partitions in a manner so that consecutive partitions immediately neighbor each other, the prediction process 122 may correspond to the two-dimensional case of JEM, but merely with respect to the first line, i.e., the one being nearest to the already reconstructed/encoded neighborhood. In some cases, both HEVC and JEM allow the usage of certain filters applied on the reference samples 128 or on the resulting predictor. This is useful in the two-dimensional case to better predict samples within the predict block 80 that are far away from the reference samples 128 to reduce boundary discontinuities. However, by using the partitioning into partitions 102/112, it is possible, and it should be the aim, to exploit the high correlations among nearby pixels.

That is, the reduced mean distance 130 should be exploited. Excessive smoothing would reduce this quality. Accordingly, should the encoder or decoder be able to perform both kinds of intra-predictions, namely intra-prediction using partitioning as outlined with respect of FIGS. 4 to 6 and in the following, then intra-filters, i.e., filters involved in the predictor derivation 122, are either disabled or at least the number of contributing samples 134 per partition sample 134 is reduced relative to the number of samples contributing to one sample in the two-dimensional case where the intra-prediction for block 80 is performed on block or performed according to HEVC, namely decomposed into leaf blocks of a hierarchical quadtree subdivisioning of block 80 into rectangular blocks.

As became clear from the discussion brought forward above, in order to perform the prediction residual related tasks 124, the decoder decodes, for instance, a transform of the respective prediction residual of the currently processed partition from the data stream 14, and performs an inverse transform such as a spectral-to-spatial transformation onto this transform in order yield the prediction residual which is then used to correct the predictor obtained at 122 by combination/addition. The same is done in the encoder in order to keep the prediction loop synchronized with the decoder. In addition, the encoder performs the transformation of the prediction error of the predictor determined using 122 for a currently processed partition, subjects same to a transformation such as a spatial-to-spectral transformation, followed by a quantization of the transform coefficients with then coding the transform into the data stream 14 to yield the corresponding data $120_i$ of the currently processed partition $102_i$. As to the transformation, all partitions 102/112 within block 80 may be treated using this same transformation. It may be a DCT-II except in the case of the planar mode, for instance, where the DST-VII may be used. For this reason, all tools related to the transformation and inverse transformation which encoder and decoder may use for other blocks such as transform skipping, i.e., coding in spatial domain, EMT (EMT=Explicit multiple core transform), NSST (NSST=Mode dependent non-separable secondary transforms) or others, may be disabled if block 80 is coded using intra-prediction mode in the partitioning manner outlined so far with respect to FIGS. 4 to 7 and further outlined below, to avoid unnecessary overhead bits. Even alternatively, the transformation may be a linear transform a type of which is selected based on one or more of the intra prediction mode, an dedicated syntax element and the predetermined partition order.

Figure 7:
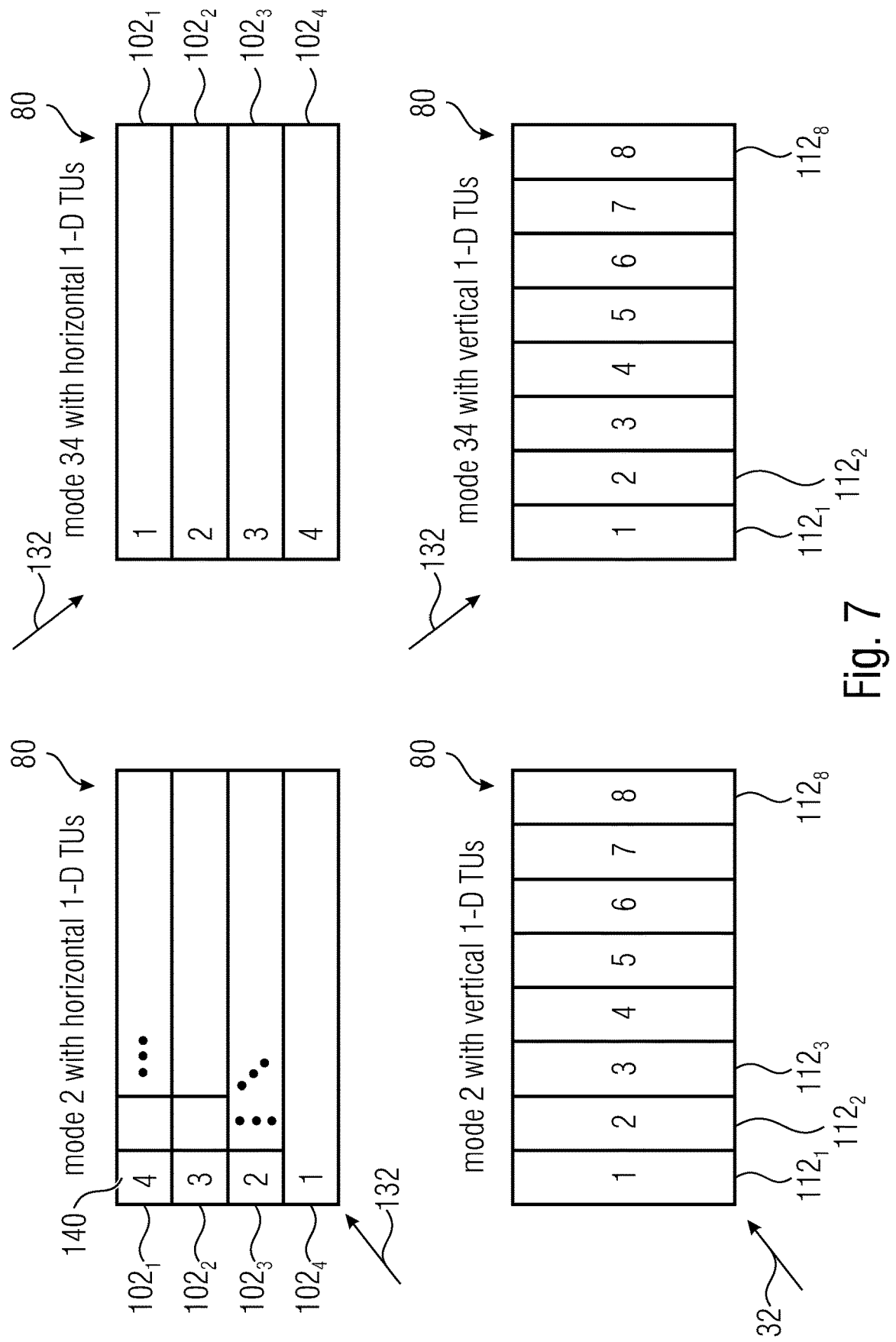
FIG. 7 illustrates examples for ISP blocks split according to horizontal and vertical split mode, respectively, and having two different intra-prediction modes associated therewith, respectively, in order to illustrate a possibility of rendering dependent determination of the partition order on the intra-prediction mode associated with the intra-predicted block.

Some words have already been spent with respect to the partition order 126 using which the partitions 102/112 of currently processed block 80 are sequentially processed. It should be emphasized that this embodiment is merely an example and that partition order may be static in accordance with alternative embodiments, or may be varied in a different manner in accordance with examples are set out below. FIG. 7 indicates by inscribed numbering possible partitions/processing orders illustrated in using arrows 126 in FIG. 5. Here, this order follows the inscribed numbers in ascending order. FIG. 5 represented an example, where the order 126 started with a partition containing the top-left pixel/sample 140 of block 80 with leading downward to the lowest partition. Similarly, if the split type were vertical, then the processing order would start with a left most partition containing the top-left pixel/sample again with leading rightwards. However, this is not the optimal case for all existing intra-prediction modes. This is exemplified in FIG. 7 which shows the vertical and horizontal partitioning of a block 80 for the diagonal modes too, i.e., the copy angle/direction 132 points at 45° from lower-left to the upper-right-hand side, and 34, i.e., the copy angle/direction 132 points at −45° from upper-left to lower-right. In the former case, if the split is horizontal, then starting at the top-left corner of the block 80 would produce partitions whose reconstructed samples would not have any influence on the prediction of the following partition. Consequently, it is more reasonable to start at the bottom-left corner of the block, so that the reconstructed samples of each partition can be used to predict the next partition in partition order. In the vertical split, nevertheless, this is not necessary, as it can be observed in the aforementioned figures. On the other hand, mode 34 does not have any of these problems, given that samples come in both horizontal and vertical splits from both sides. Therefore, the normal processing order may be employed in both splits.

Table 1 shows the complete list of processing orders according to the intra-prediction mode and the split type.

TABLE 1

Processing order according to the intra mode and the split type.
HOR_DIR AND VER_DIR are the horizontal and vertical modes
respectively and VDIA_DIR is the vertical diagonal mode

| Intra Mode | Split Type | Processing Order |
| --- | --- | --- |
| [0, 1] (Non-angular) | Horizontal | Normal |
| [0, 1] (Non-angular) | Vertical | Normal |
| [2, HOR_DIR-1] | Horizontal | Reverse |
| [2, HOR_DIR-1] | Vertical | Normal |

TABLE 1-continued

Processing order according to the intra mode and the split type.
HOR_DIR AND VER_DIR are the horizontal and vertical modes
respectively and VDIA_DIR is the vertical diagonal mode

| Intra Mode | Split Type | Processing Order |
|---|---|---|
| [HOR_DIR, VER_DIR] | Horizontal | Normal |
| [HOR_DIR, VER_DIR] | Vertical | Normal |
| [VER_DIR + 1, VDIA_DIR] | Horizontal | Normal |
| [VER_DIR + 1, VDIA_DIR] | Vertical | Reverse |

Figure 8:
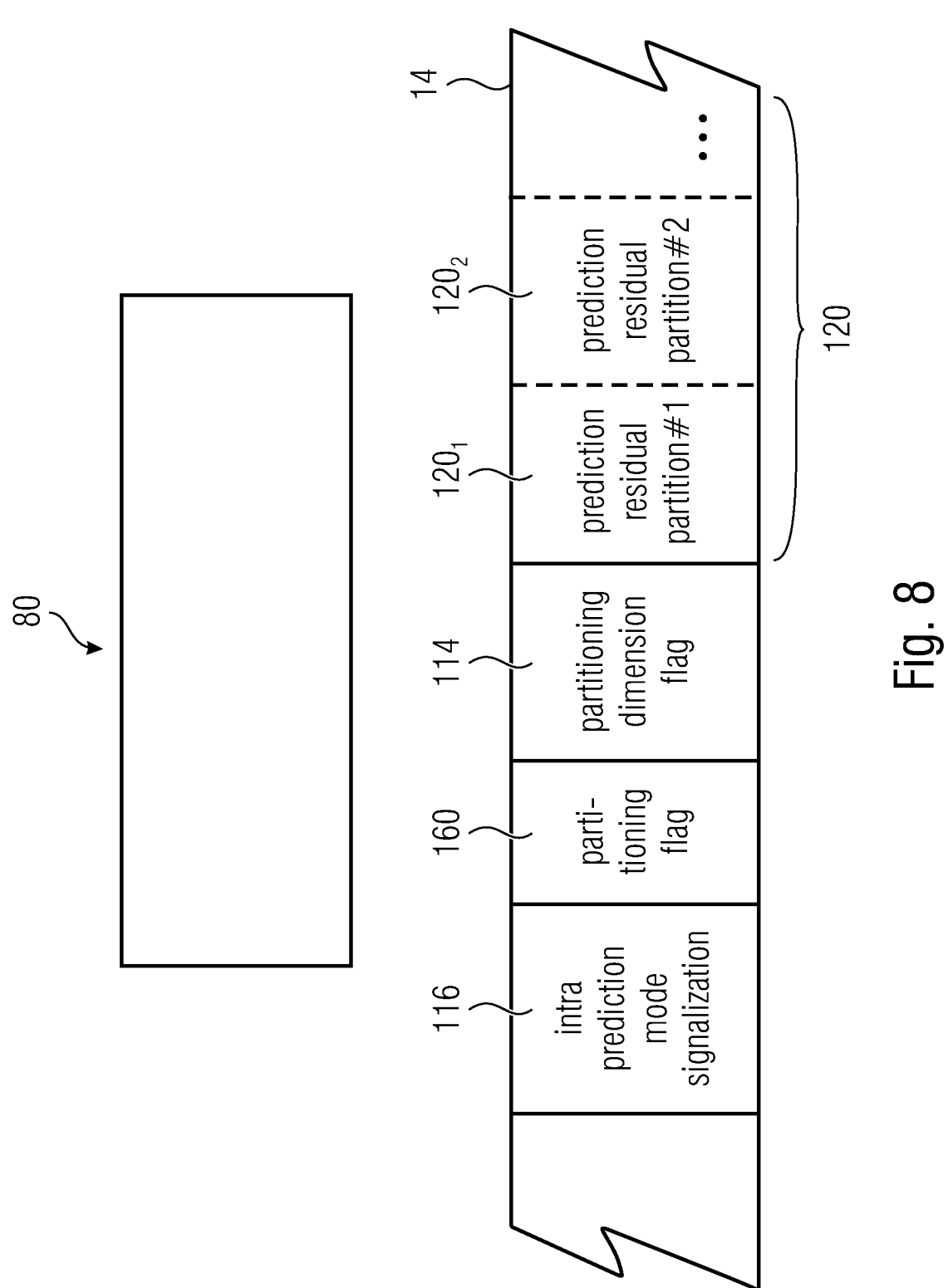
FIG. 8 shows a schematic diagram illustrating a possible signalization spent for an intra-predicted block 80 treated using the partition option.

Summarizing the ISP concepts described so far with respect to signalization overhead, reference is made to FIG. 8. FIG. 8 illustrates as to what is transmitted for a block 80 in accordance with an embodiment of the present application. In particular, there is the intra-prediction mode signalization 116 signaling as to which intra-prediction mode is to be applied to block 80. Thus, signalization 116 indicates one of the angular modes, for instance, or one of the available modes including the angular modes and non-angular mode(s) such as DC and planar. In addition to this signalization 116, there is a partitioning flag 160 coded by the encoder into data stream 14 and decoded therefrom for block 80 by the decoder, which indicates whether the partitioning treatment according to FIGS. 4 to 7 is applied to block 80, or whether same is treated "normally", such as en block or in one piece or two-dimensionally, i.e., merely samples outside block 80 are used to form the reference sample reservoir 118 to predict each sample within block 80. Alternatively, flag 160 may switch between the partitioning treatment discussed with respect to FIGS. 4 to 7 on the one hand, and the decomposition of block 80 using a quadtree subdivisioning into transform blocks which are then sequentially treated with a disadvantage, however, of having to signal the decomposition in data stream 14. If the partitioning flag 160 indicates the partitioning according to FIG. 4, then data stream 14 contains for block 80 the partitioning dimension flag 114 switching between the partitioning types 100 and 110 discussed with respect to FIG. 4. And then, for each partition of block 80 into which block 80 is subdivided/partitioned if partitioning flag 160 indicates this partitioning option, data stream 14 comprises a signaling/data $120_1$ having the prediction residual of the respective partition encoded there into such as, as indicated above, in transform domain.

With respect to FIG. 8, it should be noted that the prediction residual data $120_1$, $120_2$ . . . may be coded into data stream 14 in an order corresponding to the partition/coding order 126. The latter may, as discussed above, be uniquely determined by the intra-prediction mode indicated by signalization 116. An alternative, however, would be that the partitioning order 126 is at least partially determined on the basis of an optional additionally signalization in data stream 14.

A further alternative to the description brought forward herein is the fact that signalization 116 may alternatively be used in order to indicate whether the partitioning option is used or not. In other words, one syntax element may commonly assume responsibility for the signalization of 116 and 160. Such a syntax element would assume one out of a range of values each corresponding to a combination of intra-prediction mode and the indication whether block partitioning is used or not. In such a case, I would also be possible to offer the partitioning option merely for a subset of the intra-prediction modes. And lastly, it should be noted that partitioning flag 160 may also be conveyed in data stream 14 conditionally merely in case of the intra-prediction mode indicated by signalization 116 assumes a certain subset out of the available intra-prediction modes.

Figure 9:
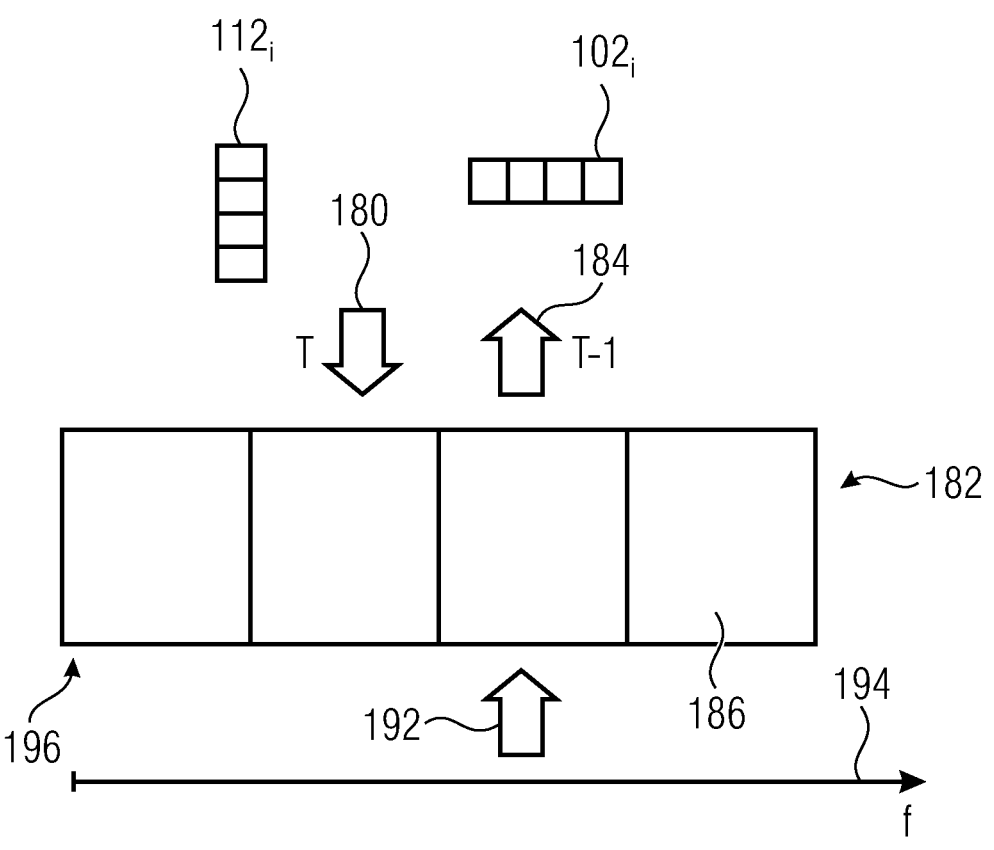
FIG. 9 shows a schematic diagram illustrating a possible way of transmitting the prediction residual of a partition.
Figure 9:
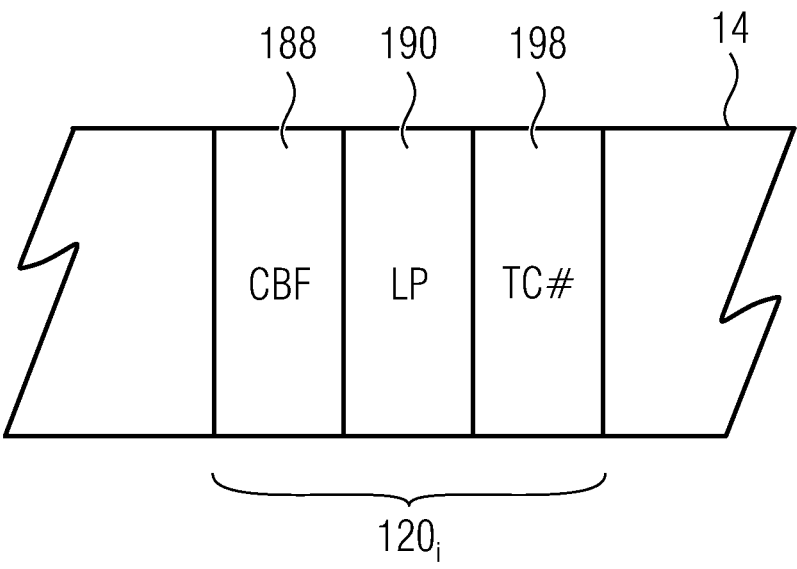

FIG. 9 shows exemplarily as to how the data $120_i$ having the prediction residual of a certain partition $102/112_i$ could look like. According to FIG. 9, the prediction residual is coded into data stream 14 in transform domain. That is, the encoder generates, by way of transformation 180, a transform 182 of the prediction residual, with a decoder deriving the prediction residual and spatial domain by way of inverse transformation 184. FIG. 9 illustrates the transform coefficients 186 of transform 182 corresponding, for instance, to different spectral frequencies f. Data $120_i$ could comprise a coded block flag CBF data $120_i$ could comprise a coded block flag CBF 188 indicating whether transform 182 comprises any significant transform coefficient 186, i.e., whether transform 182 is completely zero or not. If CBF 188 is set, the transform 182 is not zero, and data $120_i$ may comprise a last position (LP) syntax element 190 indicating 192 the last position along increasing spectral frequency (see axis 194) of a significant transform coefficient, i.e., a non-zero transform coefficient 186, starting from the lowest or DC coefficient 196. Then, data $120_i$ comprises signaling 198 signaling the transform coefficients from 196 to 192.

That is, FIG. 9 illustrates that each partition $102_i/112_i$ may have its prediction residual coded into data stream 14 by way of CBF 188, LP 190 and transform coefficient data 198. That is, for a block 80 with n partitions 102/112, there will be n CBFs 188, and one LP 190 for each partition with a non-zero CBF 188, and with the transform coefficient data 198 merely for these partitions having a non-zero CBF 188 associated therewith. The coefficient data 198 may be coded in the same manner as is done for the normally treated intra-predicted blocks, i.e., blocks 80 for which the partitioning flag 160 indicates the non-partitioning option, with the following exceptions: each LP 190 requires only one coordinate if the partition is one-sample wide (otherwise it requires 2 coordinates, as usual), namely x for horizontal splits 100 and y for vertical ones 110. In case of two-dimensional partitions, though, LP 190 indicates the last position along a scan direction or path either using rank indication, or using x and y coordinates. The context of each CBF 188 may be chosen to be the value of previously coded CBF, i.e., the CBF of the previous partition in partition order 126. Further, owing to the partitioning, the transform coefficient data 198 relates to a different shape. That is, the transform 182 has a different shape, too. The transform 182 is a one-dimensional transform in case of the partitions being one-dimensional partitions as discussed with respect to FIG. 4. That is, the transform 182 may be a W/H long vector of transform coefficients 186 depending on the split type 100 or 110.

With respect to the flags 160 and 114 of FIG. 8, and their coding, the following is noted. The flag 160, which indicates whether block 80 is to be divided into partitions 102/112, defines the condition to be checked whether flag 114 is conveyed in data stream 14 for block 80. In particular, if flag 160 indicates the partitioning into partitions 102/112, flag 114 is present in data stream 14 and sent to the decoder in order to signal as to which type of split 100/110 is to be performed, i.e., either horizontal or vertical. Just as the flag CBF, also flag 114 may be coded using context-dependent entropy coding/decoding. The context of flag 114 may have three possibilities according to the intra-prediction modes of block 80: 0 for non-angular modes, 1 for horizontal modes and 2 for vertical modes.

While FIG. 9 illustrated that that a CBF 188 might be present once per partition i of the current block 80, additionally or alternatively, the transform 182 of the partitions 120*i* of the current block might each be portioned into one or more sub-blocks with a coded sub-block flag signaled per sub-block within data 120*i* indicating whether the transform coefficients 186 within that sub-block are all zero or at least one coefficient thereof is non-zero. Thus, only coefficients 186 within sub-blocks for which the coded sub-block flag signals the presence of non-zero coefficients, would be coded, The other coefficients within sub-blocks for which the coded sub-block flag signals the absence of any non-zero coefficients, would be inferred to be zero at decoder side. Note that as each partition 120*i* is transformed separately, sub-blocks belonging to one partition differ in spectral components of the transform 182 of that partition and differ in the transform coefficients 186 they comprise out of that transform. For example, sub-blocks can be set in such a way that they are 4×4 coefficient blocks as long as the respective partition 102*i*/112*i* has dimensions in x (partition width) and y (partition height) which are both equal to or larger than 4 samples 140, and consequently as long as the transform 180 of the respective partition 102*i*/112*i* has dimensions in x and y which are both equal to or larger than 4 coefficients 186. In case of a 4×N partition, the sub-blocks form a column of m 4×4 sub-blocks with m*4=N and m being an integer. In case of a N×4 partition, the sub-blocks form a row of m 4×4 sub-blocks with m*4=N and m being an integer.

For broader partitions, an array of 4×4 sub-blocks, arranged in rows and columns, could result. Depending on the embedment it might be, however, that such partitions, i.e. broader than 4 samples and/or as broad as 4 samples, do not occur. Irrespective of the occurrence or not, for partitions being narrower, i.e. for which one of its dimensions is less than 4 samples, i.e. which are less then 4 sample wide in at least one dimension x or y, the sub-block partitioning of its transform 180 into sub-blocks each which gathering different groups of coefficients of that transform 180 may be done so that the sub-blocks have a minimum number M of coefficients in all possible cases for the current block's size. That is, the partitions might be set to be as large as the block width N along one dimension, with the partitioning taking place along the other dimension 104. The transform 180 of each partition may, thus, be of size 1×N, 2×N, N×1 or N×2. In fact, the transform 180 of a certain partition may have a number of coefficients equaling the number of samples in this partition. In case of a 1×N partition/transform, the sub-blocks may then form a column of m 1×M sub-blocks with m*M=N and m being an integer. In case of a N×1 partition, the sub-blocks form a row of m M×1 sub-blocks with m*M=N and m being an integer. In case of a 2×N partition/transform, the sub-blocks may then form a column of m 2×(M/2) sub-blocks with m*(M/2)=N and m being an integer. In case of a N×2 partition, the sub-blocks may form a row of m (M/2)×2 sub-blocks with m*(M/2)=N and m being an integer. This is exemplarily shown in Table 2 for the exemplary case of M=16 for the minimum number of coefficients.

TABLE 2

| Entropy coding coefficient group sizes | |
| --- | --- |
| Block (partition/transform) Size | Coefficient group (sub-block) Size |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

While FIG. 9 illustrated that that a CBF 188 might be present once per partition i of the current block 80, it might be agreed between decoder and encoder that at least one of the n partitions among the partitions for a current block 80 has a non-zero CBF 188. For this reason, if n is the number of sub-partitions and the first n−1 sub-partitions in coding order have produced a zero CBF, then the CBF of the n-th partition will be inferred to be 1. Therefore, it is not necessary to decode it and it is not encoded. Thus, the CBF of data 120*n* would be missing is the CBF in data 120₁ to 120*n*-1 signalled zeroness and the decoder would infer this CBF to signal that at least one non-zero coefficient is present in the transform of that partition.

As far as the intra-coding mode signalization 116 is concerned, the following may hold true. It might be the coding mode signalization 116 is sent as a pointer or index which points to one out of a list of most probable modes (MPM). The latter MPM list, in turn, might be determined by encoder and encoder in the same manner based on intra prediction modes used for previously coded/decoded intra-predicted blocks such as spatially and/or temporally neighboring intra prediction modes. Thus, the MPM list may represent a proper subset of available/supported intra-prediction modes, namely the afore-mentioned angular modes and/or one or more of DC and planar modes. As mentioned above, it might be that there are intra-predicted blocks using the LIP or ISP scheme such as block 80 in the figures, besides ones which are intra-predicted classically, i.e. en block or in units of transform blocks into which such intra-predicted blocks are partitioned using recursive quadtrec partitioning. Both types of intra-predicted blocks might support the same set of available/supported intra-prediction modes. While for the later normal/classical intra-predicted blocks, a MPM flag may be signaled in the data stream—with the decoder decoding same and the encoder encoding same—indicating whether the mode of that block is selected out of the MPM list, in which case a pointer/index into this MPM list is transmitted—with the decoder decoding same and the encoder encoding same—the MPM flag would be inferred to signal the MPM list restriction in case of intra-predicted blocks using the LIP or ISP scheme such as block 80. If, for a certain normal/classical intra-predicted block the MPM flag signals that none of the MPM modes is used, no index/pointer is present for that block in the data stream and a substitute pointer/index into a remainder list of intra-prediction modes is transmitted in the data stream for that block instead. The remainder list may also be a proper subset of the set of available/supported intra-prediction modes, and may, in particular, be the complementary set of the MPM list compared to the set of available/supported intra-prediction modes, i.e. every member of the set of available/supported intra-prediction modes would either be member of the MPM list or the remainder set. The pointer/index into the MPM list might be VLC coded, while the pointer/index into the remainder set might be coded using a fixed-length code. Naturally, it might be that even for intra-predicted blocks of the LIP or ISP scheme, the MPM flag is transmitted and that the encoder would be free to select any mode out of the set of available/supported intra-prediction modes with setting the MPM flag depending on whether the selected mode is thin the MPM list or the remainder set.

The MPM list might be the same, i.e. might be determined in the same manner by encoder and encoder, for the normal/classical intra-predicted blocks as well as for the ISP/LIP intra-predicted blocks. However, irrespective of whether restriction to the MPM list and inference of the MPM flag to signal MPM list usage for ISP/LIP intra-predicted blocks applying or not, alternatively, the MPM list may be determined differently for ISP/LIP intra-predicted blocks in order to adapt to the statistics of the ISP/LIP mode. For example, it could be altered to exclude the DC intra mode from the MP list and to prioritize horizontal intra modes for the ISP horizontal split, i.e. horizontal direction 104, and vertical intra modes for the vertical one, i.e. vertical direction 104. That is, for a normal/classical intra-predicted block, the MPM list could form a proper subset of the set of available/supported intra-prediction modes, the modes being selected and ordered in accordance with a certain concept. For ISP/LIP intra-predicted blocks 80, the MPM index could point to an MPM list which depends on the partitioning direction 104 signaled by flag 114 and/or which forms a proper subset of set of available/supported intra-prediction modes less the DC mode or less the DC and planar modes, i.e. a proper subset of the angular modes in the set of available/supported intra-prediction modes. The MPM list construction based on previously used intra-prediction modes of previously coded/decoded could prefer angular modes of an angular intra prediction direction being closer to the horizontal dimension in case of the flag 114 indicating the partitioning direction 104 to be horizontal and prefer angular modes of an angular intra prediction direction being closer to the vertical dimension in case of the flag 114 indicating the partitioning direction 104 to be vertical.

With respect to the description just brought forward, it is again noted that the juxtaposition between intra-prediction modes normally treated and intra-prediction modes treated using partitioning as outlined herein, needs not to be. That is, encoder and decoder may treat intra-predicted block 80 inevitably using the partitioning presented herein with then, accordingly the partitioning flag 160, for instance, becoming obsolete. If, however, the partitioning option signaled by flag 160 is available as one decision for the encoder, then the following description reveals a possibility as to how the encoder performs the decision, or finds out, whether the partition mode should be used for a certain block 80 and which split type, namely horizontal or vertical, is the best one. In order to perform this, the encoder should test both options for different intra-prediction modes for each block. Compared to the case where the encoder would merely have one option such as the normal option, the encoder will, thus, be slower since more options have to be tested. In order to reduce this impact, the partition mode signaled by flag 160 may be tested by the encoded according to the following strategy, wherein reference is made to FIGS. 10 and 11.

1) The 1D partitions mode is the last intra mode to be tested.
2) Let $C_{min}$ be the minimal cost so far at the moment when the 1D partitions mode is going to be tested.
3) Select a combination of intra mode and split type to be tested.
4) The block is split into N 1D partitions and let i denote the index of each of these partitions, where i=[1, N].
5) After every partition is coded, its subcost $J_i$ is calculated. Therefore, we can know the sum of all the subcosts that are available after the partition i has been coded, which is $$S_i = \sum_{k=1}^{i} J_k.$$

Figure 10:
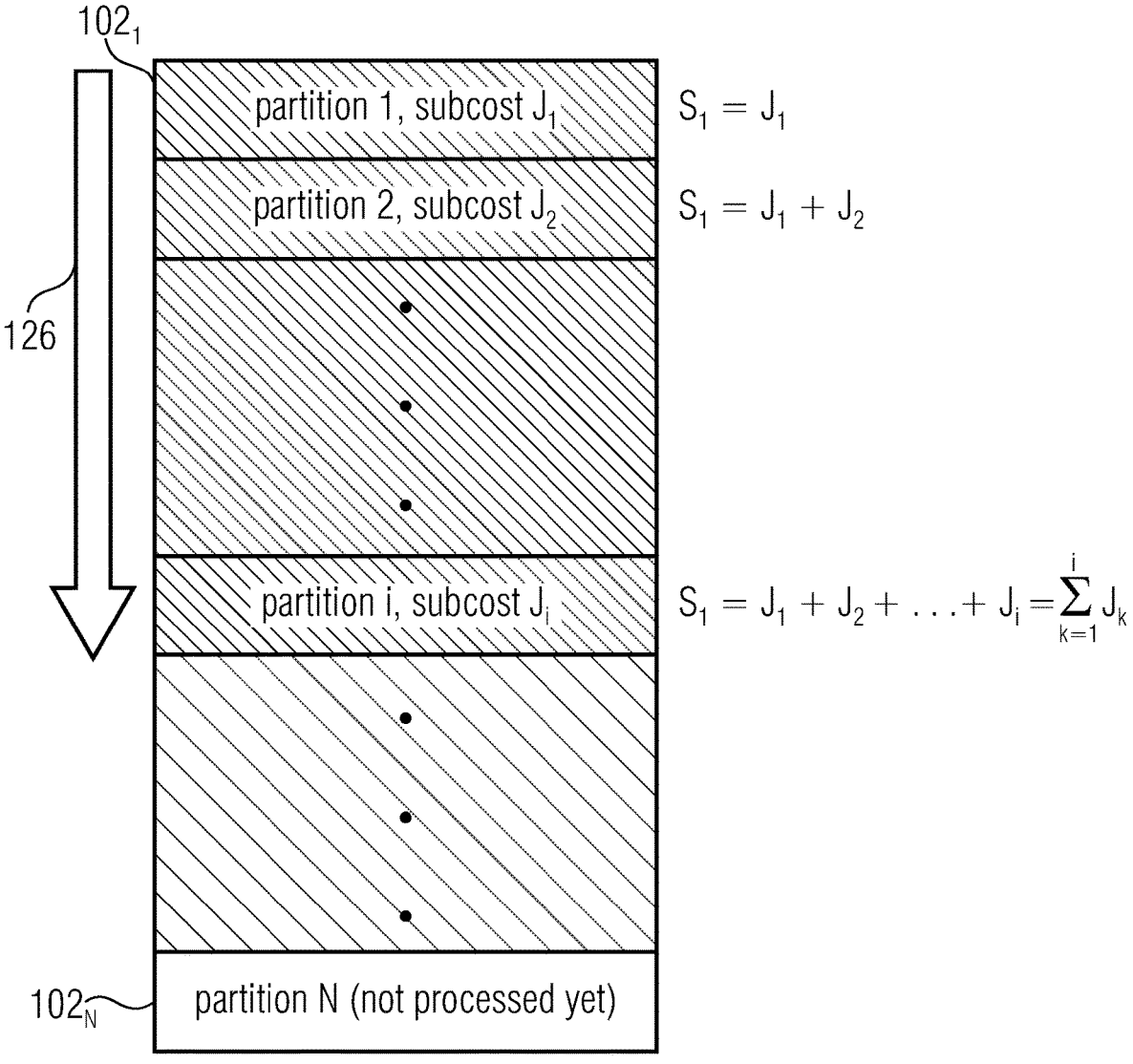
FIG. 10 shows a schematic diagram illustrating the partial sum determination for coding costs involved with the partitioning of intra-prediction mode in order to be able to abort the test when it is clear that same will not become better than any of the normal intra-prediction modes.
Figure 11:
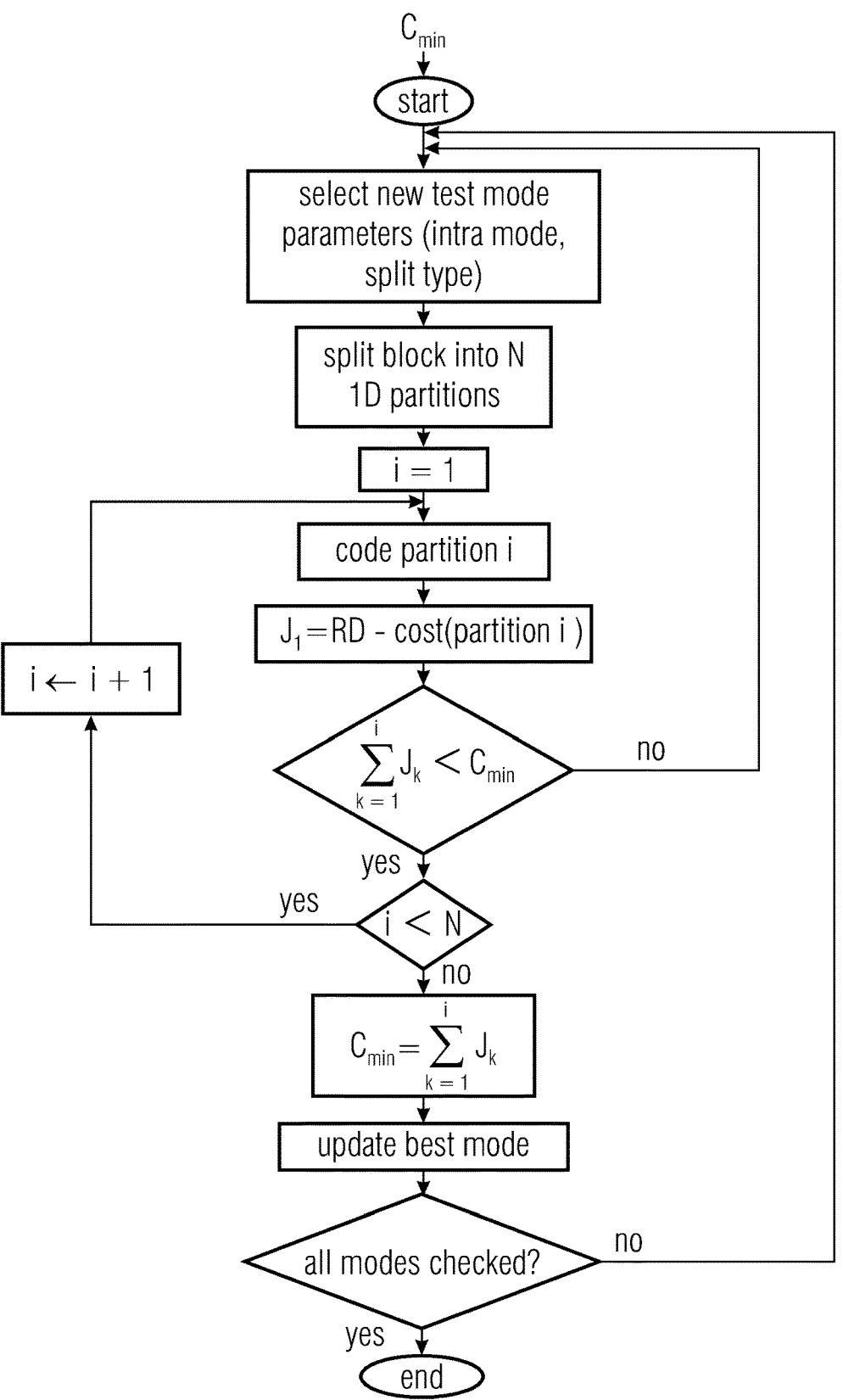
FIG. 11 shows a flowchart of a mode or operation of the encoder in order to perform the partition mode testing.

This procedure is depicted in FIG. 10 which, thus, illustrates the accumulation of the 1D partitions subcosts to obtain the final cost of the whole block.

6) After every partition is processed, the expression $S_i < C_{min}$ is evaluated. If it is true, we continue coding partitions till the end. Otherwise, it is guaranteed that this test mode is not going to yield a lower RD cost than $C_{min}$, so the process is interrupted and we move on to the next combination of intra mode and split type.
7) If all 1D partitions are coded, then the test mode is the best mode and $C_{min}$ is updated accordingly.

The advantage of this procedure is that it avoids processing 1D partitions that are not necessary, since it can be already known that the 1D partitions mode is not going to yield a better cost than the already existing minimal cost. Besides, it does not have any drawbacks in terms of RD loss. The whole process is illustrated as a flow chart in FIG. 11.

It is noted again that all of the above ISP examples illustrating the partitioning as being made in one sample wide stripes transverse to direction 104, the partitioning may alternatively be made in a manner leading to partitions being wider, thereby leading to two-dimensional partitions. Further alternatives with respect to the partitioning are set out below.

In a specific ISP example, the width along splitting direction 104 is defined based on 1) whether the intra-prediction mode is an angular or non-angular mode, and 2) the width of the intra-predicted block along that direction 104.

1) A W×H (where it is assumed W and H are powers of 2) block 80 can be divided horizontally or vertically (indicated, for instance, with a syntax element 114 that is sent to the decoder) into K equal partitions 102/112 with w×h dimensions, whose values are described in Table. According to Table 3, a block with W=16, H=8 predicted using a non-angular intra mode and subject to a vertical split (i.e. with direction 104 being vertical), for instance, would be split into 4 partitions 102 all of which would have dimensions w=16 and h=2. If the same block 80 was predicted using an angular intra mode, it would be split into 8 partitions 102 each of which had dimensions w=16 and h=1.

TABLE 3

| Values of w, h and K for the extra layout example 1 | | | |
|---|---|---|---|
| Variable | Intra Mode | Ver. split | Hor. Split |
| w | Angular | max(W/8, 1) | W |
|  | Non-angular | W/4 | W |
| h | Angular | H | max(H/8, 1) |
|  | Non-angular | H | H/4 |
| K | Angular | H/h | W/w |
|  | Non-angular | H/h | W/w |

2) A W×H (where it is assumed W and H are powers of 2) block 80 can alternatively be divided horizontally or vertically (indicated, for instance, with a syntax element 114 that is sent to the decoder) into K equal partitions with w×h dimensions, where the value of K is not fixed (and therefore it is transmitted to the decoder with a syntax element) and its range can be any power of 2 between 2 and S, where S is value of the dimension that is being split (width for the vertical split and height for the horizontal one). The values of w and h are obtained as described in Table 4.

TABLE 4

| Values of w and h for the extra layout example 2 | | |
| --- | --- | --- |
| Variable | Ver. split | Hor. split |
| w | W/K | W |
| h | H | H/K |

Instead, the width of the partitions along the dimension 104 could be signaled for block 80 directly.

3) A W×H (where it is assumed W and H are powers of 2) block 80 can alternatively be divided horizontally or vertically (indicated, for instance, with a syntax element 114 that is sent to the decoder) into K partitions (where K depends on W and H) with $w_i \times h_i$ dimensions with i=1, 2, . . . , K. Let S=H, $s_i = h_i$ if the split is horizontal and S=W, $s_i = w_i$ if it is vertical). Various options of values of $s_i$ are described in Table 5 for different values of S which measures the width of block 80 along dimension 104 and $s_i$ measures the width of partition i along dimension 104.

TABLE 5

| Values of $s_i$ for different partition layouts | | | |
| --- | --- | --- | --- |
| Examples of values of S | $s_i$ (Op. 1) | $s_i$ (Op. 2) | $s_i$ (Op. 3) |
| 4 | (1, 1, 1, 1) | (1, 3) | (1, 1, 1, 1) |
| 8 | (1, 2, 2, 2, 1) | (3, 5) | (2, 2, 2, 2) |
| 16 | (2, 4, 4, 4, 2) | (5, 7, 4) | (2, 4, 4, 4, 2) |
| 32 | (4, 8, 8, 8, 4) | (7, 9, 11, 5) | (2, 4, 8, 4, 8, 4, 2) |
| 64 | (8, 16, 16, 16, 8) | (11, 13, 15, 17, 8) | (2, 4, 8, 16, 4, 16, 8, 4, 2) |
| 128 | (16, 32, 32, 32, 16) | (17, 19, 21, 23, 25, 23) | (2, 4, 8, 16, 32, 4, 32, 16, 8, 4, 2) |

The option that is used by the decoder is fixed or it can be determined implicitly according to the value of existing parameters at the decoder side.

4) A W×H (where it is assumed W and H are powers of 2) block 80 can alternatively be divided horizontally or vertically (indicated, for instance, with a syntax element 114 that is sent to the decoder) into K partitions (where K depends on W and H) with $w_i \times h_i$ dimensions with i=1, 2, . . . , K. Let S=H, $s_i = h_i$ if the split is horizontal and S=W, $s_i = w_i$ if it is vertical). The value of $s_i$ will be determined through a syntax element that indicates which of the three options presented in Example 3) is to be used to divide the block into sub-partitions.

Thus, as exemplified in above examples 1 to 4, the partitioning may be done along one dimension 104 so that the partitions are as wide as the predetermined block perpendicular to predetermined dimension, while a width of the partitions, measured along the predetermined dimension 104, is selected out of at least two different width settings or options. Explicit or implicit signaling concepts may be used to keep the selection synchronous between encoder and decoder. The selection, thus, enables that, while partitioning may be varied between blocks of the same size and shape, the overhead associated with this variation is kept reasonably low. The selection may, for instance, be done depending on the intra-coding mode for the predetermined block such as depending on whether the intra-coding mode for the predetermined block is an angular mode or not. The selection may also be made depending on an index in the data stream for the predetermined block indexing on of the at least two different width settings as shown in example No. 4. The partitions may be one or more samples wide along the partitioning dimension. Within one block, the partitions width along the partitioning/predetermined direction may vary. One may be one sample wide, i.e. is one-dimensional stripe, while another is more than one sample wide, is a two-dimensional field of samples.

As far as the residual coding is concerned, same may, as described above, be done using transform coding. Each sub-partition 102/112 may have in the data stream its own Coded Block Flag (CBF) 188, Last Position (LP) syntax element 190 and transform coefficients 198, which will be transmitted to the decoder. Therefore, for a block 80 such as a CU, with K sub-partitions 102/112, there will be K CBFs 188 and one LP 190 for each partition 102/112 with a non-zero CBF. The context used to code each CBF 188 may depend on the value of the CBF of a previously coded sub-partition within the same block—along order 126, for instance. Additionally, a further not yet mentioned syntax element might be transmitted to the decoder in the data stream to indicate whether the ISP concept is used or not on every block, or to indicate whether at a scope corresponding to the whole data stream or a certain picture or for a slice of a certain picture, for instance, the partitioned intra-prediction concept described herein is used or not on every intra-predicted block 80 within that scope or whether some are signaled to be treated as one piece, i.e. like being partitioned into only one partition.

Likewise, it has been described above that each sub-partition might be transformed separately using one transform, thereby yielding one transform for each partition 102/112 not quantized to all zero. As the transform for a certain partition 102/112, a 2-D transform may be used, except in the case that one of the dimensions of that partition 102/112 is one, in which case a 1-D transform will be applied. The transform core can be a DCT-II or any other transform determined by existing parameters at the decoder side at the time the sub-partition is going to be decoded. For example, the transform could be selected according to the combination of the intra mode, the sub-partition index and the sub-partition dimensions or some subset of the latter parameters. It could also be directly signaled to the decoder or, differently speaking, in form of an extra syntax element sent, for instance, for all partitions within block 80 or for each partition 102/112 of one block 80 separately.

One aspect also already discussed above is the fact that the residuals of partitions 102/112 of block 80 may be, after quantization in spatial or some intermediate transform domain reached by subjecting the prediction residual of each partition partition-individually to a transform the transform coefficients of which are then quantized, be subject to a further transform which is lossless or reversible, though. The decoder would, thus, be able to obtain the transform coefficient levels of a transform for the whole block 80, subject same to the inverse lossless transform to obtain the prediction residuals for each partition 102/112 in spatial domain or intermediate transform domain from the prediction residual in spatial domain is obtained by re-transformation for each partition 102/112.

Further, it has already been discussed above that the prediction residual for the various partitions of block 80 is quantized and coded into the data stream sequentially, partition by partition, in an alternating manner relative to the individual intra-predictions of these partitions. This had been described with respect to FIG. 5 as well as with respect to FIGS. 10 and 11. The decoder, however, needs not to perform the decoding by alternating between residual decoding on the one hand and the reconstruction of the various partitions by combining the intra-prediction on the one hand and the prediction residual on the other hand. That is, in decoding a certain block 80, the decoder may decouple the decoding of the prediction residual 120 for the various partitions from the actual reconstruction procedure which includes the individual intra-predictions of the various partitions.

See FIG. 5: a decoder may decode from the data stream 14 the prediction residual 120 of all partitions, i.e., prediction residuals $120_1$ to 1204 for block 80 in accordance with one processing task, and the decoder may, in accordance with another task, use the prediction residual $120_i$ of partitions $102_i$ so as to reconstruct, in accordance with partition order 126, the inner of block 80 partition by partition. To this end, the decoder performs, in the second task, the intra-prediction for each partition $120_i$ using the block's 80 intra-prediction mode with then adding the prediction residual $120_i$ obtained from the first task and with then continuing the reconstruction of block 80 by stepping to the next partition $120_{i+1}$ in partition order 126 in order to perform spatial prediction followed by reconstruction using the prediction residual of that partition in order to correct the intra-prediction result. The decoder may either perform the first task of deriving the prediction residual 120 from data stream 14 completely before commencing the second task of performing the predictions and prediction corrections using the prediction residual, or the decoder may perform the two tasks in parallel with providing measures to guarantee that the prediction residual $120_i$ of a certain partition $102_i$ is ready at the time it is needed, namely at the time when the prediction result for that partition $102_i$ has been obtained using the block's intra-prediction mode and needs to be corrected. In particular, during the first task or phase, the decoder may perform all the inverse transforms for all non-zero partitions, i.e., all partitions 102 for which prediction residual $120_i$ is signaled to be non-zero, in parallel.

Just as a side it is noted that when the residual $120_i$ of the partitions i is quantized in transform domain, it may happen that the reconstructed samples of these partitions may leave, i.e. exceed or succeed, a certain allowed sample value range. As discussed above, they may serve as member of reference samples $118j$ for partitions j following in order 126. In accordance with an ISP variant, these samples are left as they are for purposes of predicting the partitions j following in order 126, with performing clipping of these samples of block 80 as a final clipping step for the whole block 80, thereby increasing the implementation friendliness on the side of the decoder, for instance. Thus, in deriving the predictor for a partition $102_j$, a reconstructed sample of partitions preceding this partition $102_j$ according to partition order 126, which is among the one or more already reconstructed samples $118_i$ serving as reference for the current partition, may be used in a not yet clipped state, wherein clipping the reconstructed sample from the not yet clipped state to a state clipped to an allowed sample value range takes place at the end, after having performed the sequential reconstruction, to finally reconstruct the predetermined block. At encoder side, clipping is merely performed for sake of obtaining the reconstructed version of such a sample for serving as a prediction reference for subsequently encoded blocks in order to keep the reference synchronization with the decoder. This final clean-up sort of clipping is, however, only an example, and the clipping could alternatively be performed immediately, i.e. before reconstructed samples of a partition i serve as a reference sample 118j for a subsequently processed partition j.

One ISP example shall be illustrated below concretely. In particular, in accordance with this example, the data stream 14 signals for an intra-coded block 80 by way of a split mode flag 160 whether same is coded using ISP scheme or not. A corresponding syntax element in the data stream 14 could be named intra_subpartitions_mode_flag. If this flag is one, for instance, the intra-coded block 80 could be coded using LIP or ISP scheme, and the block 80 is coded using normal intra-prediction, otherwise. The LIP or ISP scheme could, for instance, be available for the current intra-coded block 80 only provided that certain one or more conditions are fulfilled. The one or more conditions could, for instance, comprise: the intra-coded block 80 needs be to greater than some minimum size in terms of, for instance, number of samples of block 80, and/or the intra-coded block 80 may not be allowed to exceed a certain dimension, at least both horizontally and vertically, in order to, for instance, not lead to too large transform sizes. To be more precise, it could be that the LSP or ISP mode is available only in case of block 80 being smaller than or equal to the just-mentioned maximum transform-related size in at least one direction, i.e., horizontally or vertically. Thus, intra_subpartitions_mode_flag may only be present in the data stream in case of block 80 fulfilling the just-mentioned conditions. Otherwise, the decoder may infer that the intra-coded block 80 is normally intra-coded. A partition dimension flag 114 may further be signaled for the intra-coded block 80, in case of the split mode flag, intra_subpartitions_mode_flag, indicating that the intra-coded block 80 is an LSP or ISP coded block. It might be, however, that this intra_subpartitions_mode_flag is not explicitly signaled inevitably, but inferred to indicate a certain partition dimension 104 in case of certain situations. For instance, in case of the intra-coded block 80 having a width which exceeds the aforementioned maximum transform size (but having a height which does not), then the partition dimension 104 could be obliged to be horizontal, and in case of the height of block 80 exceeding the just-mentioned maximum transform size (but the width not exceeding the same), dimension 104 could be obliged to be vertical. In both cases, the intra_subpartitions_split_flag would not be signaled explicitly in the data stream, but inferred accordingly by the decoder. The intra-coding mode 116 could be signaled in the data stream as outlined above, namely by use of a list of most probable intra-prediction modes which is constructed on the side of the encoder and decoder. While for LIP or ISP intra-coded blocks 80, the data stream 14 could signal the intra-coding mode by way of an MPM list pointer which points into the list of probably intra-prediction modes inevitably, called, for instance, intra_luma_mpm_IDX, this pointer might be preceded in the data stream 14 by an MPM flag in case of the intra-coded block being not coded in ISP scheme. If that MPM flag, called, for instance, intra_luma_mpm_flag, has a certain flag state, instead of the pointer into the most probable intra-prediction mode list, a pointer into a reminder list of intra-prediction modes would be signaled in the data stream. As mentioned above, however, this is merely an example, and it might be that the signalable set of intra-prediction modes may be the same, namely cover all supported intra-prediction modes, for both normally coded intra-predicted blocks and ISP intra-predicted blocks. For instance, the intra_luma_mpm_flag may be sent for both types of intra-coded blocks. Alternatively, the pointer sent for both types of intra-predicted blocks could directly point into a complete list of supported intra-prediction modes, without any MPM flag, for both types of intra-coded blocks. If the intra-coded block 80 is coded using ISP scheme, the number of partitions 102/112 could be defined as follows. In particular, encoder and decoder may determine the number of partitions depending on the size of block 80. No signal would be spent in the data stream. For small block sizes, the number could be two, whereas the number of partitions 102/112 is four otherwise. The partition order at which intra prediction of the partitions and the coding of the prediction residuum in the data stream are performed, may lead along the partition direction 104 from the left most partition in case of a horizontal direction n14 and the uppermost partition in case of a vertical partition direction sequentially to the farthest partition. No signaling would be spent for this either. The residual transformation could be done, as described above, per partition 102/112. That is, each partition could be transformed separately. Compared thereto, in case of a normally intra-coded block 80, the number of transforms could depend on the sizes of intra-coded block 80 as follows: if the intra-coded block is smaller than the aforementioned maximum transform size horizontally and vertically, the intra-coded block's 80 residual is coded using one transform, i.e., the block's 80 residual is completely subject to one transform. In case of exceeding the maximum transform size horizontally, the intra-coded block 80 is split into two halves or a corresponding number of transform blocks horizontally so that the halfes or the transform blocks meet the maximum transform size and the residuum of block 80 is subject to one transform per half/transform block. The same applies in case of block 80 exceeding the maximum transform size vertically. If exceeding the maximum transform size both vertically and horizontally, four or a corresponding number of transforms are used to transform the residuum of block 80 in the four quadrants of this block 80 or a regular 2-dimensional sub-division of block 80 into a corresponding number of transform blocks. Besides, the treatment of normally intra-coded blocks 80 may deviate from the handling of LIP or ISP coded intra-coded blocks 80 in that normally intra-coded blocks are intra-predicted en block. That is, same are not sub-partitioned. Further differences may relate to the coding of the transform's for coding the prediction residual of block 80. For each transform a coded block flag 188 may be transmitted such as tu_cbf_luma, but while for normally intra-coded blocks 80, this flag might be coded inevitably for each transform within block 80, this flag may be inferred to be one for the last transform of that block 80 in case of block 80 being ISB coded and all previous CBFs for the previous transforms being zero. Further, the selection of the dimensions of the sub-blocks within each transform may differ between normally intra-coded blocks 80 on the one hand and ISP coded blocks 80 on the other hand. Details were set out above. Alternatively, however, it could be that the sub-divisioning of the transforms 182 into sub-blocks could be done equally for normally intra-coded blocks and ISP coded blocks. For instance, let log 2SbW and log 2SbH be the logarithm duals of the width and height of the sub-blocks and log 2Tb Width and log 2TbHeight the width and height of the transform, respectively. Then, the sub-block dimensions could be determined as follows:

```
log2SbW = ( Min( log2TbWidth, log2TbHeight ) < 2 ? 1 : 2 )
log2SbH = log2SbW
if ( log2TbWidth < 2 ) {
    log2SbW = log2TbWidth
    log2SbH = 4 – log2SbW
```

-continued

```
} else if ( log2TbHeight < 2 ) {
    log2SbH = log2TbHeight
    log2SbW = 4 – log2SbH
}
```

The above pseudo code yields sub-blocks of sizes set out in Table 2. It might be, that owing to an inherent minimum size of intra-coded blocks 80 and the non-sub-divisioning of normally intra-coded blocks, merely sub-blocks of 4×4 coefficients result for normally intra-coded blocks 80. It should finally be noted that the just-outlined example may lead to ISP intra-predicted blocks of varying sizes including ones partitioned into only two partitions 102/112, but irrespective of whether such ISP intra-predicted blocks exist, there are ISP intra-predicted blocks partitioned into more than two partitions.

This is the starting point of the description of implementation efficiency improved embodiments brought forward below. Note that the description thereof is presented as an alternative way of treating ISP blocks of certain sizes such as 4×4, 8×4, 4×8 blocks while treating larger ISP blocks as described above, but even further alternative embodiments may be achieved by transferring the following partition based intra coding concept onto a block based codec without the ISP treatment of blocks as outlined so far.

Figure 12A:
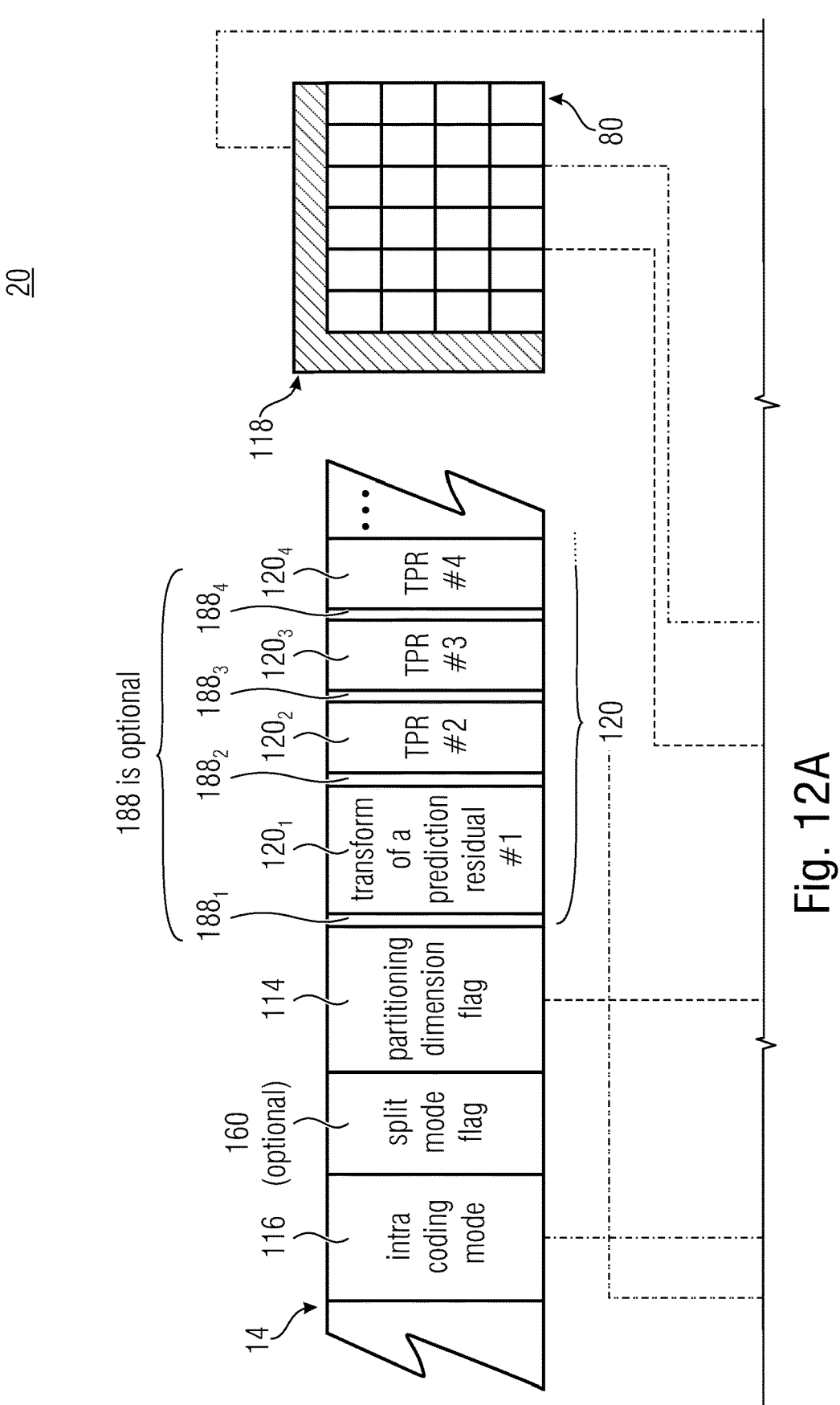
FIGS. 12A and 12B show a schematic diagram illustrating a decoder for block-based decoding of a picture with an inventive ISP concept implemented.
Figure 12B:
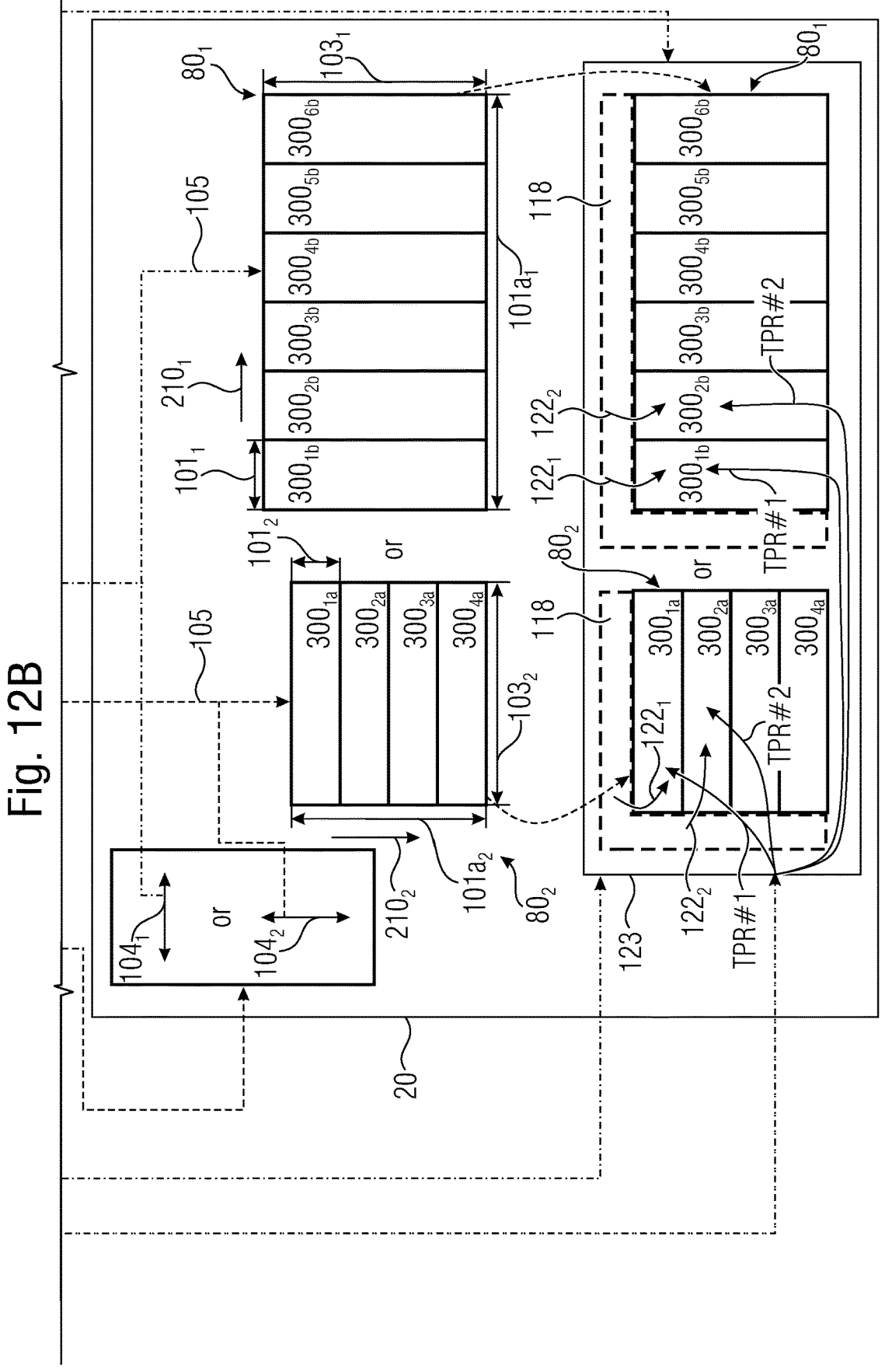

FIGS. 12A and 12B show, according to an embodiment, a decoder 20 for block-based decoding of a picture from a data stream 14. Thus a predetermined block 80 can be decoded, whereby the predetermined block can be partitioned into sub-blocks, which can be understood as transform partitions 300. The data stream 14 can comprise an encoded intra-coding mode 116, an encoded partition dimension flag 114 and several encoded transforms 120 of prediction residuals. The intra-coding mode 116 and the partition dimension flag 114 are, for example, signaled for the predetermined block 80. On the contrary, a transform 120 of a prediction residual is, for example, signaled for an individual transform partition of the predetermined block 80.

The decoder 20 is configured to decode the partition dimension flag 114 for the predetermined block 80 of the picture from the data stream 14 and set a partition dimension 104 depending on the partition dimension flag 114 to be horizontal 1041 or vertical 1042. The partition dimension 104 indicates, for example, the direction along which the predetermined block 80 is to be partitioned 105 by the decoder 20.

According to an embodiment, the decoder 20 is configured to decode the partition dimension flag 114 by use of context-dependent entropy decoding using a context which depends on the intra-coding mode 116. According to an embodiment the decoder 20 is configured to decode the partition dimension flag 114 by use of context-dependent entropy decoding using one of three contexts comprising the intra-coding mode signaling a non-angular mode, the intra-coding mode signaling a horizontal mode and the intra-coding mode signaling a vertical mode.

If the partition dimension 1041 is horizontal the predetermined block 80 is, for example, partitioned or divided into vertical transform partitions $300_{1b}$ to $300_{6b}$, which span the entire vertical height of the predetermined block 801. Alternatively if the partition dimension 1042 is vertical the predetermined block 80 is, for example, partitioned or divided into horizontal transform partitions $300_{1a}$ to $300_{4a}$, which span the entire horizontal width of the predetermined block 802. In other words the decoder is configured to partition the predetermined block 80, along the predetermined dimension 1041 or 1042, into transform partitions 300 which are as wide 1031 or 1032 as the predetermined block 80 perpendicular to the predetermined dimension 1041 or 1042. The predetermined dimension is, for example, the partition dimension 104.

The number of transform partitions 300 is, for example, greater than 2 and/or the transform partitions 300 are one sample wide 1011 or 1012 along the predetermined dimension 1041 or 1042.

Alternatively the transform partitions 300 can be two or more samples wide along the partition dimension 1041 or 1042.

According to an embodiment, the decoder 20 is configured to set a width 101 of the transform partitions 300, measured along the predetermined dimension 104, depending on a size 101$a$ of the predetermined block 80 along the predetermined dimension 104 and/or depending on the intra-coding mode 116 for the predetermined block 80 and/or depending on whether the intra-coding mode 116 for the predetermined block 80 is an angular mode or not.

According to an embodiment, a predetermined block 80 with a width W and a height H, i.e. W×H dimensions, is, for example, divided horizontally or vertically in K transform partitions of equal size with the dimensions W×H/K for a horizontal split (along a vertical partition dimension) or the dimension W/K×H for a vertical split (along a horizontal partition dimension).

The decoder 20 is configured to reconstruct 123 the predetermined block 80 based on already reconstructed samples 118 neighboring the predetermined block 80, based on an intra-coding mode 116 and based on transformations 120 of prediction residuals.

Therefore the decoder is configured to decode, for each transform partition, a transform 120 of a prediction residual from the data stream. According to an embodiment, the decoder 20 is configured to decode, for each partition, the transform 120 from the data stream by decoding a coded transform partition flag 188 from the data stream. If the coded transform partition flag 188 is not set, the decoder 20 is configured to set the prediction residual for the respective transform partition 300 to zero, and if the coded transform partition flag is set, the decoder 20 is configured to decode transform coefficients of the transform 120 of the prediction residual of the respective transform partition from the data stream. A coded transform partition flag 188, for example, is not set, if the coded transform partition flag 188 is zero.

According to the embodiment shown in FIGS. 12A and 12B, for each transform partition 300, is optionally the coded transform partition flag 188 encoded in the data stream 14, based on which the decoder 20 is configured to either decode, for a transform partition 300, a transform 120 of a prediction residual or infer that the prediction residual is zero and that no transform 120 has to be decoded by the decoder 20 for this transform partition. Alternatively no coded transform partition flag 188 is decoded by the decoder, instead the decoder is configured to directly decode, for each transform partition 300, a transform 120 of a prediction residual or decode one transform for the whole predetermined block 80.

According to an embodiment, the decoder 20 is configured to decode the coded transform partition flags 188 for the transform partitions 300 from the data stream 14 sequentially and infer that the coded transform partition flag 188 for a last transform partition, e.g., for the transform partition 300$_{4a}$ or for the transform partition 300$_{6b}$, in transform partition order 210 is set, if all preceding coded transform partition flags 188 are not set.

According to an embodiment, the decoder 20 is configured to decode the coded transform partition flag 188$_2$ for a respective transform partition, e.g., for the second transform partition 300$_{2a}$ or 300$_{2b}$, from the data stream 14 by use of context-dependent entropy decoding using a context which depends on the coded transform partition flag 188$_1$ decoded for a preceding transform partition, e.g., for the first transform partition 300$_{1a}$ or 300$_{1b}$, preceding the respective transform partition in the predetermined transform partition order 210.

Furthermore the decoder 20 is configured to decode the intra-coding mode 116 for the predetermined block 80 of the picture from the data stream 14.

The decoder 20 is configured to intra-predict 122 the predetermined block 80 depending on one or more already reconstructed samples 118 neighboring the predetermined block 80 in a manner depending on the intra-coding mode 116 to obtain a predictor for the predetermined block 80. According to an embodiment, the decoder 20 is configured to intra-predict 122, for each transform partition 300, a predictor.

According to a first option, the transform partitions 300 are sequentially reconstructed by the decoder 20. Thus the decoder is configured to intra-predict 122$_1$ a predictor for a first transform partition 300$_{1a}$ or 300$_{1b}$ and correct this predictor using the transform 120$_1$ of the prediction residual decoded for the first transform partition 300$_{1a}$ or 300$_{1b}$ and then intra-predict 122$_2$ a predictor for a second transform partition 300$_{2a}$ or 300$_{2b}$ and correct this predictor using the transform 120$_2$ of the prediction residual decoded for the second transform partition 300$_{2a}$ or 300$_{2b}$. According to the partitioned predetermined blocks 801 and 802 shown in FIG. 12B the subsequent transform partitions 300$_{3a}$ and 300$_{4a}$ for block 802 and the subsequent transform partitions 300$_{3b}$, 300$_{4b}$, 300$_{5b}$ and 300$_{6b}$ for block 801 are intra-predicted and corrected accordingly.

According to a second option, the transform partitions 300 are reconstructed in one step. Therefore the decoder 20 is configured to decode, for each transform partition 300, a transform 120 of a prediction residual from the data stream 14 and intra-predict 122, for each transform partition 300, a predictor. The decoding of the transforms 120 is, for example, performed independent from the intra-prediction. According to an embodiment, at the reconstructing 123 of the predetermined block 80 all transforms 120 of prediction residuals are decoded by the decoder 20 and all predictors are intra-predicted by the decoder 20. In other words, at the reconstructing 123 of the predetermined block 80, is for each transform partition 300 a transform 120 of the prediction residual decoded for the respective transform partition 300 and a predictor associated with the respective transform partition 300 available.

According to an embodiment, the decoder 20 is configured to re-transform for each transform partition 300 the transform 120 into spatial domain for usage in correcting the predictor within the respective transform partition 300. In other words an inverse transformation can be applied to transform coefficients of the transform 120 of a prediction residual to obtain the prediction residual in the spatial domain.

According to an embodiment the transform 120 is a DCT transform in case of the intra prediction mode (i.e. the intra-coding mode 116) not being a planar mode, and a DST transform in case of the intra prediction mode being the planar mode, or the transform is a linear transform a type of which is selected based on the intra prediction mode, a block size of the predetermined block 80 and/or an dedicated syntax element. Thus the decoder is, for example, configured to determine the transform type of the transform 120 of a prediction residual based on the intra-coding mode. For the above described re-transform the decoder uses, for example, an inverse transform type.

According to an embodiment, the decoder 20 is configured to decode a split mode flag 160 for the predetermined block 80 of the picture from the data stream 14. If the split mode flag 160 indicates a first split mode, the decoder 20 is configured to perform the decoding of the partition dimension flag 114, the partitioning 105 and the decoding of the transform 120 for each transform partition. If the split mode flag 160 indicates a second split mode, instead of the decoding of the partition dimension flag 114, the partitioning 105 and the decoding of the transform 120 for each transform partition 300, the decoder 20 is configured to decode one transform 120 of the prediction residual within the predetermined block 80. In other words, the first split mode indicates a decoding of the predetermined block 80 based on transform partitions and the second split mode indicates a decoding of the whole predetermined block 80 without partitioning 105. Thus in the second split mode no transform partitions are used by the decoder 20 and, for example, no partition dimension flag 114, no coded transform partition flag 188 and no individual transform 120 of a prediction residual associated with a transform partition are encoded in the data stream 14 for the predetermined block 80.

Figure 13:
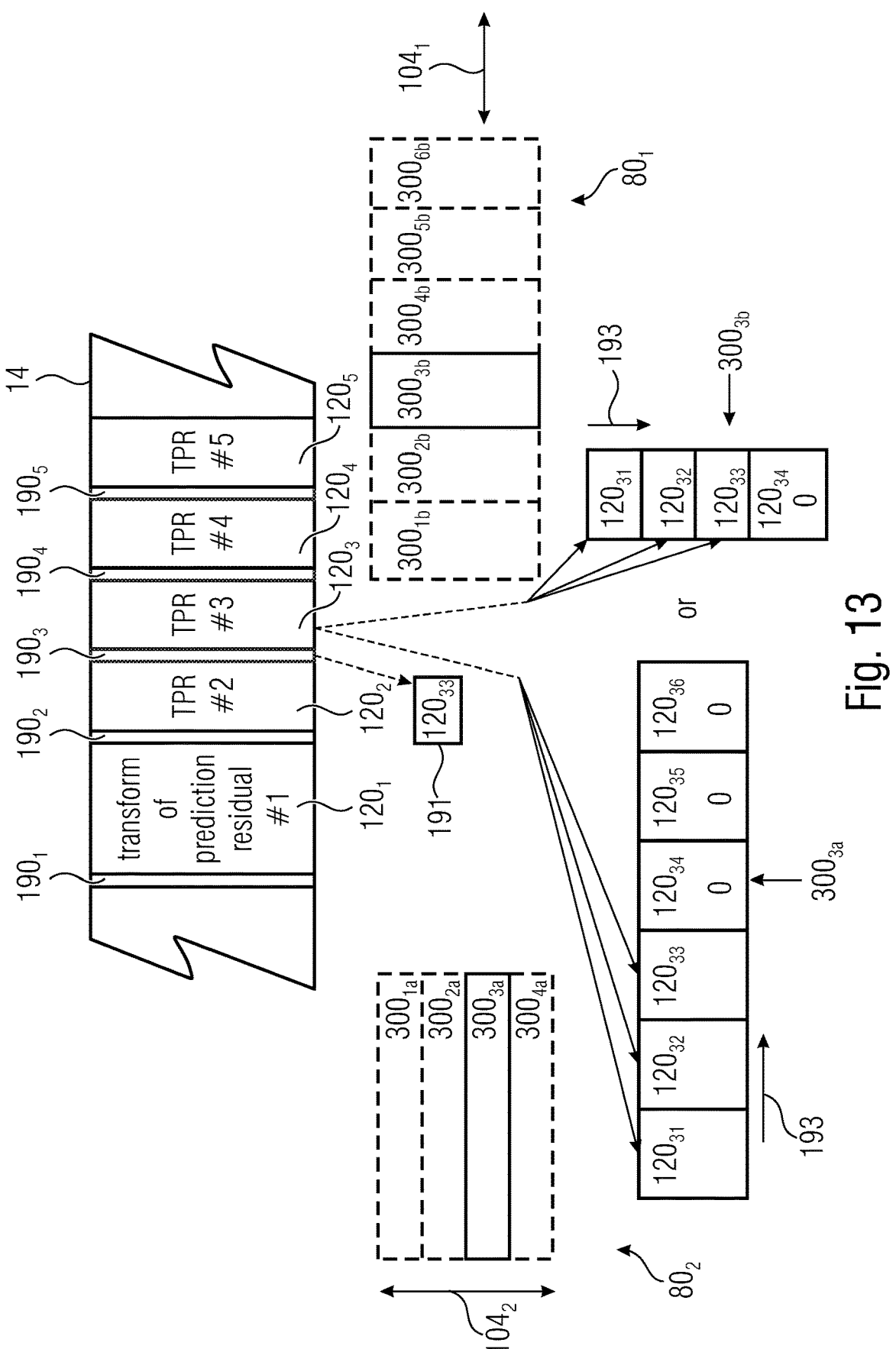
FIG. 13 shows a schematic diagram illustrating a usage of a last position syntax element.

FIG. 13 shows an embodiment for a decoding of the transform 120 of the prediction residual of a transform partition 300 from the data stream 14, which can be performed by the decoder shown in FIGS. 12A and 12B. According to the embodiment, the decoder 20 is configured to decode, for a predetermined transform partition $300_{3a}$ or $300_{3b}$ (the embodiment is shown for a predetermined block 802 partitioned along a vertical partition dimension 1042 and for a predetermined block 801 partitioned along a horizontal partition dimension 1041), the transform $120_3$ of the prediction residual of the predetermined transform partition $300_{3a}$ or $300_{3b}$ from the data stream 14 by decoding a last position indication 1903 form the data stream 14 indicating a last transform coefficient position 191 of the transform $120_3$ along a predetermined scan order 193 scanning transform coefficients $120_{31}$ to $120_{36}$ (associated with the transform partition $300_{3a}$) or $120_{31}$ to $120_{34}$ (associated with the transform partition $300_{3b}$) of the one-dimensional transform $120_3$. Additionally the decoder 20 is configured to decode, for the predetermined transform partition $300_{3a}$ or $300_{3b}$, the transform $120_3$ of the prediction residual of the predetermined transform partition $300_{3a}$ or $300_{3b}$ from the data stream 14 by decoding transform coefficients $120_{31}$ to $120_{33}$ (associated with the transform partition $300_{3a}$) or $120_{31}$ to $120_{33}$ (associated with the transform partition $300_{3b}$) of the transform $120_3$ up to the last transform coefficient position 191 along the predetermined scan order 193 from the data stream 14 and inferring that transform coefficients $120_{34}$ to $120_{36}$ (associated with the transform partition $300_{3a}$) or $120_{34}$ (associated with the transform partition $300_{3b}$) of the transform 120 beyond the last transform coefficient position 191 along the predetermined scan order 193 are zero.

According to an embodiment, the last position indication 190 can be encoded in the data stream 14 additionally to the coded transform partition flag 188, as, e.g., described with regard to FIG. 9. Alternatively only the last position indication 190 is encoded in the data stream 14 and not the coded transform partition flag 188.

According to an embodiment, the transform partitions 300 are one sample wide along to the predetermined dimension 104 and the transform 120 is a one-dimensional transform.

Figure 14A:
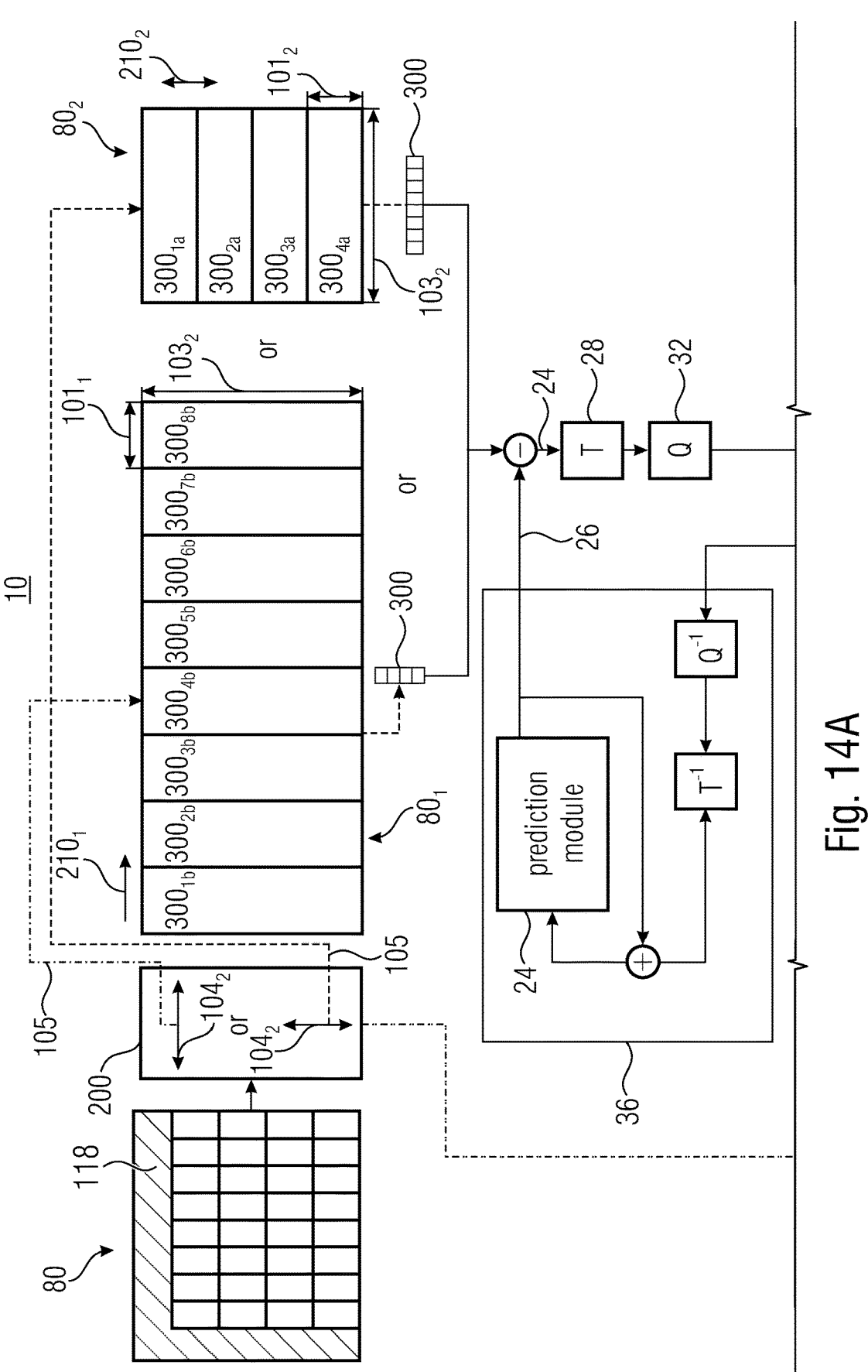
FIGS. 14A and 14B show a schematic diagram illustrating an encoder for block-based decoding of a picture with an inventive ISP concept implemented.
Figure 14B:
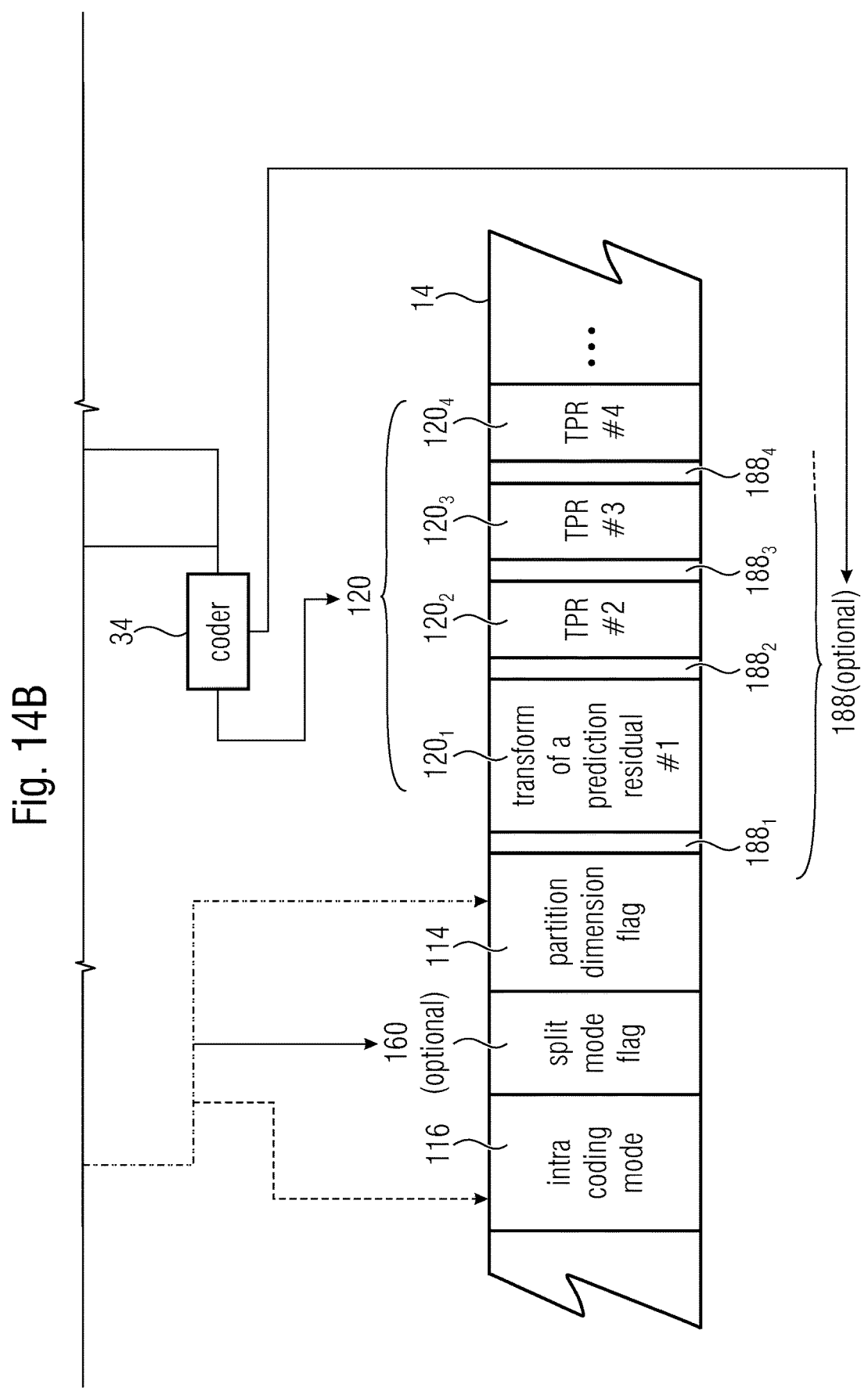
Figure 15A:
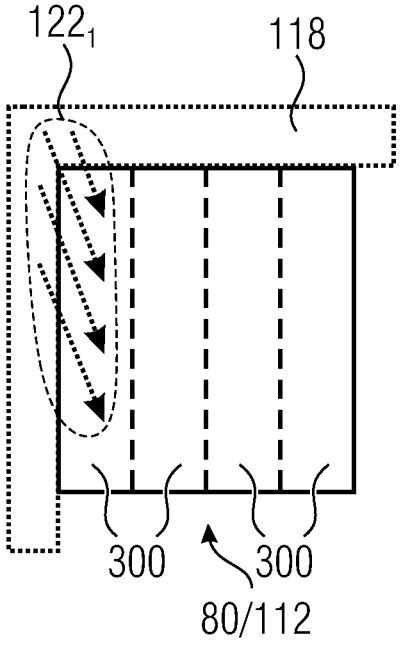
FIG. 15*a*-15*d* show schematic diagrams illustrating intra-prediction of individual transform partitions of a vertically split 4×4 block.
Figure 15B:
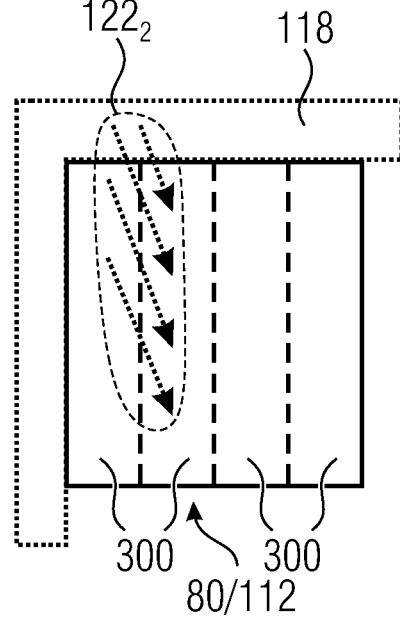
Figure 15C:
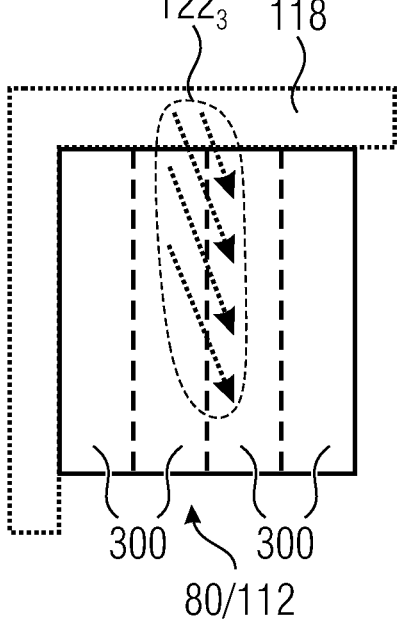
Figure 15D:
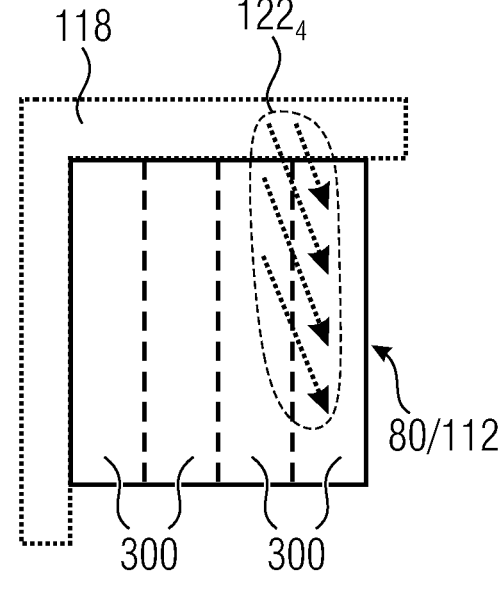

FIGS. 14A and 14B show an embodiment of an encoder 10 for block-based encoding of a picture into a data stream 14, configured to encode a partition dimension flag 114 for the predetermined block 80 of the picture into the data stream 14 which signals that a partition dimension 104 is to be set to be horizontal 1041 or vertical 1042. The decision 200 by the encoder 10, whether the predetermined block 80 should be partitioned and which partition dimension 104 should be chosen, if the predetermined block 80 is to be partitioned, depends, for example, on the block size of the predetermined block 80 and/or on one or more partition decisions 200 of the encoder for one or more previously encoded blocks of the picture.

The encoder 10 is configured to partition 105, along the predetermined dimension 104, the predetermined block 80 into transform partitions 300 which are as wide 103 as the predetermined block 80 perpendicular to the predetermined dimension. The predetermined dimension is, for example, the partition dimension 104. Thus the encoder 10 is configured to perform a vertical split, if the partition dimension 1041 is horizontal and perform a horizontal split, if the partition dimension 1042 is vertical. The partitioning is optionally performed as described in FIG. 12B and FIG. 13 in the context of the decoder and/or as described with respect to the FIGS. 15 to 18.

The encoder 10 is configured to intra-predicting the predetermined block 80 depending on one or more already reconstructed samples 118 neighboring the predetermined block 80 in a manner depending on the intra-coding mode 116 to obtain a predictor for the predetermined block 80. This is, for example, performed by a prediction module 44 of a prediction stage 36, which generates a prediction signal 26 by using an intra prediction mode 116. According to an embodiment, the encoder 10 is configured to perform the intra-prediction for each transform partition 300 of the predetermined block separately. The transform partitions 300 are, for example, sequentially intra-predicted, transformed 28, quantized 32 and encoded 34 into the data stream 14.

According to an embodiment, the encoder 10 is configured to encode the intra-coding mode 116 for the predetermined block 80 of the picture into the data stream 14. The encoder 10 is configured to use, for example, the same intra coding mode 116 for the complete predetermined block 80 to obtain prediction residuals 24 of each transform partition of the predetermined block 80, which can be transformed 28, quantized 32 and encoded 34 into the data stream 14.

The encoder 10 is configured to encode, for each transform partition 300, a transform 120 of a prediction residual into the data stream 14, so that the predetermined block 80 is reconstructible by correcting the predictor within each transform partition 300 using the transform 120 of the prediction residual encoded for the respective transform partition 300. In other words, the encoder 10 is, for example, configured to transform 28 for each transform partition 300 the prediction residual 24 in the respective partition 300 into spectral domain for usage in correcting the predictor within the respective transform partition 300.

According to an embodiment, the number of transform partitions is greater than 2 and/or the transform partitions are one sample wide along the predetermined dimension.

According to an embodiment, the encoder 10 is configured to encode, for each partition 300, the transform 120 into the data stream 14 by encoding a coded transform partition flag 188 into the data stream 14. If the coded transform partition flag 188 is not set, the coded transform partition flag 188 signals that the prediction residual 24 for the respective transform partition 300 is zero, and if the coded transform partition flag 188 is set, the encoder is configured to encode transform coefficients of the transform 120 of the prediction residual 24 of the respective transform partition 300 into the data stream 14. A coded transform partition flag 188, for example, is not set, if the coded transform partition flag 188 is zero.

According to an embodiment the encoder 10 is configured to encode the coded transform partition flags 188 for the transform partitions 300 into the data stream 14 sequentially except the coded transform partition flag, e.g. the coded transform partition flag 188₈ for the vertical split or the coded transform partition flag 188₄ for the horizontal split, for a last transform partition, e.g. the transform partition 300₈ₕ for the vertical split or the transform partition 300₄ₕ for the horizontal split, in transform partition order 210, if all preceding coded transform partition flags, e.g. all preceding coded transform partition flags 188₁ to 188₇ for the vertical split or all preceding coded transform partition flags 188₁ to 188₃ for the horizontal split, are not set, which is then inferred to be set.

According to an embodiment the encoder 10 is configured to encode the coded transform partition flag 188 for a respective transform partition 300 into the data stream 14 by use of context-dependent entropy encoding using a context which depends on the coded transform partition flag 188 encoded for a preceding transform partition 300 preceding the respective transform partition 300 in the predetermined transform partition order 210.

According to an embodiment the encoder 10 is configured to encode, for a predetermined transform partition 300, the transform 120 of the prediction residual of the predetermined partition 300 into the data stream 14 by encoding a last position indication 190 into the data stream 14 indicating a last transform coefficient position of the transform along a predetermined scan order scanning transform coefficients of the one-dimensional transform. Furthermore the encoder is configured to encode, for a predetermined transform partition 300, the transform 120 of the prediction residual of the predetermined partition 300 into the data stream 14 by encoding transform coefficients of the transform up to the last transform coefficient position along the predetermined scan order into the data stream, wherein transform coefficients of the transform beyond the last transform coefficient position along the predetermined scan order are zero are inferred to be zero. This can be performed similarly to the decoder, as described in FIG. 13.

The transform partitions, for example, are one sample wide along to the predetermined dimension 104 and the transform is a one-dimensional transform.

The transform, for example, is a DCT transform in case of the intra prediction mode 116 not being a planar mode, and a DST transform in case of the intra prediction mode 116 being the planar mode. Alternatively the transform is a linear transform a type of which is selected based on the intra prediction mode 116, a block size of the predetermined block 80 and/or an dedicated syntax element.

According to an embodiment the encoder 10 is configured to encode a split mode flag 160 for the predetermined block 80 of the picture into the data stream 14. If the split mode flag indicates a first split mode, the encoder is configured to perform the encoding of the partition dimension flag 114, the partitioning and the encoding of the transform 120 for each transform partition 300. If the split mode flag indicates a second split mode, instead of the encoding of the partition dimension flag 114, the partitioning and the encoding of the transform 120 for each transform partition 300, the encoder is configured to encode one transform 120 of the prediction residual within the predetermined block.

According to an embodiment, the encoder is configured to encode the partition dimension flag 114 by use of context-dependent entropy encoding using a context which depends on the intra-coding mode.

According to an embodiment, the encoder is configured to encode the partition dimension flag 114 by use of context-dependent entropy encoding using one of three contexts comprising the intra-coding mode 116 signaling a non-angular mode, the intra-coding mode 116 signaling a horizontal mode, the intra-coding mode 116 signaling a vertical mode.

According to an embodiment, the encoder is configured to set a width 101 of the transform partitions 300, measured along the predetermined dimension 104, depending on a size of the predetermined block 80 along the predetermined dimension 104 and/or depending on the intra-coding mode 116 for the predetermined block 80 and/or depending on whether the intra-coding mode 116 for the predetermined block 80 is an angular mode or not.

In the following an extension of the Intra Sub-Partitions (ISP) coding mode to 4×4 and a modification in the number of sub-partitions of 4×8 and 8×4 blocks is described and the extension is motivated. In order to keep the worst-case scenario throughput of 16 samples/cycle, there are sub-partitions which are independent from each other. The experimental results show a gain of 0.1% and 0.47% for CTC and class F respectively for the AI configuration and a gain of 0.01% and 0.25% for CTC and class F respectively in the RA case. The impact on the encoding run-time is 102% in the AI case and 100% in the RA one.

Additional test results are provided on the impact of extending the ISP concept to all ISP blocks that produce sub-partitions with a width smaller than 4. The experimental results show a gain of 0.05% and 0.44% for CTC and class F respectively for the AI configuration and a gain of 0.24% on class F (no changes on CTC) in the RA case.

On the other hand, the impact of the complete removal of sub-partitions with a width smaller than 4 of the current ISP design has been tested. This additional information shows a loss of 0.14% and 0.31% for CTC and class F respectively for the AI configuration and a loss of 0.04% and 0.23% for CTC and class F respectively in the RA case.

1 Introduction

As presented in [1], the Intra Sub-Partitions (ISP) coding mode divides luma intra-predicted blocks vertically or horizontally into 2 or 4 equal-size sub-partitions according to the CU dimensions. Table 6 shows the different possibilities.

TABLE 6

| Number of sub-partitions created by ISP according to the CU dimensions in the current VVC Draft | |
| --- | --- |
| Block size | Number of sub-partitions |
| 4 × 4 | Not divided |
| 4 × 8 and 8 × 4 | 2 |
| All other cases | 4 |

Each sub-partition is predicted, transformed, quantized and the entropy coded coefficients are sent to the decoder.

Then, the reconstructed samples of a sub-partition are used to generate the prediction of the next sub-partition, but the intra mode used is shared among all sub-partitions.

Since this process lies in the intra-prediction critical path (in the general case a sub-partition cannot be decoded until the previous sub-partition reconstructed samples have been obtained), a minimum of 16 samples in each sub-partition has to be enforced, which guarantees a worst-case scenario throughput of 16 samples/cycle. This is, in fact, the reason why 4×8 and 8×4 blocks have 2 sub-partitions (instead of 4) and 4×4 blocks cannot be sub-divided.

The following description presents an expansion of ISP that allows its usage on 4×4 blocks and modifies the number of sub-partitions in the case of 4×8 and 8×4 blocks, while keeping the 16 samples/cycle throughput constraint. This goal can be achieved by producing sub-partitions that are independent from each other, that is, by not using the reconstructed samples of a sub-partition to predict the next one.

The partitioning and reconstruction of a predetermined block 80 as described in the following, for example, with regard to the FIGS. 15 to 18 for 4×8 and 8×4 blocks can be performed by a decoder as described with regard to FIG. 12A, FIG. 12B, and FIG. 13 or by an encoder as described with regard to FIGS. 14A and 14B.

Note that the subsequent presentation of specific modifications on ISP represent only a presentations of possible embodiments and variants thereof are readily available. A less complicated or more straight forward variant, for example, is set out below in section 6.

2 ISP Extension to New Block Sizes

The modifications of ISP introduced in this contribution affect 4×4, 8×4 and 4×8 blocks.

2.1 4×4 Blocks

Figures 16A, 16B, 16C, 16D:
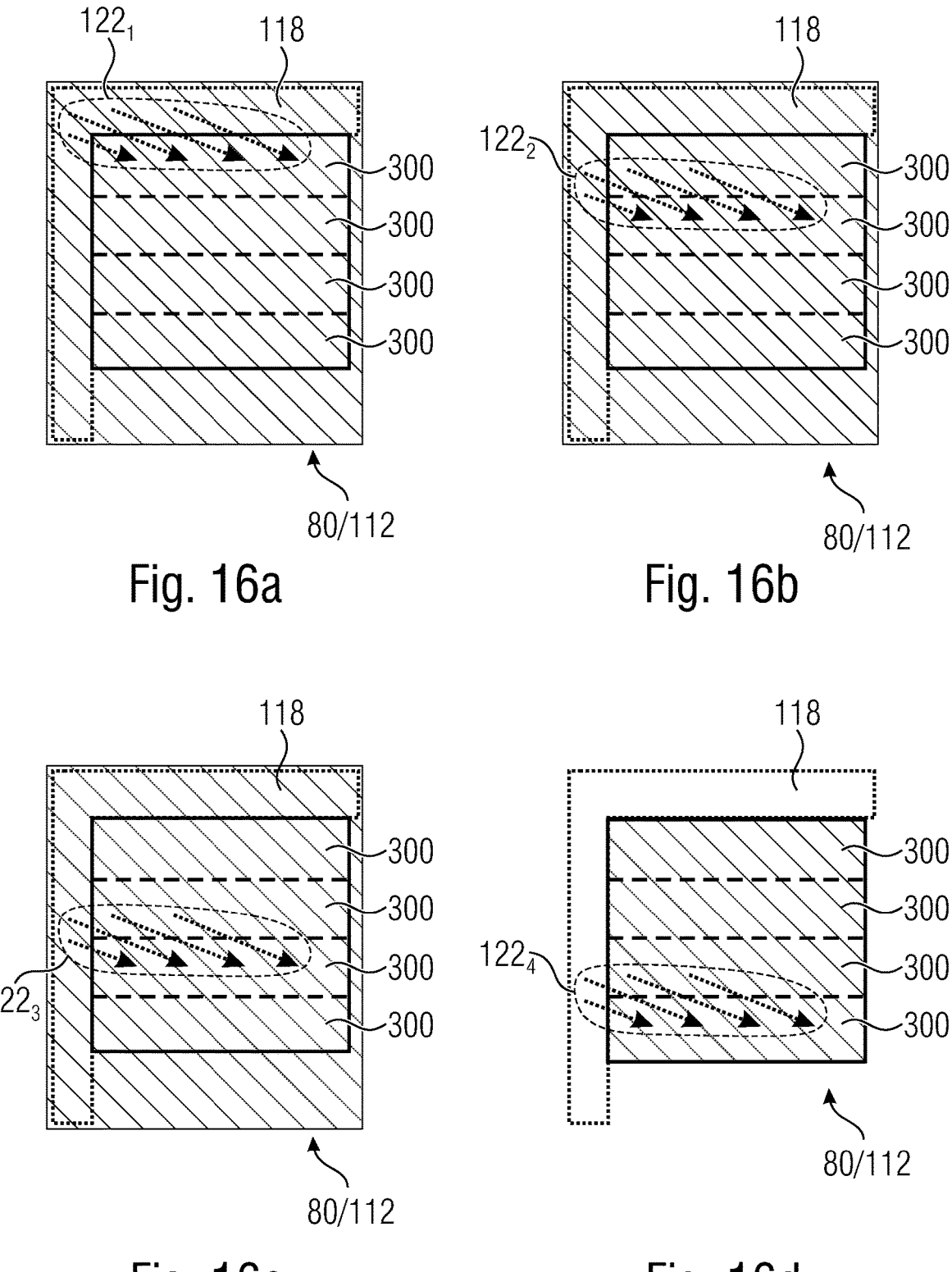
FIG. 16*a*-16*d* show schematic diagrams illustrating intra-prediction of individual transform partitions of a horizontally split 4×4 block.

According to the embodiments shown in FIG. 15 and FIG. 16, the predetermined block 80 is divided into four 4×1 (hor. split) or 1×4 (ver. split) partitions. However, the prediction signal 122 of each of them is generated using the neighbour samples 118 of the CU boundaries as reference samples. Consequently, each sub-partition (i.e. transform partition 300) is independent from each other and all of them can be processed in parallel in a single step. In other words, and reusing the terminology applied above, the block 80 is not partitioned or is left as one partition 112 and the reference samples 118 used for intra-prediction or prediction derivation lie all outside block 80. The partitioning is, rather, applied to the transform based residual coding as outlined below. Here, the one partition 112, i.e. the block, is partitioned into transform partitions 300 each of which is transformed separately leading to a respective transform 182 coded in the manner described above with respect to data structure 120.

FIG. 15a to FIG. 15d show an embodiment of the vertical split of a 4×4 block, i.e. a partitioning along a horizontal partitioning dimension. The reference samples 118 used to generate each 1×4 prediction are only CU boundary samples. Note that the prediction is the same as for a non-ISP case.

Note that the prediction samples of all transform-partitions 300 are the same as the ones that would be generated for a block not using ISP (excluding the reference samples and PDPC filtering operations that are disabled for all ISP blocks). The difference between a 4×4 block using ISP and one not using it lies in the transform (in the ISP case there are four 1-D transforms and in the non-ISP case there is a single 4×4 transform) and the entropy coding of the coefficients.

2.2 8×4 and 4×8 Blocks

Figure 17:
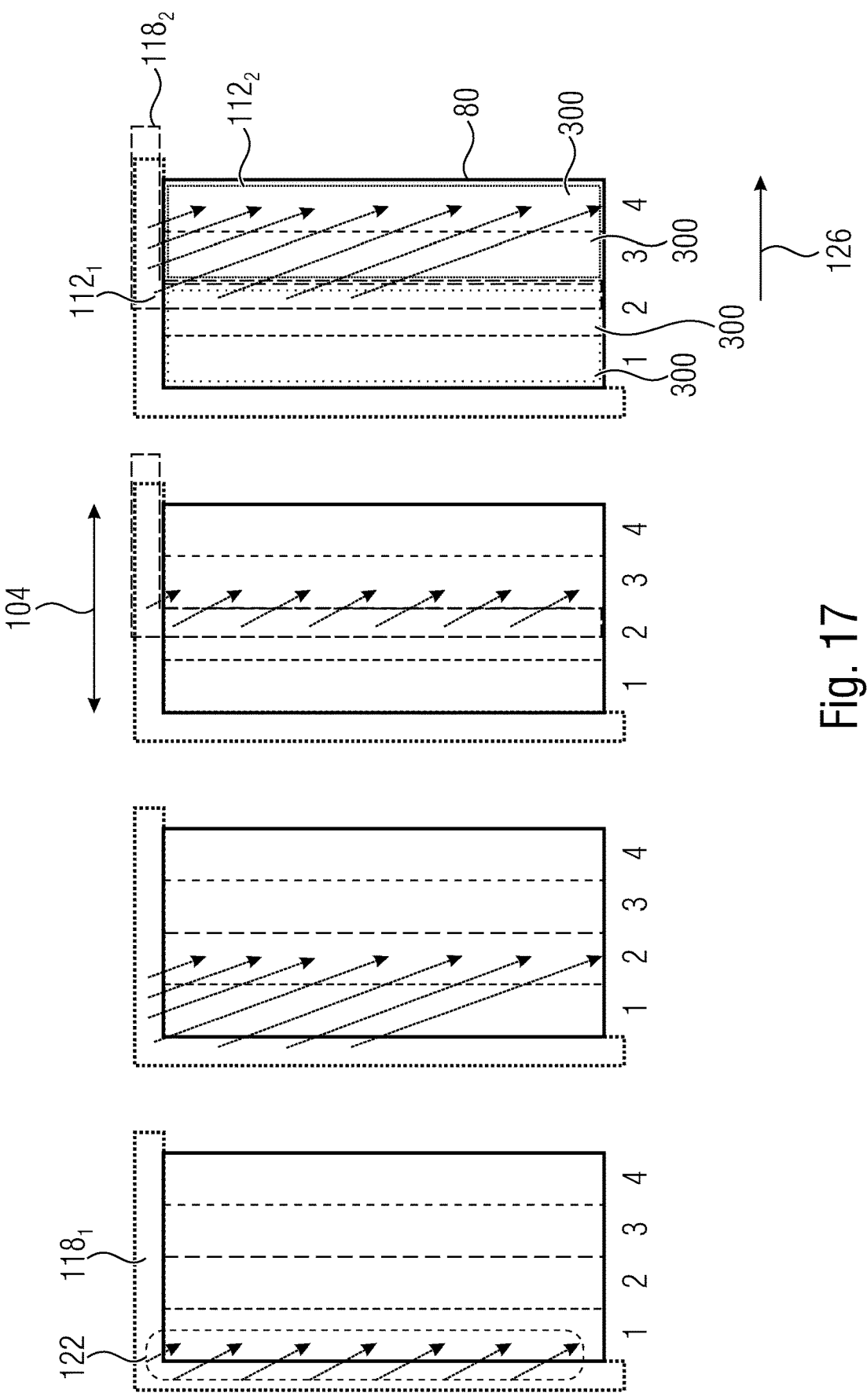
FIG. 17 shows schematic diagrams illustrating intra-prediction of individual transform partitions of a vertically split 4×8 block.
Figure 18:
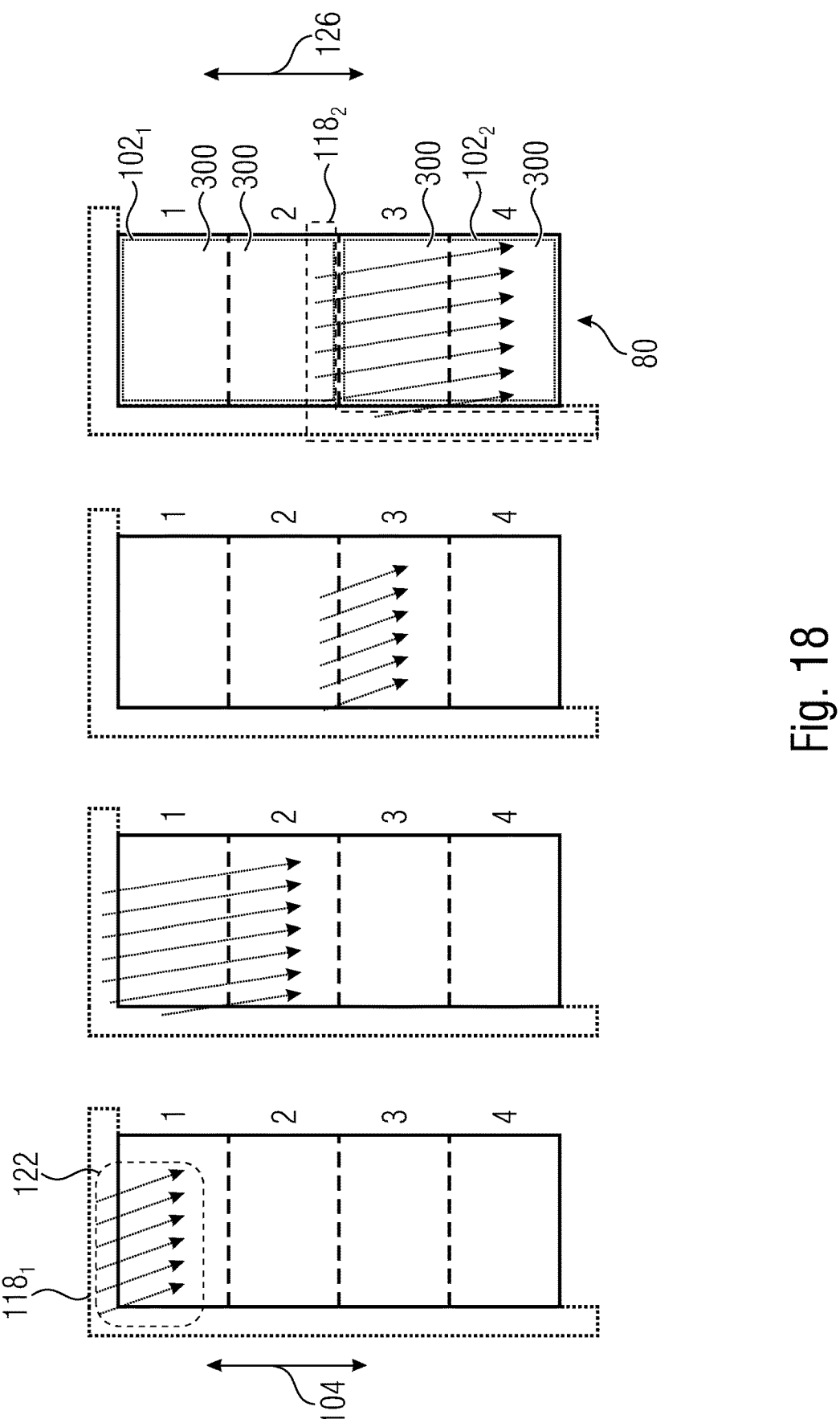
FIG. 18 shows schematic diagrams illustrating intra-prediction of individual transform partitions of a horizontally split 8×4 block.

In accordance with an embodiment as shown in FIG. 17 or FIG. 18, the ISP design is changed so that the number of transform-partitions 300 will be 4 with the number of sub-partitions 112$_1$ and 112$_2$ being 2. Each sub-partition 112$_1$ and 112$_2$ is sub-divided into two transform partitions 300. The prediction signals 122 of transform-partitions 2 and 4 cannot be generated using the reconstructed samples of transform-partitions 1 and 3 respectively, as shown in the embodiment of FIG. 17 or 18. Consequently, transform-partition 2 is independent from transform-partition 1 and analogously transform-partition 4 is independent from 3. Hence, a 4×8 or an 8×4 block could be processed in 2 cycles, which is equivalent to a throughout of 16 samples/cycle. The figures show this for horizontal and vertical partitioning.

FIG. 17 shows an embodiment of the vertical split of a predetermined block 80. The predetermined block 80 is, for example, a 4×M block divided into four 1×M transform-partitions 300 with M≥8, a 8×N block divided into four 2×N transform-partitions 300 with N≥4 or a 16×O block divided into four 4×O transform-partitions 300 with O≥1. The reconstructed samples from transform-partition 2 can be used to predict transform-partition 3, but the reconstructed samples from transform-partitions 1 and 3 cannot be used to predict 2 and 4 respectively. The vertical split corresponds to a partitioning along a horizontal partitioning dimension.

FIG. 18 shows an embodiment of the horizontal split of a predetermined block 80. The predetermined block 80 is, for example, a M×4 block divided into four M×1 transform blocks, with M≥8, a N×8 block divided into four N×2 transform-partitions 300 with N≥4 or a O×16 block divided into four O×4 transform-partitions 300 with O≥4. The reconstructed samples from transform-partition 2 can be used to predict transform-partition 3, but the reconstructed samples from transform-partitions 1 and 3 cannot be used to predict 2 and 4 respectively. The horizontal split corresponds to a partitioning along a vertical partitioning dimension.

As shown in FIG. 17 and FIG. 18 a herein described decoder can be configured to perform the intra-predicting 122 the predetermined block 80 depending on one or more already reconstructed samples 118$_1$ neighboring the predetermined block 80 in a manner depending on the intra-coding mode to obtain a predictor for the predetermined block 80 and the reconstructing the predetermined block 80 by correcting the predictor within each transform partition 300 using the transform of the prediction residual decoded for the respective transform partition 300 by sequentially reconstructing groups of transform partitions 300 into which the transform partitions 300 of the predetermined block 80 are grouped to form a sub-partition, e.g. 112$_1$ and 112$_2$ as shown in FIG. 17 or 102$_1$ and 102$_2$ as shown in FIG. 18, for each group of transform partitions 300 according to a predetermined sub-partition order 126 which sequentially traverses the sub-partitions 102/112 along the predetermined dimension 104 by, for a current sub-partition, e.g. the sub-partition 112$_1$ shown in FIG. 17 or the sub-partition 102$_1$ shown in FIG. 18, and before proceeding with a subsequent sub-partition, e.g. the sub-partition 112$_2$ shown in FIG. 17 or the sub-partition 102$_2$ shown in FIG. 18. The decoder is configured to derive 122 a predictor for the current sub-partition by filling the current sub-partition depending on one or more already reconstructed samples 118$_1$ neighboring the current sub-partition in a manner depending on the intra-coding mode. Furthermore the decoder is configured to reconstruct the current sub-partition by correcting the predictor within each transform partition 300 comprised by the group of transform partitions forming the current sub-partition using the transform of the respective transform partition 300.

As shown in FIG. 17 and FIG. 18 a herein described encoder is similarly to the decoder, for example, configured to perform the intra-predicting 122 the predetermined block 80 depending on one or more already reconstructed samples 118$_1$ neighboring the predetermined block 80 in a manner depending on the intra-coding mode to obtain a predictor for the predetermined block 80 and determine prediction residual of the predetermined block 80 for correcting the predictor within each transform partition 300 using the transform of the prediction residual to be encoded for the respective transform partition 300 by sequentially subjecting groups of transform partitions 300 into which the transform partitions 300 of the predetermined block 80 are grouped to form a sub-partition, e.g. 112$_1$ and 112$_2$ as shown in FIG. 17 or 102$_1$ and 102$_2$ as shown in FIG. 18, for each group of transform partitions according to a predetermined sub-partition order 126 which sequentially traverses the sub-partitions 102/112 along the predetermined dimension 104, to a prediction so as to derive a predictor for a current sub-partition, e.g. the sub-partition 112$_1$ shown in FIG. 17 or the sub-partition 102$_1$ shown in FIG. 18, by filling the current sub-partition depending on one or more already reconstructed samples 118$_1$ neighboring the current sub-partition in a manner depending on the intra-coding mode, determining the transform of the prediction residual within each transform partition 300 comprised by the group of transform partitions forming the current sub-partition 102/112 so as to serve, before proceeding with a subsequent sub-partition, e.g. the sub-partition 112$_2$ shown in FIG. 17 or the sub-partition 102$_2$ shown in FIG. 18, for reconstructing the current sub-partition by correcting the predictor within each transform partition 300 comprised by the group of transform partitions forming the current sub-partition 102/112 using the transform of the respective transform partition.

According to FIG. 17 and FIG. 18, the decoder and/or encoder is, for example, configured to use already reconstructed samples 118$_1$ neighboring the predetermined block 80 for predicting 122 a predictor for a first and a second transform partition 300, grouped together to form a first sub-partition, e.g. the sub-partition 112$_1$ shown in FIG. 17 or the sub-partition 102$_1$ shown in FIG. 18. For predicting 122 a predictor for a third and a fourth transform partition 300, grouped together to form a second sub-partition, e.g., the sub-partition 112$_2$ shown in FIG. 17 or the sub-partition 102$_2$ shown in FIG. 18, the decoder uses, for example, already reconstructed samples 1182 neighboring the predetermined block 80 and/or already reconstructed samples 1182 of the second transform partition 300 neighboring the third transform partition 300. In other words, for predicting 122 a predictor for transform partitions 300 of the second sub-partition 112$_2$/102$_2$ the decoder is, for example, configured to use already reconstructed samples 1182 neighboring the second sub-partition 112$_2$/102$_2$, wherein at least some of the already reconstructed samples can be associated with already reconstructed samples of a preceding sub-partition, e.g. the sub-partition 112$_1$ shown in FIG. 17 or the sub-partition 102$_1$ shown in FIG. 18.

According to an embodiment, sub-partitions of a predetermined block 80 are reconstructed or encoded sequentially. In other words, a first sub-partition, e.g. the sub-partition 112$_1$ according to FIG. 17 or the sub-partition 102$_1$ according to FIG. 18, is reconstructed or encoded in a first cycle and afterwards a second sub partition, e.g. the sub-partition 112$_2$ according to FIG. 17 or the sub-partition 102$_2$ according to FIG. 18, is reconstructed or encoded in a second cycle. Thus all transform partitions of the same sub partition, are reconstructed or encoded in the same cycle. In other words transform partitions associated with the same sub-partition can be reconstructed or encoded in parallel. Thus, according to an embodiment, the complete predetermined block 80 in FIG. 15 or FIG. 16 can be understood as one partition (i.e. sub-partition), since all transform partitions 300 are reconstructed in parallel.

According to an embodiment, the decoder and/or the encoder is configured so that a number of transform partitions 300 per sub-partition 102/112 depends on dimensions of the predetermined block 80.

According to an embodiment, the decoder and/or the encoder is configured so that the number of transform partitions 300 per sub-partition 102/112 is one in case of dimensions of the predetermined block 80 exceeding a predetermined threshold, and larger than one in case of dimensions of the predetermined block 80 not exceeding the predetermined threshold. If the predetermined block exceeds a certain dimension, it is advantageous to refrain from dividing a sub-partition further to enhance the decoding run-time or the encoding run-time. The predetermined threshold is, for example, a block dimension of 64×64 samples. In other words the usage of ISP is limited to dimensions of the predetermined block 80 not exceeding the predetermined threshold.

According to an embodiment, the decoder and/or the encoder is configured so that a number of sub-partitions 102/112 in the predetermined block, depends on dimensions of the predetermined block and/or the predetermined dimension.

According to an embodiment, the decoder and/or the encoder is configured so that the number of sub-partitions 102/112 in the predetermined block 80 is one in case of dimensions of the predetermined block 80 falling below a further predetermined threshold, and larger than one in case of dimensions of the predetermined block 80 not falling below the further predetermined threshold. The further predetermined threshold is, for example, determined such that the predetermined block 80 comprises at least 16 samples. The further predetermined threshold is, for example, a dimension of the predetermined block 80 larger than 4×4 samples, 8×2 samples, 2×8 samples, 1×16 or 16×1 samples. In the case of 4×4 samples, as shown in FIG. 15 or FIG. 16, the predetermined block 80 comprises, for example, 1 sub-partition with 4 1×4 transform partitions or 4 4×1 transform partitions. In the case of 2×8 samples, the predetermined block 80 comprises, for example, 1 sub-partition with 2 1×8 transform partitions and in the case of 8×2 samples, the predetermined block 80 comprises, for example, 1 sub-partition with 2 8×1 transform partitions. In the case of a predetermined block dimension of 1×16 or 16×1 samples, the whole block is at the same time a sub-partition and a transform partition. If the predetermined block 80 comprises only one sub-partition, this sub-partition equals, for example, the whole predetermined block 80.

Alternatively, as shown in FIG. 17 and FIG. 18, a larger dimension of the predetermined block 80 can result in 2 or more sub-partitions comprising 2 or more transform partitions.

According to an embodiment, the decoder and/or the encoder is configured so that a number of sub-partitions in the predetermined block, depends on dimensions of the predetermined block in that same equals a first number in case of the dimensions of the predetermined block assuming a first width and first height and a second number different from the first in case of the dimensions of the predetermined block assuming a second width equaling the first height and second height equaling the first width. As shown in FIGS. 15 to 18, the number of sub-partitions differs for blocks with equal width and height compared to blocks with the same width but a different height. A predetermined block 80 with a 4×4 dimension is, for example, not divided, i.e. the whole block represents one partition (i.e. sub-partition) with 4 transform partitions. On the contrary a predetermined block with a 4×8 dimension or a 8×4 dimension is divided into two sub-partitions. This can also apply for larger blocks. A predetermined block 80 with a 128×128 dimension is, for example, not divided, but a predetermined block 80 with a 128×64 dimension can be divided vertically (along a horizontal partition dimension) into 4 sub-partitions.

3 Experimental Results

According to the common test conditions [2], the proposed method is evaluated for intra-only (AI), random-access (RA) and low-delay-b (LDB) configuration with the VTM-4.0.1 software. The corresponding simulations were conducted on an Intel Xeon cluster (E5-2697A v4, AVX2 on, turbo boost off) with Linux OS and a GCC 7.2.1 compiler.

TABLE 7

Results for the AI configuration

| | All Intra Main10 Over VTM-4.0.1 | | | | |
|---|---|---|---|---|---|
| | Y | U | V | EncT | DecT |
| Class A1 | −0.03% | 0.03% | 0.05% | 102% | 100% |
| Class A2 | −0.01% | −0.03% | 0.02% | 101% | 101% |
| Class B | −0.05% | −0.05% | −0.13% | 102% | 101% |
| Class C | −0.22% | −0.14% | −0.20% | 102% | 103% |
| Class E | −0.19% | −0.13% | −0.11% | 102% | 100% |
| Overall | −0.10% | −0.07% | −0.09% | 102% | 101% |
| Class D | −0.22% | −0.20% | −0.22% | 102% | 103% |
| Class F | −0.47% | −0.44% | −0.32% | 102% | 103% |

TABLE 8

Results for the RA configuration

| | Random Access Main10 Over VTM-4.0.1 | | | | |
|---|---|---|---|---|---|
| | Y | U | V | EncT | DecT |
| Class A1 | 0.00% | 0.02% | 0.05% | 100% | 100% |
| Class A2 | 0.01% | 0.08% | −0.07% | 100% | 100% |
| Class B | −0.01% | 0.10% | 0.00% | 100% | 100% |
| Class C | −0.04% | 0.11% | 0.15% | 100% | 102% |
| Class E | | | | | |
| Overall | −0.01% | 0.08% | 0.04% | 100% | 100% |
| Class D | −0.10% | −0.20% | −0.07% | 100% | 100% |
| Class F | −0.25% | −0.07% | −0.23% | 100% | 100% |

TABLE 9

Results for the LDB configuration

| | Low Delay B Main10 Over VTM-4.0.1 | | | | |
|---|---|---|---|---|---|
| | Y | U | V | EncT | DecT |
| Class A1 | | | | | |
| Class A2 | | | | | |
| Class B | −0.02% | 0.10% | −0.43% | 100% | 100% |
| Class C | 0.03% | −0.15% | −0.26% | 100% | 102% |
| Class E | −0.04% | −1.21% | −1.07% | 99% | 100% |
| Overall | −0.01% | −0.31% | −0.53% | 100% | 101% |
| Class D | 0.01% | −0.44% | −0.19% | 101% | 100% |
| Class F | −0.04% | 0.22% | 0.22% | 100% | 101% |

4 Additional Information

4.1 Usage of Sub-Partitions with a Width Smaller than 4

The usage of sub-partitions with a width smaller than 4 has been mentioned on the JVET reflector as a potential hardware concern, given that samples are typically allocated in a raster scanner fashion and certain implementations write the output of reconstructed samples in 4×1 groups. Thus, for example, 1×N or 2×N sub-partition could result in a problem. Prediction from 1×N sub-partition is not a big issue, writing out 1×N sub-partition data is an issue, as data is normally written out 4 or 8 samples per cycle horizontally. To make it work, it would be necessary to keep a 4×N intermediate buffer (register) to store this data, and then write e.g. 4 samples at a time to the memory (for e.g. de-blocking). The same issue would occur with reading a 1×N inverse transform output for the reconstruction. This adds latency, and may also require double buffering. For this reason, in the following additional information is provided to evaluate the impact of the usage of these sub-partitions.

4.1.1 Removal of Sub-Partitions with a Width Smaller than 4

This modification affects the vertical split of 4×N and 8×N blocks as follows:

4×N: There is no vertical split anymore, i.e. along a horizontal partition dimension. Consequently, whenever ISP is used on one of these blocks, the decoder or the encoder infers that a horizontal split is used and hence it is not necessary to parse the split flag syntax element. Thus, for example 4×1 transform partitions are used instead of 1×N transform partitions.

8×N: The vertical split produces 2 sub-partitions instead of 4. Thus the predetermined block 80 is, for example, divided into 4×N sub-partitions instead of 1×N or 2×N sub-partitions Note that this modified ISP approach was proposed as Test 1.1.2 in the CE3 of the January 2019 Marrakech Meeting in [1]. The results of this approach on top of VTM-4.0.1 are presented in Table, Table and Table.

TABLE 10

Results without sub-partitions with a width smaller than 4 for the AI configuration

| | All Intra Main10 Over VTM-4.0.1 | | | | |
|---|---|---|---|---|---|
| | Y | U | V | EncT | DecT |
| Class A1 | 0.01% | 0.00% | −0.03% | 100% | 99% |
| Class A2 | 0.01% | −0.04% | −0.01% | 99% | 102% |

TABLE 10-continued

| Results without sub-partitions with a width smaller than 4 for the AI configuration | | | | |
|---|---|---|---|---|
| | | All Intra Main10 Over VTM-4.0.1 | | |
| | Y | U | V | EncT | DecT |
| Class B | 0.06% | 0.08% | 0.09% | 99% | 100% |
| Class C | 0.21% | 0.21% | 0.18% | 99% | 100% |
| Class E | 0.42% | 0.35% | 0.26% | 99% | 98% |
| Overall | 0.14% | 0.12% | 0.10% | 99% | 100% |
| Class D | 0.25% | 0.28% | 0.12% | 99% | 100% |
| Class F | 0.31% | 0.16% | 0.22% | 100% | 100% |

TABLE 11

| Results without sub-partitions with a width smaller than 4 for the RA configuration | | | | |
|---|---|---|---|---|
| | | Random Access Main10 Over VTM-4.0.1 | | |
| | Y | U | V | EncT | DecT |
| Class A1 | −0.01% | −0.09% | −0.06% | 101% | 101% |
| Class A2 | 0.04% | −0.04% | 0.05% | 101% | 101% |
| Class B | 0.03% | 0.26% | 0.10% | 100% | 100% |
| Class C | 0.09% | 0.27% | 0.42% | 100% | 100% |
| Class E | | | | | |
| Overall | 0.04% | 0.13% | 0.14% | 100% | 100% |
| Class D | 0.13% | 0.13% | −0.19% | 100% | 101% |
| Class F | 0.23% | 0.13% | 0.17% | 100% | 99% |

TABLE 12

| Results without sub-partitions with a width smaller than 4 for the LDB configuration | | | | |
|---|---|---|---|---|
| | | Low Delay B Main10 Over VTM-4.0.1 | | |
| | Y | U | V | EncT | DecT |
| Class A1 | | | | | |
| Class A2 | | | | | |
| Class B | 0.04% | 0.22% | −0.36% | 100% | 100% |
| Class C | 0.00% | −0.26% | −0.20% | 100% | 102% |
| Class E | 0.03% | −0.84% | 0.29% | 100% | 101% |
| Overall | 0.02% | −0.20% | −0.14% | 100% | 101% |
| Class D | 0.01% | 0.69% | −0.58% | 100% | 100% |
| Class F | 0.14% | 0.42% | 0.17% | 101% | 102% |

4.1.2 Extension of the ISP with Independent Sub-Partitions Approach to Sub-Partitions with a Width Smaller than 4

In this case sub-partitions with a width smaller than 4 are not removed from the ISP structure. Instead, the same design as the one introduced in section 2 for 4×4, 8×4 and 4×8 is applied to them. Two different cases are distinguished:

The vertical split of 4×N blocks is treated the same way as the vertical split of 4×4 explained in section 2.1. For example, a 4×32 block could be vertically divided into four independent 1×32 transform-partitions 300 forming one partition 112.

The vertical split of 8×N blocks is treated the same way as the vertical split of 8×4 blocks explained in section 2.2. For instance, an 8×16 block could be divided into four 2×16 transform-partitions 300, where transform-partitions 1 and 2 form partition 112$_1$ and transform-partitions 3 and 4 form partition 112$_2$ and transform-partitions 2 and 4 could not use the reconstructed samples of transform-partitions 1 and 3 respectively to generate its corresponding prediction signals.

This method allows writing reconstructed samples in groups of at least 4×4 samples in all the vertical split cases (in the case of the horizontal split the minimum is still 16×1). The results of this approach (using independent transform-partitions on 4×4, 4×8, 8×4 and the vertical split of 4×N and 8×N blocks) on top of VTM-4.0.1 are presented in Table, Table and Table.

Thus, according to an embodiment, the decoder is configured to divide the predetermined block into 16×M sub blocks, with M_1 or alternatively into 4×N sub-blocks or N×4 sub-blocks, with N_4. This sub-blocks are optionally partitioned into 2 or more smaller transform partitions, as described above.

TABLE 13

| Results on using independent sub-partitions on 4 × 4, 4 × 8, 8 × 4 and the vertical split of 4 × N and 8 × N blocks for the AI configuration | | | | |
|---|---|---|---|---|
| | | All Intra Main10 Over VTM-4.0.1 | | |
| | Y | U | V | EncT | DecT |
| Class A1 | 0.00% | 0.04% | 0.02% | 101% | 101% |
| Class A2 | 0.01% | −0.04% | 0.00% | 101% | 101% |
| Class B | −0.02% | 0.06% | −0.01% | 101% | 101% |
| Class C | −0.13% | −0.05% | 0.00% | 101% | 102% |
| Class E | −0.08% | −0.01% | −0.07% | 101% | 99% |
| Overall | −0.05% | 0.00% | −0.01% | 101% | 101% |
| Class D | −0.19% | −0.10% | −0.11% | 101% | 102% |
| Class F | −0.44% | −0.41% | −0.27% | 101% | 103% |

TABLE 14

| Results on using independent sub-partitions on 4 × 4, 4 × 8, 8 × 4 and the vertical split of 4 × N and 8 × N blocks for the RA configuration | | | | |
|---|---|---|---|---|
| | | Random Access Main10 Over VTM-4.0.1 | | |
| | Y | U | V | EncT | DecT |
| Class A1 | 0.01% | −0.08% | 0.09% | 101% | 100% |
| Class A2 | 0.02% | 0.15% | 0.01% | 101% | 101% |
| Class B | 0.00% | 0.22% | 0.16% | 100% | 99% |
| Class C | −0.04% | 0.20% | 0.32% | 100% | 102% |
| Class E | | | | | |
| Overall | 0.00% | 0.14% | 0.16% | 100% | 100% |
| Class D | −0.04% | −0.03% | −0.23% | 100% | 100% |
| Class F | −0.24% | −0.18% | −0.36% | 100% | 100% |

TABLE 15

| Results on using independent sub-partitions on 4 × 4, 4 × 8, 8 × 4 and the vertical split of 4 × N and 8 × N blocks for the LDB configuration | | | | |
|---|---|---|---|---|
| | | Low Delay B Main10 Over VTM-4.0.1 | | |
| | Y | U | V | EncT | DecT |
| Class A1 | | | | | |
| Class A2 | | | | | |
| Class B | −0.01% | 0.11% | −0.36% | 100% | 100% |
| Class C | −0.01% | −0.36% | −0.34% | 100% | 102% |
| Class E | −0.03% | −0.23% | 0.18% | 100% | 101% |
| Overall | −0.02% | −0.13% | −0.22% | 100% | 101% |
| Class D | 0.00% | 0.68% | −0.21% | 100% | 101% |
| Class F | −0.09% | 0.60% | −0.05% | 100% | 101% |

5 Conclusion

The reported results show a gain in CTC and Class F with a very little (AI) or no impact (RA and LDB) in the encoding run-time.

Regarding the additional information presented, the experimental results show that the removal of the sub-partitions with a width smaller than 4 produces a noticeable loss, especially in the case of Classes C and E in AI and Class F in all configurations. Besides, this loss produces a negligible reduction in the encoding run-time. On the other hand, the extension of the new ISP design to blocks producing sub-partitions with a width smaller than 4 has a better performance than the complete removal of these sub-partitions in terms of BD-Rate gain, given that it does not produce any loss and it produces a significant gain in class F with a very small impact on the encoding run-time.

6 ISP Partitioning Structure Complexity Reduction Aspects

As already stated above, variants of the above-outlined concept exist, with one being present here. As outlined above, in a typical decoder hardware implementation, one of the most critical aspects that affect the top-level system pipeline is processing dependencies. In the case of ISP, the minimum of 16 samples constraint ensures that the in-loop dependency present in intra prediction is not a problem in terms of throughput, since the smallest luma block in VVC has 4×4 dimensions, i.e., 16 samples.

However, ISP introduces new very narrow shapes in the VVC design, namely 1×N, 2×N, M×2 and M×1. The processing dependencies could become a problem in the case of the 1×N and 2×N subpartitions, given that pixels are typically allocated in the internal line buffer memory in a raster-scan fashion accessing samples in groups of 4×1. For this reason, filling this buffer would be inefficient for all subpartitions having a width less than 4. The effect of this problem could be reduced by a different hardware implementation (such as modifying the way pixels are allocated or using a transpose memory), but it would still imply an increase in the hardware implementation complexity anyway.

Figure 19A:
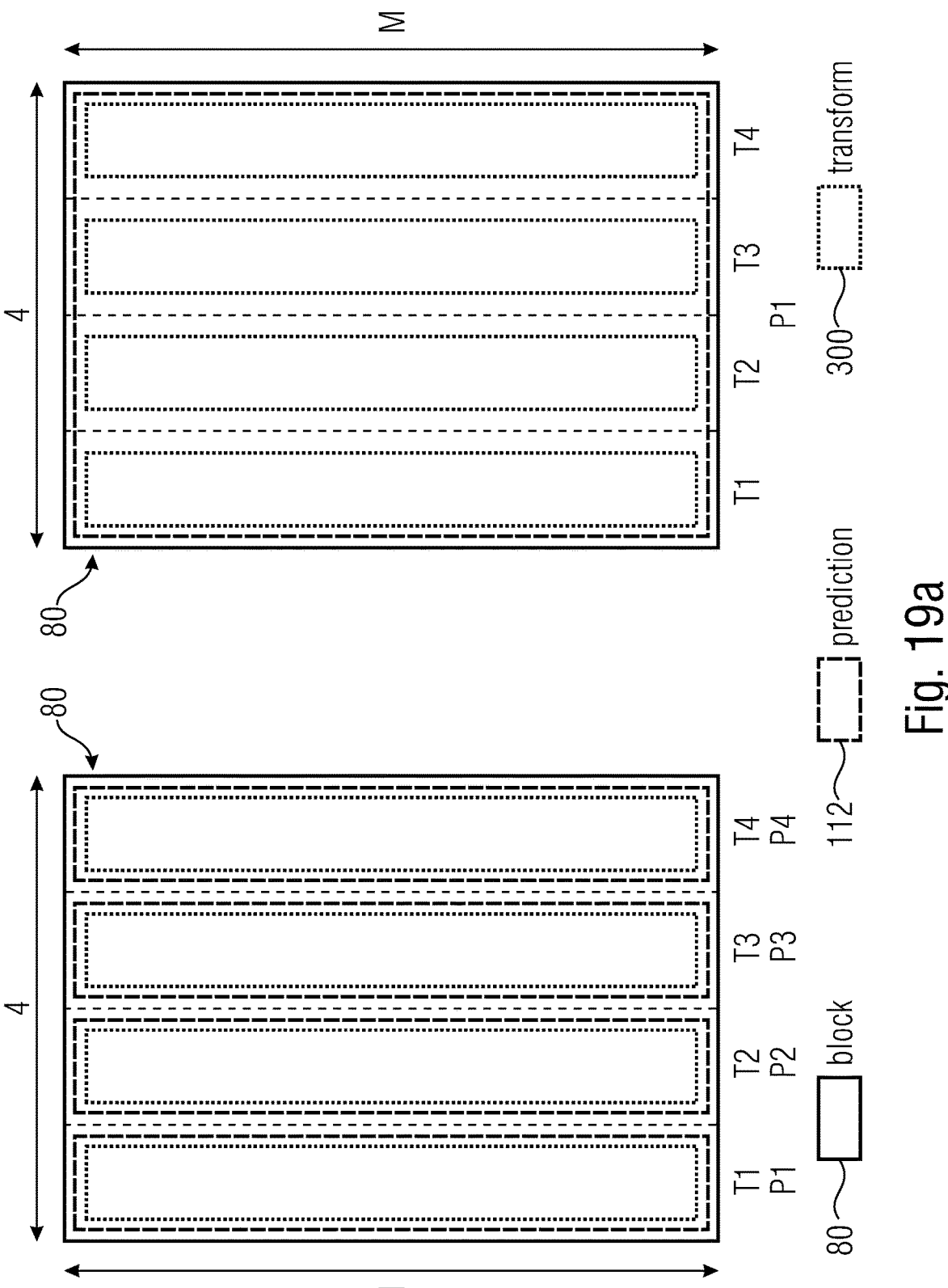
FIG. 19*a* shows a vertical split of a 4×M block (M>8) in the ISP design in the VVC Draft 5 (left) and in the proposed version (right)
Figure 19B:
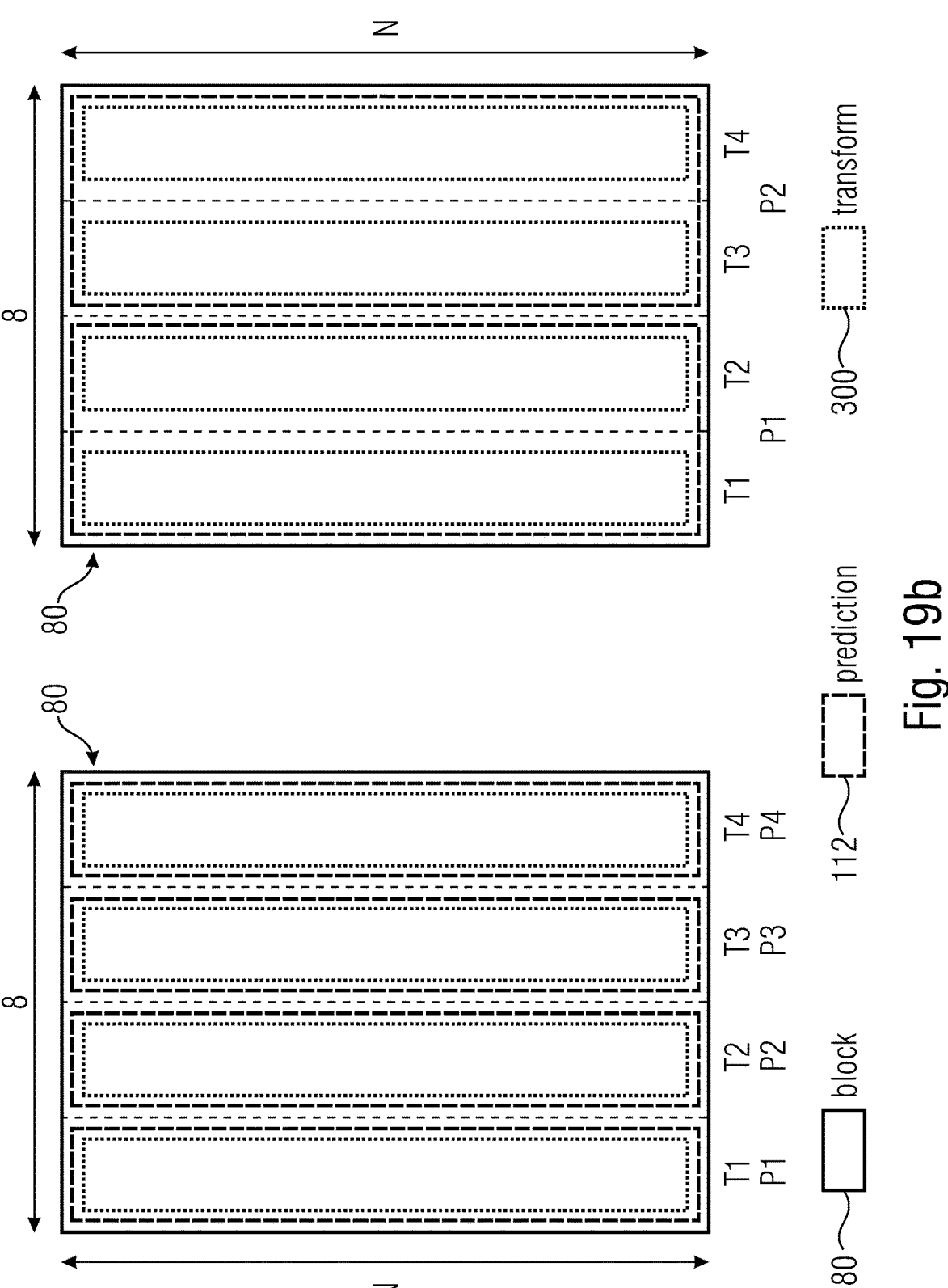
FIG. 19*b* shows a vertical split of a 8×N block (N>4) in the ISP design in the VVC Draft 5 (left) and in the proposed version (right).

FIG. 19a and FIG. 19b show examples of different sub-partitions 112/P and transform partitions 300/T for different block sizes of a predetermined block 80, wherein the left examples show a conventional partitioning and the right examples show a proposed partitioning according to the herein described invention. The decoding and/or encoding of the predetermined block 80 on the right of FIG. 19a can be performed similar or as described in FIG. 15a to FIG. 15d and the decoding and/or encoding of the predetermined block 80 on the right of FIG. 19b can be performed similar or as described in FIG. 17.

In order to reduce the hardware implementation complexity, a minimum prediction width of 4 (the transform size remains unaltered) is established. This affects the vertical split of 4×M (with M>4) and 8×N (with N>4) blocks in the following way:

4×M: as shown in FIG. 1a, the whole block is predicted at once like a non-ISP block and a 4×M residual signal is calculated. Then, the residual is divided into four 1×M (or two 2×8 for M=8) transform subpartitions that are processed independently.

8×N: as shown in FIG. 1b, the block is divided into two 4×N prediction subpartitions P1 and P2. After calculating the prediction for P1, a 4×N residual signal is generated and divided into two 2×N transform subpartitions T1 and T2 that are processed independently. Then, the same process is repeated analogously for P2, T3 and T4. However, in this case the prediction signal can use the reconstructed samples of the P1 area.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] S. De-Luxan-Hernandez, V. George, J. Ma, T. Nguyen, H. Schwarz, D. Marpe and T. Wiegand, "CE3: Intra Sub-Partitions Coding Mode (Tests 1.1.1 and 1.1.2)," in Document JVET-M0102, Marrakech, M A, 2019.

[2] F. Bossen, J. Boyce, X. Li, V. Seregin and K. Sühring, "JVET common test conditions and software reference configurations for SDR video," Document JVET-M1010, Marrakech, M A, 2019.

The invention claimed is:

1. A method for decoding a block of a picture, the method comprising:

decoding, from a data stream, an intra-coding mode for the block, wherein the block is partitioned into four equally sized transform partitions based on a partition dimension flag and a size of the block;

determining, based on the size of the block, a plurality of prediction partitions that the block is divided;

deriving a predictor for a first prediction partition of the plurality of prediction partitions using at least one already reconstructed sample neighboring the first prediction partition and the intra-coding mode, wherein the first prediction partition corresponds to two of the transform partitions;

after deriving the predictor for the first prediction partition, deriving a first prediction residual for a first transform partition and a second prediction residual for a second transform partition, wherein the first and the second transform partitions correspond to the first prediction partition; and combining the predictor of the first prediction partition with the first prediction residual and the second prediction residual to reconstruct the first prediction partition.

2. The method of claim 1, further comprising:

reconstructing the block using the reconstructed prediction partition, a prediction residual for each of the four transform partitions, and a predictor of each additional prediction partition of the plurality of prediction partitions.

3. The method of claim 1, further comprising:

decoding, from the data stream, the partition dimension flag indicating a partitioning direction that the block is divided; and determining that the block is divided along the partitioning direction, indicated by the partition dimension flag, into the four equally sized transform partitions, wherein each of the transform partitions span a vertical height of the block when the partitioning direction is horizontal or span a horizontal width of the block when the partitioning direction is vertical.

4. The method of claim 3, wherein:

a first dimension of each of the transform partitions and a first dimension of the block are the same while a second dimension of the transform partitions and a second dimension of the block are different.

5. The method of claim 3, wherein:

when the size of the block is 8×4 or 4×8, the method comprises determining that the block is divided into two equally sized transform partitions.

6. The method of claim 1, wherein:

the method further comprises decoding, from the data stream, the partition dimension flag indicating a partitioning direction that the block is divided;

when the partition dimension flag indicates that the partitioning direction of the block is horizontal, the method comprises determining that a size of each of the transform partitions is defined as $$\left(W \times \frac{H}{K}\right);$$

and when the partition dimension flag indicates that the partitioning direction of the block is vertical, the method comprises determining that a size of each of the transform partitions is defined as $$\left(\frac{W}{K} \times H\right),$$

where W is a width of the block, H is a height of the block, and K is four.

7. The method of claim 1, wherein:

the intra-coding mode is one out of a set of supported intra-coding modes including angular modes and at least one non-angular mode;

the first prediction partition includes at least sixteen samples;

the first transform partition is a first size; and the first prediction partition is a second size that is different than the first size.

8. The method of claim 1, wherein deriving the first prediction residual and the second prediction residual, comprises:

decoding a transform of the prediction residual from the data stream; or inferring a value of the prediction residual.

9. The method of claim 1, wherein:

the plurality of prediction partitions is two.

10. The method of claim 1, further comprising:

deriving a predictor for each additional prediction partition of the plurality of prediction partitions using at least one already reconstructed sample and the intra-coding mode.

11. The method of claim 10, wherein the at least one already reconstructed sample used for predicting each additional prediction partition are:

external to and neighboring the block, or external to and neighbor each of the additional prediction partitions, respectively.

12. The method of claim 1, wherein:

reconstructed samples at a location corresponding to one of the four transform partitions included in the reconstructed prediction partition are not used to derive a predictor corresponding to another prediction partition of the plurality of prediction partitions; and reconstructed samples at a location corresponding to another one of the four transform partitions included in the reconstructed prediction partition are used to derive a predictor corresponding to another prediction partition of the plurality of prediction partitions.

13. The method of claim 1, wherein a prediction residual for each of the four transform partitions is derived after the predictor for the prediction partition is derived.

14. A decoder for decoding a block of a picture, the decoder comprising a processor configured to:

decode, from a data stream, an intra-coding mode for the block, wherein the block is partitioned into four equally sized transform partitions based on a partition dimension flag and a size of the block;

determine, based on the size of the block, a plurality of prediction partitions that the block is divided;

derive a predictor for a first prediction partition of the plurality of prediction partitions using at least one already reconstructed sample neighboring the first prediction partition and the intra-coding mode, wherein the first prediction partition corresponds to two of the transform partitions;

after deriving the first predictor for the prediction partition, derive a first prediction residual for a first transform partition and a second prediction residual for a second transform partition, wherein the first and the second transform partitions correspond to the first prediction partition; and combine the predictor of the first prediction partition with the first prediction residual and the second prediction residual to reconstruct the first prediction partition.

15. The decoder of claim 14, wherein the decoder is further configured to:

reconstruct the block using the reconstructed prediction partition, a prediction residual for each additional transform partition of the four transform partitions, and a predictor of each additional prediction partition of the plurality of prediction partitions.

16. The decoder of claim 14, wherein the decoder is further configured to:

decode, from the data stream, the partition dimension flag indicating a partitioning direction that the block is divided; and determine that the block is divided along the partitioning direction, indicated by the partition dimension flag, into four equally sized transform partitions, wherein each of the transform partitions span a vertical height of the block when the partitioning direction is horizontal or span a horizontal width of the block when the partitioning direction is vertical.

17. The decoder of claim 16, wherein a first dimension of each of the transform partitions and a first dimension of the block are the same while a second dimension of the transform partitions and a second dimension of the block are different.

18. The decoder of claim 16, wherein:

when the size of the block is 8×4 or 4×8, the decoder is configured to determine that the block is divided into is two equally sized transform paritions.

19. The decoder of claim 14, wherein:

the decoder is further configured to decode, from the data stream, the partition dimension flag indicating a partitioning direction that the block is divided;

when the partition dimension flag indicates that the partitioning direction of the block is horizontal, the decoder is configured to determine that a size of each of the transform partitions is defined as $$\left(W \times \frac{H}{K}\right);$$

and when the partition dimension flag indicates that the partitioning direction of the block is vertical, the decoder is configured to determine that a size of each of the transform prediction partitions is defined as $$\left(\frac{W}{K} \times H\right),$$

where W is a width of the block, H is a height of the block, and K is four.

20. The decoder of claim 14, wherein:

the intra-coding mode is one out of a set of supported intra-coding modes including angular modes and at least one non-angular mode;

the first prediction partition includes at least sixteen samples;

the first transform partition is a first size; and the first prediction partition is a second size that is different than the first size.

21. The decoder of claim 14, wherein to derive the first prediction residual and the second prediction residual, the decoder is configured to:

decode a transform of the prediction residual from the data stream; or infer a value of the prediction residual.

22. The decoder of claim 14, wherein the plurality of prediction partitions is two.

23. The decoder of claim 14, wherein the decoder is further configured to:

derive a predictor for each additional prediction partition of the plurality of prediction partitions using at least one already reconstructed sample and the intra-coding mode.

24. The decoder of claim 23, wherein the at least one already reconstructed sample used for predicting each additional prediction partition is:

external to and neighboring the block, or external to and neighbor each of the additional prediction partitions, respectively.

25. The decoder of claim 14, wherein:

reconstructed samples at a location corresponding to one of the four transform partitions included in the reconstructed prediction partition are not used to derive a predictor corresponding to another prediction partition of the plurality of prediction partitions; and reconstructed samples at a location corresponding to another one of the four transform partitions included in the reconstructed prediction partition are used to derive a predictor corresponding to another prediction partition of the plurality of prediction partitions.

26. The decoder of claim 14, wherein a prediction residual for each of the four transform partitions is derived after the predictor for the prediction partition is derived.

27. A non-transitory computer readable medium containing instructions for decoding a block of a picture, the instructions when executed cause at least one processor to:

decode, from a data stream, an intra-coding mode for the block, wherein the block is partitioned into four equally sized transform partitions based on a partition dimension flag and a size of the block;

determine, based on the size of the block, a plurality of prediction partitions that the block is divided;

derive a predictor for a first prediction partition of the plurality of prediction partitions using at least one already reconstructed sample neighboring the first prediction partition and the intra-coding mode, wherein the first prediction partition corresponds to two of the transform partitions;

after deriving the predictor for the first prediction partition, derive a first prediction residual for a first transform partition and a second prediction residual for a second transform partition, wherein the first and the second transform partitions correspond to the first prediction partition; and combine the predictor of the first prediction partition with the first prediction residual and the second prediction residual to reconstruct the first prediction partition.

28. A method for encoding a block of a picture, the method comprising:

encoding, to a data stream, an intra-coding mode for the block, wherein the block is partitioned into four equally sized transform partitions according to a partition dimension flag and a size of the block;

determining, based on the size of the block, a plurality of prediction partitions that the block is divided;

deriving a predictor for a first prediction partition of the plurality of prediction partitions using at least one already reconstructed sample neighboring the first prediction partition and the intra-coding mode, wherein the first prediction partition corresponds to two of the transform partitions;

deriving a first prediction residual for a first transform partition and a second prediction residual for a second transform partition, wherein the first and the second transform partitions correspond to the first prediction partition; and encoding, to the data stream, the predictor for the first prediction partition with the first prediction residual and the second prediction residual.

29. An encoder for encoding a block of a picture, the encoder comprising a processor configured to:

encode, to a data stream, an intra-coding mode for the block, wherein the block is partitioned into four equally sized transform partitions according to a partition dimension flag and a size of the block;

determine, based on the size of the block, a plurality of prediction partitions that the block is divided;

derive a predictor for a first prediction partition of the plurality of prediction partitions using at least one already reconstructed sample neighboring the first prediction partition and the intra-coding mode, wherein the first prediction partition corresponds to two of the transform partitions;

after deriving the predictor for the first prediction partition, derive first a prediction residual for a first transform partition and a second prediction residual for a second transform partition, wherein the first and the second transform partitions correspond to the first prediction partition; and encode, to the data stream, the predictor for the first prediction partition with the prediction residual and the second prediction residual.

30. A non-transitory computer readable medium containing instructions for encoding a block of a picture, the instructions when executed cause at least one processor to:

encode, to a data stream, an intra-coding mode for the block, wherein the block is partitioned into four equally sized transform partitions according to a partition dimension flag and a size of the block;

determine, based on the size of the block, a plurality of prediction partitions that the block is divided;

derive a predictor for a first prediction partition of the plurality of prediction partitions using at least one already reconstructed sample neighboring the first prediction partition and the intra-coding mode;, wherein the first prediction partition corresponds to two of the transform partitions derive a first prediction residual for a first transform partition and a second prediction residual for a second transform partition, wherein the first and the second transform partitions correspond to the first prediction partition; and encode, to the data stream, the predictor for the first prediction partition with the first prediction residual and the second prediction residual.

* * * * *